US006970561B1

(12) United States Patent
Obana

(10) Patent No.: US 6,970,561 B1
(45) Date of Patent: Nov. 29, 2005

(54) ENCRYPTION AND DECRYPTION WITH ENDURANCE TO CRYPTANALYSIS

(75) Inventor: Satoshi Obana, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/553,415

(22) Filed: Apr. 20, 2000

(30) Foreign Application Priority Data

Apr. 21, 1999 (JP) ................................ 11-114230

(51) Int. Cl.[7] ............................ H04K 1/00; H04L 9/00

(52) U.S. Cl. ............................ 380/28; 380/46; 380/44; 380/37; 380/35; 380/36

(58) Field of Search .............................. 380/28, 46, 44, 380/37, 36, 35

(56) References Cited

U.S. PATENT DOCUMENTS

| | | | | |
|---|---|---|---|---|
| 5,457,748 A | | 10/1995 | Bergum et al. | 380/50 |
| 6,018,581 A | * | 1/2000 | Shona et al. | 380/46 |
| 6,125,186 A | * | 9/2000 | Saito et al. | 380/287 |
| 6,157,720 A | * | 12/2000 | Yoshiura et al. | 380/44 |
| 6,175,850 B1 | * | 1/2001 | Ishii et al. | 708/491 |
| 6,408,075 B1 | | 6/2002 | Ohki et al. | |
| 6,606,385 B1 | * | 8/2003 | Aikawa et al. | 380/28 |
| 6,683,956 B1 | * | 1/2004 | Aikawa et al. | 380/37 |

FOREIGN PATENT DOCUMENTS

| | | |
|---|---|---|
| JP | 8-504067 | 4/1996 |
| JP | 9-230786 | 9/1997 |
| JP | 10-210023 | 8/1998 |
| JP | 10-222065 | 8/1998 |
| JP | 10-510692 | 10/1998 |
| JP | 10-340048 | 12/1998 |
| JP | 2000-66585 | 3/2000 |
| JP | 2000-165375 | 6/2000 |

OTHER PUBLICATIONS

Bruce Shneier, "Applied Cryptography"; John Wiley & Sons, Inc.; 1996; ISBN; 0-471-11709-9; pp. 623-673.

Alfred J. Menezes; "Handbook of Applied Cryptography"; Oorschot and S. Vanstone; 1997; ISBN 0-8493-8523-7; pp. 250-259.

* cited by examiner

*Primary Examiner*—Ayaz Sheikh
*Assistant Examiner*—Kaveh Abrishamkar
(74) *Attorney, Agent, or Firm*—Foley & Lardner LLP

(57) ABSTRACT

An encrypting apparatus includes an encrypting operation section, a determining section and a control section. The encrypting operation section carries out an encrypting operation to a plaintext using intermediate data at each of a plurality of encrypting stages of the encrypting operation to produce a ciphertext. The encrypting operation section outputs encrypting stage data indicating an encrypting state at each of the plurality of processing stages. The determining section determines whether the encrypting operation at a next encrypting stage should be changed, based on the encrypting stage data at a current encrypting stage from the encrypting operation section. The control section changing the encrypting operation at the next encrypting stage when it is determined that the encrypting operation at the next encrypting stage should be changed.

63 Claims, 28 Drawing Sheets

ENCRYPTION AND DECRYPTION WITH ENDURANCE TO CRYPTANALYSIS

BACKGROUND OF THE INVENTION

1. Field of the Invention

The present invention relates to encryption and decryption with endurance to cryptanalysis method.

2. Description of the Related Art

A conventional encrypting apparatus is composed of an input unit, a storage unit, an encryption processing unit and an output unit. A plaintext is supplied to the encryption processing unit from the input unit. The encryption processing unit always carries out an encrypting operation in accordance with a predetermined processing procedure at each of a plurality of processing stages of the encrypting operation to generate a ciphertext, while storing an intermediate data at each processing stage in the storage unit. The intermediate data is required at the next processing stage of the encrypting operation. The generated ciphertext is output from the output unit. In this case, the time period from the time when the encrypting operation is started to the time when a specific intermediate stage of the encrypting operation is started is approximately constant.

It should be noted that a method of implementing cipher algorithm is described in detail in "Applied Cryptography" by Bruce Shneier (John Wieley & Sons, Inc., 1996, ISBN 0-471-11709-9, pp. 623–673.

In the above mentioned conventional example of the encrypting apparatus, cryptanalysis methods such as a simple power analysis and a differential power analysis are effective. The simple power analysis and the differential power analysis uses the feature that the consumption power becomes larger when a data held in a semiconductor device is changed, compared with a case that the held data is not changed. In the cryptanalysis method, the power consumption of the encrypting apparatus is measured at a plurality of timings while the encrypting operation of a plaintext is carried out to specify secret information such as a secret key (an encrypt key) in the encrypting apparatus.

The following two conditions must be met for the purpose that the simple power analysis or the differential power analysis functions effectively. That is, the first condition is that an executed stage of the encrypting operation can be specified each time the power consumption is measured. The second condition is that the measured value of the power consumption at each stage conspicuously reflects the calculation result of the encrypting operation carried out in the encrypting apparatus.

When the above-mentioned two conditions have been met in the conventional encrypting apparatus, the simple power analysis or the differential power analysis functions effectively to make the decryption possible. This is applied to a decrypting apparatus and an encrypting and decrypting apparatus in the same manner.

A method of encrypting data is disclosed in Japanese Laid Open Patent Application (JP-A-Heisei 9-230786) and Japanese Laid Open Patent Application (JP-A-Heisei 8-504067) in relation to the above conventional technique. In these references, differential decipherment and linear decipherment are prevented. The intermediate results of the encrypting operation are changed without depending on the random numbers and an encrypt key is changed in dependence on the random numbers.

Also, an improved secretness in the encrypting communication device is disclosed in Japanese Laid Open Patent Application (JP-A-Heisei 8-504067). In this reference, when power is turned off, key information stored in a volatile memory in the encrypting apparatus is dynamically erased, and the same key information is re-loaded when the supply of power is resumed.

Even if these techniques are combined, it is very difficult to remove the dependence of the finally outputted ciphertext on the random numbers.

In conjunction with the above description, a verification method is disclosed in Japanese Laid Open Patent Application (JP-A-Heisei 10-210023). In this reference, the first station and the second station stores common secret information Ka (K'a) in storage sections (13) and (43) at each station. The first station transmits to the second station, the user information (Ia) indicating that the first station is a first station. One of the first and second stations generates and transmits random numbers r to the other station. The first station generates first verification information using the random numbers, secret information and predetermined algorithm, and transmits it to the second station. The second station generates second verification information using the random numbers, secret information and the predetermined algorithm. The second station compares the first verification information and the second verification information and determines authority of the first station based on whether both are the same.

Also, a method of generating a hash value is disclosed in Japanese Laid Open Patent Application (JP-A-Heisei 10-340048). In this reference, when a message is given, divisional data of the message are inputted and monomorphism expansion processing is carried out to output a data which is longer than the divisional data. Also, a hash value is generated by a hash function which contains a multiplying process and circulated shifting process. In this way, a hash value and a key or a ciphertext with a high data distortion are quickly generated.

Also, a computer supporting exchanging method of an encrypt key between a user computer unit U and a network computer unit N is disclosed in Japanese Laid Open Patent Application (JP-A-Heisei 10-510692). In this reference, the length of a message to be transmitted is reduced. The first intermediate key and the second intermediate key are generated in dependence on the random numbers. In a network computer unit and a user computer unit, by carrying out the exclusion OR calculation of the first intermediate key and the second intermediate key for every bit, a session key is calculated. This key is not absolutely transmitted in a plaintext. For example, a predetermined function such as a symmetrical encrypting function, a hash function and a one-way function is used. Thus, the network computer unit and the user computer unit are verified each other.

SUMMARY OF THE INVENTION

Therefore, an object of the present invention is to provide an encrypting and/or decrypting apparatus which has endurance to cryptanalysis methods such as a simple power analysis and a differential power analysis.

Another object of the present invention is to provide an encrypting and/or decrypting apparatus in which the processing state of an encrypting and/or decrypting operation is changed based on random number.

Still another object of the present invention is to provide an encrypting and/or decrypting apparatus in which intermediate data of an encrypting and/or decrypting operation is changed based on random number.

Yet still another object of the present invention is to provide an encrypting and/or decrypting apparatus in which an encrypting and/or decrypting procedure of an encrypting and/or decrypting operation is changed based on random number.

It is an object of the present invention is to provide an encrypting and/or decrypting apparatus in which a delay time is inserted into an encrypting and/or decrypting operation based on random number.

Another object of the present invention is to provide an encrypting and/or decrypting method in which the processing state of an encrypting and/or decrypting operation is changed based on random number.

Still another object of the present invention is to provide a recording medium in which a program for the above encrypting and/or decrypting method is stored.

In order to achieve a first aspect of the present invention, an encrypting apparatus includes an encrypting operation section, a determining section and a control section. The encrypting operation section carries out an encrypting operation to a plaintext using intermediate data at each of a plurality of encrypting stages of the encrypting operation to produce a ciphertext. The encrypting operation section outputs encrypting stage data indicating an encrypting state at each of the plurality of processing stages. The determining section determines whether the encrypting operation at a next encrypting stage should be changed, based on the encrypting stage data at a current encrypting stage from the encrypting operation section. The control section changing the encrypting operation at the next encrypting stage when it is determined that the encrypting operation at the next encrypting stage should be changed.

The determining section may determine whether the intermediate data at the next encrypting stage of the encrypting operation should be changed depending on at least a random number, based on the encrypting stage data at the current encrypting stage from the encrypting operation section. The encrypting stage data includes the intermediate data at the next encrypting stage. In this case, the control section changes the intermediate data at the next encrypting stage depending on the random number. Also, the control section may change the intermediate data at the next encrypting stage depending on the plaintext or a data dependent on the plaintext in place of the random number.

Also, the determining section may determine whether an encrypting procedure at the next encrypting stage of the encrypting operation should be changed depending on at least a random number, based on the encrypting stage data at the current encrypting stage from the encrypting operation section. In this case, the control section changes the encrypting procedure at the next encrypting stage of the encrypting operation depending on the random number. Also, the control section may change the encrypting procedure at the next encrypting stage of the encrypting operation depending on the plaintext or a data dependent on the plain text in place of the random number.

Also, the determining section may determine whether the encrypting operation at the next encrypting stage should be changed depending on at least a random number, based on the encrypting stage data at the current encrypting stage from the encrypting operation section. In this case, the control section inserts a delay time in the encrypting operation at the next encrypting stage depending on the random number. Also, the control section may insert the delay time in the encrypting operation at the next encrypting stage depending on the plaintext or a data dependent on the plaintext in place of the random number.

In order to achieve a second aspect of the present invention, a decrypting apparatus includes a decrypting operation section, a determining section and a control section. The decrypting operation section carries out a decrypting operation to a ciphertext using intermediate data at each of a plurality of decrypting stages of the decrypting operation to produce a plaintext. The decrypting operation section outputs decrypting stage data indicating a decrypting state at each of the plurality of decrypting stages. The determining section determines whether the decrypting operation at a next decrypting stage should be changed, based on the decrypting stage data at a current decrypting stage from the decrypting operation section. The control section changes the decrypting operation at the next decrypting stage when it is determined that the decrypting operation at the next decrypting stage should be changed.

Here, the determining section may determine whether the intermediate data at the next decrypting stage of the decrypting operation should be changed depending on at least a random number, based on the decrypting stage data at the current decrypting stage from the decrypting operation section. Also, the stage data includes the intermediate data for the next decrypting stage. In this case, the control section may change the intermediate data at the next decrypting stage depending on the random number. Also, the control section may change the intermediate data at the next decrypting stage depending on the ciphertext or a data dependent on the ciphertext in place of the random number.

Also, the determining section determines whether a decrypting procedure at the next decrypting stage of the decrypting operation should be changed depending on at least a random number, based on the stage data at the current decrypting stage from the decrypting operation section. In this case, the control section may change the decrypting procedure at the next decrypting stage of the decrypting operation depending on the random number. In this case, the control section may change the decrypting procedure at the next decrypting stage of the decrypting operation depending on the ciphertext or a data dependent on the ciphertext in place of the random number.

Also, the determining section determines whether the decrypting operation at the next decrypting stage should be changed depending on at least a random number, based on the stage data at the current decrypting stage from the decrypting operation section. In this case, the control section inserts a delay time in the decrypting operation at the next decrypting stage depending on the random number. Also, the control section may insert the delay time in the decrypting operation at the next decrypting stage depending on the ciphertext or a data dependent on the ciphertext in place of the random number.

In order to achieve a third aspect of the present invention, an encrypting and decrypting apparatus includes an encrypting and decrypting operation, a determining section and a control section. The encrypting and decrypting operation section determines whether an inputted instruction is an encrypt instruction or a decrypt instruction, carries out an encrypting operation to an inputted text in response to the encrypt instruction using first intermediate data at each of a plurality of encrypting stages of the encrypting operation to produce a ciphertext, and carries out a decrypting operation to the inputted text in response to the decrypt instruction using second intermediate data at at each of a plurality of decrypting stages of the decrypting operation to produce a second plaintext. The encrypting and decrypting operation section outputs encrypting stage data indicating an encrypting state at each of the plurality of encrypting stages and outputs decrypting stage data indicating a decrypting state at each of the plurality of decrypting stages. The determining section determines whether the encrypting operation at a next encrypting stage should be changed, based on the encrypting stage data at a current encrypting stage from the encrypting and decrypting operation section, and determines whether the decrypting operation at a next decrypting stage should be changed, based on the decrypting stage data at a current decrypting stage from the encrypting and decrypting operation section. The control section changes the encrypting operation at the next encrypting stage when it is determined that the encrypting operation at the next encrypting stage should be changed, and changes the decrypting operation at the next decrypting stage when it is determined that the decrypting operation at the next decrypting stage should be changed.

Here, the determining section may determine whether the first intermediate data at the next encrypting stage of the encrypting operation should be changed depending on at least a first random number, based on the encrypting stage data at the current encrypting stage from the encrypting and decrypting operation section, and determine whether the second intermediate data at the next decrypting stage of the decrypting operation should be changed depending on at least a second random number, based on the decrypting stage data at the current decrypting stage from the encrypting and decrypting operation section. The encrypting stage data includes the first intermediate data at the next encrypting stage and the decrypting stage data includes the second intermediate data for the next decrypting stage. In this case, the control section changes the first intermediate data at the next encrypting stage depending on the first random number and changes the second intermediate data at the next decrypting stage depending on the second random number. Also, the control section may change the first intermediate data at the next encrypting stage depending on the inputted text or a data dependent on the inputted text in place of the first random number, and change the second intermediate data at the next decrypting stage depending on the inputted text or the data dependent on the inputted text in place of the second random number.

Also, the determining section may determine whether an encrypting procedure at the next encrypting stage of the encrypting operation should be changed depending on at least a first random number, based on the encrypting stage data at the current encrypting stage from the encrypting and decrypting operation section, and determine whether a decrypting procedure at the next decrypting stage of the decrypting operation should be changed depending on at least a second random number, based on the decrypting stage data at the current decrypting stage from the encrypting and decrypting operation section. In this case, the control section changes the encrypting procedure at the next encrypting stage of the encrypting operation depending on the first random number and changes the decrypting procedure at the next decrypting stage of the decrypting operation depending on the second random number. Also, the control section may change the encrypting procedure at the next encrypting stage of the encrypting operation depending on the inputted text or a data dependent on the inputted text in place of the first random number, and change the decrypting procedure at the next decrypting stage of the decrypting operation depending on the inputted text or the data dependent on the inputted text in place of the second random number.

Also, the determining section may determine whether the encrypting operation at the next encrypting stage should be changed depending on at least a first random number, based on the encrypting stage data at the current encrypting stage from the encrypting and decrypting operation section, and determine whether the decrypting operation at the next decrypting stage should be changed depending on at least a second random number, based on the decrypting stage data at the current decrypting stage from the encrypting and decrypting operation section. In this case, the control section inserts a first delay time in the encrypting operation at the next encrypting stage depending on the first random number and inserts a second delay time in the decrypting operation at the next decrypting stage depending on the second random number. Also, the control section may insert the first delay time in the encrypting operation at the next encrypting stage depending on the inputted text or a data dependent on the inputted text in place of the first random number, and insert the second delay time in the decrypting operation at the next decrypting stage depending on the inputted text or the data dependent on the inputted text in place of the second random number.

In order to achieve a fourth aspect of the present invention, an encrypting method includes (a) determining whether an encrypting operation at a current encrypting stage should be changed, based on encrypting stage data at a previous encrypting stage, the encrypting stage data at the previous encrypting stage indicating an encrypting state at the previous encrypting stage; (b) changing the encrypting operation at the current encrypting stage when it is determined that the encrypting operation at the current encrypting stage should be changed; (c) carrying out the encrypting operation at the current encrypting stage to a plaintext using intermediate data at the current encrypting stage; and (d) executing the steps (a) to (c) to each of a plurality of the encrypting stages of the encrypting operation to produce a ciphertext.

Here, the determining may include: determining whether the intermediate data at the current encrypting stage of the encrypting operation should be changed depending on at least a random number, based on the encrypting stage data at the previous encrypting stage. The encrypting stage data includes the intermediate data at the current encrypting stage. In this case, the changing may include: changing the intermediate data at the current encrypting stage depending on the random number. Also, the changing includes: changing the intermediate data at the current encrypting stage depending on the plaintext or a data dependent on the plaintext in place of the random number.

Also, the determining may include: determining whether an encrypting procedure at the current encrypting stage of the encrypting operation should be changed depending on at least a random number, based on the encrypting stage data at the previous encrypting stage. The changing may include: changing the encrypting procedure at the current encrypting stage of the encrypting operation depending on the random number. Also, the changing may include: changing the encrypting procedure at the next encrypting stage of the encrypting operation depending on the plaintext or a data dependent on the plaintext in place of the random number.

Also, the determining may include: determining whether the encrypting operation at the current encrypting stage should be changed depending on at least a random number, based on the encrypting stage data at the previous encrypting stage. Also, the changing may include: inserting a delay time in the encrypting operation at the current encrypting stage depending on the random number. In this case, the changing may include: inserting the delay time in the encrypting operation at the current encrypting stage depending on the plaintext or a data dependent on the plaintext in place of the random number.

Also, in order to a fifth aspect of the present invention, a decrypting method includes: (a) determining whether a decrypting operation at a current decrypting stage should be changed, based on decrypting stage data at a previous decrypting stage, the decrypting stage data at the previous decrypting stage indicating an decrypting state at each of the plurality of processing stages; (b) changing the decrypting operation at the current decrypting stage when it is determined that the decrypting operation at the next decrypting stage should be changed; (c) carrying out the decrypting operation at the current decrypting stage to a ciphertext using intermediate data at the current decrypting stage; and (d) executing the steps (a) to (c) to each of a plurality of decrypting stages to produce a plaintext.

Here, the determining may include: determining whether the intermediate data at the current decrypting stage of the decrypting operation should be changed depending on at least a random number, based on the decrypting stage data at the previous decrypting stage. Also, the stage data includes the intermediate data at the current decrypting stage, In this case, the changing may include: changing the intermediate data at the current decrypting stage depending on the random number. Also, the changing may include: changing the intermediate data at the current decrypting stage depending on the ciphertext or a data dependent on the ciphertext in place of the random number.

Also, the determining may include: determining whether a decrypting procedure at the current decrypting stage of the decrypting operation should be changed depending on at least a random number, based on the decrypting stage data at the previous decrypting stage. In this case, the changing may include: changing the decrypting procedure at the current decrypting stage of the decrypting operation depending on the random number. Also, the changing includes: changing the decrypting procedure at the current decrypting stage of the decrypting operation depending on the ciphertext or a data dependent on the ciphertext in place of the random number.

Also, the determining may include: determining whether the decrypting operation at the current decrypting stage should be changed depending on at least a random number, based on the decrypting stage data at the previous decrypting stage. In this case, the changing may include: inserting a delay time in the decrypting operation at the current decrypting stage depending on the random number. Also, the changing may include: inserting the delay time in the decrypting operation at the current decrypting stage depending on the ciphertext or a data dependent on the ciphertext in place of the random number.

In order to achieve a sixth aspect of the present invention, an encrypting and decrypting method include: (a) determining whether an inputted instruction is an encrypt instruction or a decrypt instruction; (b) determining whether the encrypting operation to a text at a current encrypting stage of an encrypting operation should be changed, based on the encrypting stage data at a previous encrypting stage, the encrypting stage data at the current encrypting stage indicating an encrypting state at the current encrypting stage; (c) changing the encrypting operation to the text at the current encrypting stage when it is determined that the encrypting operation to the text at the current encrypting stage should be changed; (d) carrying out the encrypting operation to the text using first intermediate data at current encrypting stage of the encrypting operation; (e) executing the steps (b) to (d) to each of a plurality of encrypting stages of the encrypting operation to the text in response to the encrypt instruction to produce a ciphertext; (f) determining whether the decrypting operation to the text at a current decrypting stage should be changed, based on the decrypting stage data at a previous decrypting stage, the decrypting stage data at the current decrypting stage indicating an decrypting state at the current decrypting stage; (g changing the decrypting operation to the text at the current decrypting stage when it is determined that the decrypting operation to the text at the current decrypting stage should be changed; (h) carrying out the decrypting operation to the text to a second ciphertext using second intermediate data at the current decrypting stage; and (i) executing the steps (f) to (h) for each of a plurality of decrypting stages of the encrypting operation to the text in response to the decrypt instruction to produce a plaintext.

Here, the (b) determining may include: determining whether the first intermediate data at the current encrypting stage of the encrypting operation should be changed depending on at least a first random number, based on the encrypting stage data at the previous encrypting stage. The (f) determining may include: determining whether the second intermediate data at the current decrypting stage of the decrypting operation should be changed depending on at least a second random number, based on the decrypting stage data at the previous decrypting stage. The encrypting stage data includes the first intermediate data at the current encrypting stage and the decrypting stage data includes the second intermediate data for the current decrypting stage. In this case, the (c) changing may include: changing the first intermediate data at the current encrypting stage depending on the first random number. Also, the (g) changing may include: changing the second intermediate data at the current decrypting stage depending on the second random number. In this case, the (c) changing may include: changing the first intermediate data at the current encrypting stage depending on the text or a data dependent on the text in place of the first random number. Also, the (g) changing may include: changing the second intermediate data at the current decrypting stage depending on the text or the data dependent on the text in place of the second random number.

Also, the (b) determining may include: determining whether an encrypting procedure at the current encrypting stage of the encrypting operation should be changed depending on at least a first random number, based on the encrypting stage data at the previous encrypting stage, and the (f) determining may include: determining whether a decrypting procedure at the current decrypting stage of the decrypting operation should be changed depending on at least a second random number, based on the decrypting stage data at the previous decrypting stage. In this case, the (c) changing may include: changing the encrypting procedure at the current encrypting stage of the encrypting operation depending on the first random number, and the (g) changing may include: changing the decrypting procedure at the current decrypting stage of the decrypting operation depending on the second random number. Also, the (c) changing may include: changing the encrypting procedure at the current encrypting stage of the encrypting operation depending on the text or a data dependent on the text in place of the first random number, and the (g) changing may include: changing the decrypting procedure at the current decrypting stage of the decrypting operation depending on the text or the data dependent on the text in place of the second random number.

Also, the (b) determining may include: determining whether the encrypting operation at the current encrypting stage should be changed depending on at least a first random number, based on the encrypting stage data at the previous encrypting stage, and the (f) determining may include: determining whether the decrypting operation at the current decrypting stage should be changed depending on at least a second random number, based on the decrypting stage data at the previous decrypting stage. In this case, the (c) changing may include: inserting a first delay time in the encrypting operation at the current encrypting stage depending on the first random number, and the (g) changing may include: inserting a second delay time in the decrypting operation at the current decrypting stage depending on the second random number. Also, the (c) changing may include: inserting the first delay time in the encrypting operation at the current encrypting stage depending on the text or a data dependent on the text in place of the first random number, and the (f) changing may include: inserting the second delay time in the decrypting operation at the current decrypting stage depending on the text or the data dependent on the text in place of the second random number.

In order to achieve a seventh aspect of the present invention, a recording medium stores a problem for an encrypting method. The encrypting method includes: (a) determining whether an encrypting operation at a current encrypting stage should be changed, based on encrypting stage data at a previous encrypting stage, the encrypting stage data at the previous encrypting stage indicating an encrypting state at the previous encrypting stage; (b) changing the encrypting operation at the current encrypting stage when it is determined that the encrypting operation at the current encrypting stage should be changed; (c) carrying out the encrypting operation at the current encrypting stage to a plaintext using intermediate data at the current encrypting stage; and (d) executing the steps (a) to (c) to each of a plurality of the encrypting stages of the encrypting operation to produce a ciphertext.

In order to achieve an eighth aspect of the present invention, a recording medium stores a program for a decrypting method. The decrypting method includes: (a) determining whether a decrypting operation at a current decrypting stage should be changed, based on decrypting stage data at a previous decrypting stage, the decrypting stage data at the previous decrypting stage indicating an decrypting state at each of the plurality of processing stages; (b) changing the decrypting operation at the current decrypting stage when it is determined that the decrypting operation at the next decrypting stage should be changed; (c) carrying out the decrypting operation at the current decrypting stage to a ciphertext using intermediate data at the current decrypting stage; and (d) executing the steps (a) to (c) to each of a plurality of decrypting stages to produce a plaintext.

In order to achieve a ninth aspect of the present invention, a recording medium stores a problem for an encrypting and decrypting method. The encrypting and decrypting method includes:

(a) determining whether an inputted instruction is an encrypt instruction or a decrypt instruction; (b) determining whether the encrypting operation to a text at a current encrypting stage of an encrypting operation should be changed, based on the encrypting stage data at a previous encrypting stage, the encrypting stage data at the current encrypting stage indicating an encrypting state at the current encrypting stage; (c) changing the encrypting operation to a text at the current encrypting stage when it is determined that the encrypting operation to a text at the current encrypting stage should be changed; (d) carrying out the encrypting operation to to a text using first intermediate data at current encrypting stage of the encrypting operation; (e) executing the steps (b) to (d) for each of a plurality of encrypting stages of the encrypting operation to the text in response to the encrypt instruction to produce a ciphertext; (f) determining whether the decrypting operation to the text at a current decrypting stage should be changed, based on the decrypting stage data at a previous decrypting stage, the decrypting stage data at the current decrypting stage indicating an decrypting state at the current decrypting stage; (g) changing the decrypting operation to the text at the current decrypting stage when it is determined that the decrypting operation to the text at the current decrypting stage should be changed; (h) carrying out the decrypting operation to the text to a second ciphertext using second intermediate data at the current decrypting stage; and (i) executing the steps (f) to (h) for each of a plurality of decrypting stages of the encrypting operation to the text in response to the decrypt instruction to produce a plaintext.

DESCRIPTION OF THE PREFERRED EMBODIMENTS

Next, an encrypting and/or decrypting apparatus of the present invention will be described below in detail with reference to the attached drawings.

(1) First Embodiment

Figure 1:
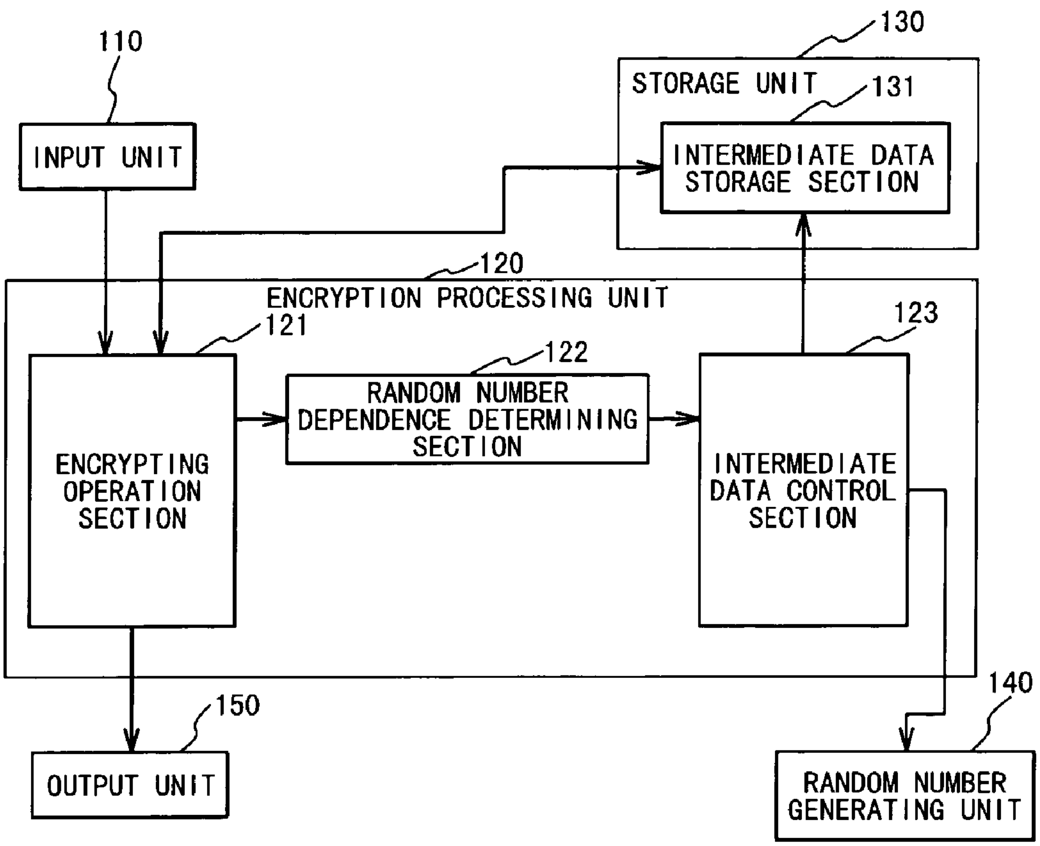
FIG. 1 is a block diagram showing the structure of an encrypting apparatus according to a first embodiment of the present invention.

FIG. 1 is a block diagram showing the structure of an encrypting apparatus according to the first embodiment of the present invention.

Referring to FIG. 1, the encrypting apparatus in the first embodiment is composed of an input unit 110, an encryption processing unit 120, a storage unit 130, a random number generating unit 140 and an output unit 150. The encryption processing unit 120 is composed of an encrypting operation section 121, a random number dependence determining section 122 and an intermediate data control section 123.

The input unit 110 supplies a plaintext as the object of an encrypting operation to the encryption processing unit 120.

The encryption processing unit 120 encrypts the plaintext supplied from the input unit 110 based on random numbers supplied from the random number generating unit 140 using an encrypt key stored in the encryption processing unit 120 so that a ciphertext is outputted from the output unit 150.

The encrypting operation section 121 encrypts the plaintext supplied from the input unit 110 using the encrypt key stored in the encrypting operation section 121. The encrypting operation is composed of plurality of processing stages. The encrypting operation section 121 informs the stage data indicating the processing state of the encrypting operation at each of the plurality of stages during execution of the encrypting operation to the random number dependence determining section 122. Also, the encrypting operation section 121 stores intermediate data at each processing stage during the encrypting operation in the intermediate data storage section 131 of the storage unit 130. The encrypting operation section 121 carries out the encrypting operation using the intermediate data changed in response to an intermediate data changing request from the intermediate data control section 123. Thus, the encrypting operation is changed. The encrypting operation section 121 finally outputs a ciphertext obtained by encrypting the plaintext.

The random number dependence determining section 122 determines whether or not the intermediate data changing request should be outputted to the intermediate data control section 123, based on stage data at each processing stage of the encrypting operation from the encrypting operation section 121. The random number dependence determining section 122 outputs the intermediate data changing request to the intermediate data changing request section 123, when it is determined that intermediate data changing request should be outputted, that is, when the current stage of the encrypting operation is determined to be the stage to which a random number dependent operation should be applied.

The intermediate data control section 123 sends a random number generating request in response to the intermediate data changing request outputted from random number dependence determining section 122 to the random number generating unit 140. Then, the intermediate data control section 123 receives random numbers from the random number generating unit 140 and changes the intermediate data stored in the intermediate data storage section 131 based on the received random numbers. Hereinafter, this operation is referred to as a random number dependent intermediate data changing operation. It should be noted that the intermediate data control section 123 carries out the random number dependent intermediate data changing operation plural times to cancel the influence of the random numbers. Therefore, the final ciphertext does not depend on the random numbers outputted from the random number generating section 140. It should be noted that it is sufficient that at least a random number is generated, although the random numbers are generated in the first enbodiment. This is applied to the following embodiments.

The intermediate data storage section 131 of the storage section 130 stores the intermediate data during the encrypting operation from the encryption processing unit 120. As described above, when the intermediate data changing request is outputted from the random number dependence determining section 122 to the intermediate data control section 123, the intermediate data stored in the intermediate data storage section 131 is operated by the intermediate data control section 123.

The random number generating unit 140 generates the random numbers in response to the random number generating request from the encryption processing unit 120 and outputs them to the encryption processing unit 120.

Figure 2:
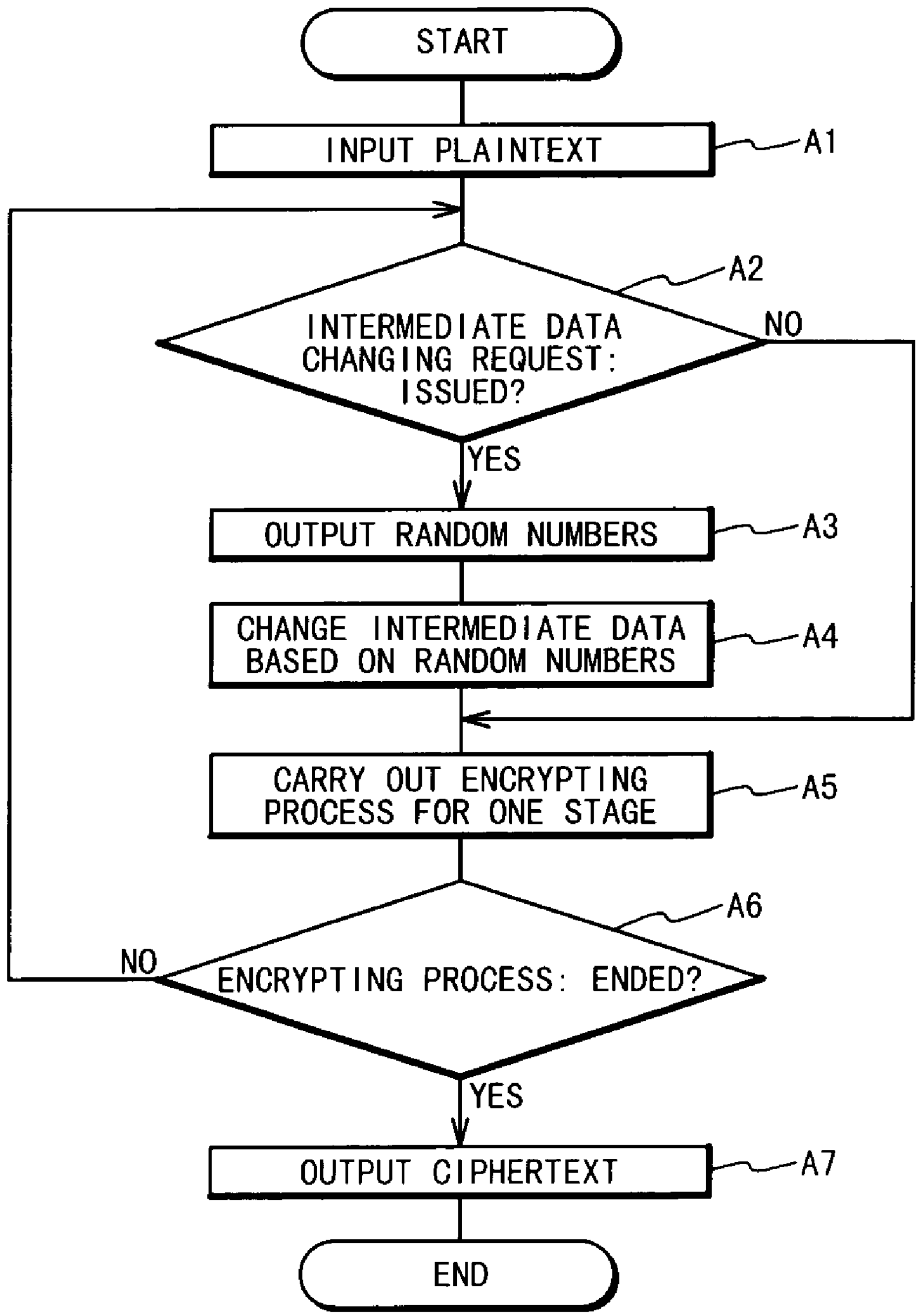
FIG. 2 is a flow chart showing the process of the encrypting apparatus according to the first embodiment of the present invention.

FIG. 2 is a flow chart showing the operation of the encrypting apparatus according to the first embodiment. The operation of the encrypting apparatus in the first embodiment will be described in detail with reference to FIG. 2.

First, the plaintext which should be encrypted is supplied from the input unit 110 to the encrypting operation section 121 in the encryption processing unit 120 (at a step A1 of FIG. 2).

The encrypting operation section 121 outputs the encrypting stage data at an encrypting stage of the encrypting operation by the encrypting operation section 121 to the random number dependence determining section 122 as the encrypting stage data at a previous encrypting stage.

The random number dependence determining section 122 determines based on the encrypting stage data at the previous encrypting stage, whether or not a current stage of the encrypting operation is the stage to change the intermediate data stored in the intermediate data storage section 131 in dependence on the random numbers. When the current stage is determined to be the stage which the intermediate data should be changed in dependence on the random numbers, the random number dependence determining section 122 outputs the intermediate data changing request to the intermediate data control section 123.

The intermediate data control section 123 determines whether or not the intermediate data changing request is outputted from the random number dependence determining section 122 (Step A2).

The intermediate data control section 123 receives the intermediate data changing request and sends the random number generating request to the random number generating unit 140, when it is determined at the step A2 that the intermediate data changing request is outputted. Also, the intermediate data control section 123 receives the random numbers outputted from the random number generating unit 140 based on the random number generating request (Step A3).

The intermediate data control section 123 receives the random numbers and carries out the random numbers dependent intermediate data changing operation to change the intermediate data stored in the intermediate data storage section 131 of the storage unit 130 based on the received random numbers (Step A4). The intermediate data is the data needed by the encrypting operation section 121 in the current encrypting stage of the encrypting operation. Through the change of the intermediate data, the encrypting operation at the current encrypting stage is changed.

The encryption operation section 121 executes the encrypting operation for a single stage, when the random number dependent intermediate data changing operation of the step A4 is ended, or when it is determined at the step A2 that the intermediate data changing request is not outputted (Step A5).

The encrypting operation section 121 determines whether or not the encrypting operation is ended, after the encrypting operation is executed for the single stage (Step A6). The encrypting operation section 121 outputs a ciphertext to the output unit 150, when it is determined at the step A6 that the encrypting operation is ended (Step A7). In this way, the whole processing ends.

On the other hand, when the encrypting operation section 121 determines at the step A6 that the encrypting operation does not end, the control returns to the step A2 to continue the encrypting operation.

In the first embodiment, the intermediate data, i.e., the necessary data in each encrypting stage of the encrypting operation is changed dependent on the random numbers. It is supposed that the electric power is measured during calculation of the intermediate data, to intend to read out the stored intermediate data. In this case, the values of the intermediate data are influenced by the random numbers. Therefore, it is difficult to determine whether or not the change of power consumption is caused based on the data needed in the actual encrypting operation. Thus, the encrypting apparatus of the present invention has endurance to the cryptanalysis using the simple power analysis and the differential power analysis.

(2) Second Embodiment

Figure 3:
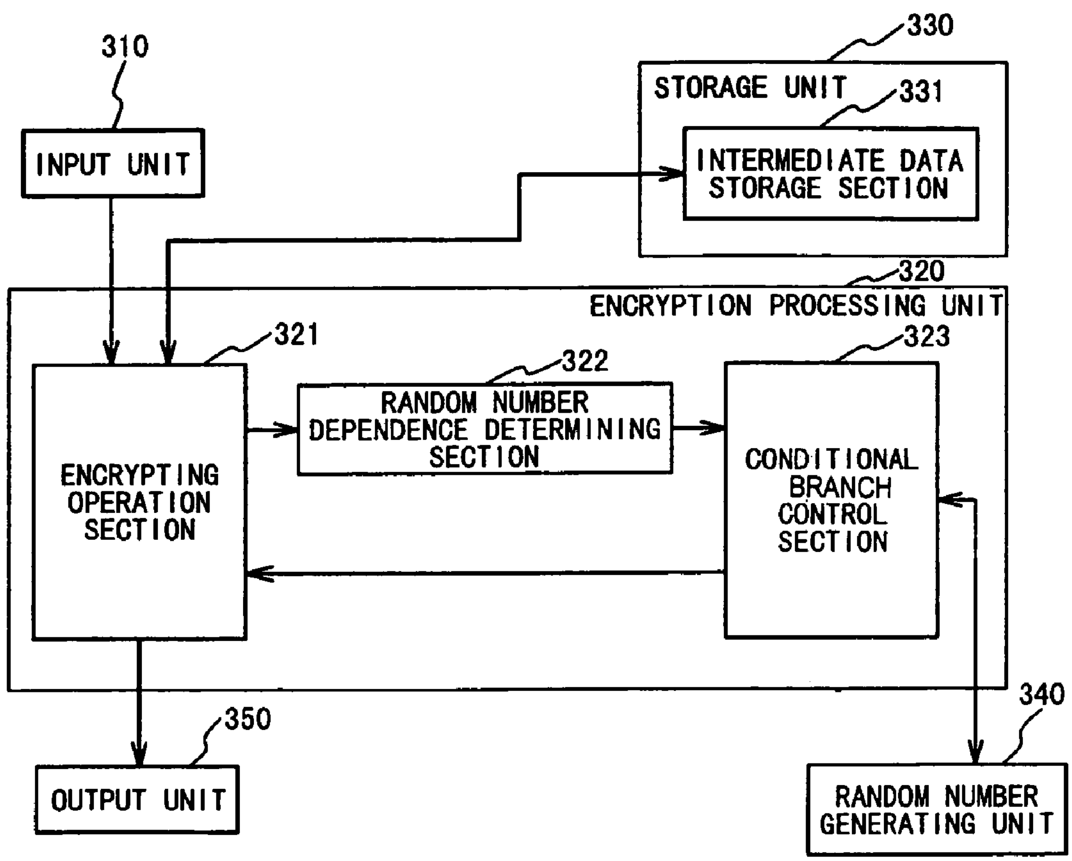
FIG. 3 is a block diagram showing the structure of the encrypting apparatus according to a second embodiment of the present invention.

FIG. 3 is a block diagram showing the structure of the encrypting apparatus according to the second embodiment of the present invention.

Referring to FIG. 3, the encrypting apparatus in the second embodiment is composed of an input unit 310, an encryption processing unit 320, a storage unit 330, a random number generating unit 340 and an output unit 350. The encryption processing unit 320 is composed of an encrypting operation section 321, a random number dependence determining section 322 and a conditional branch control unit 323.

The input unit 310 supplies a plaintext as the object of an encrypting operation to the encryption processing unit 320.

The encryption processing unit 320 encrypts the plaintext supplied from the input unit 310, based on the random numbers supplied from the random number generating unit 340 using an encrypt key stored in the encryption processing unit 320, so that a ciphertext is outputted from the output unit 350.

The encrypting operation section 321 encrypts the plaintext supplied from the input unit 310 using the encrypt key stored in the encrypting operation section 321. The encrypting operation section 321 outputs the encrypting stage data indicating the encryping state at each of a plurality of encrypting stages of the encrypting operation to the random number dependence determining section 322. The encrypting operation section 321 receives an encrypting operation changing request dependent on the random numbers from the conditional branch control unit 323. The changing request includes the determination of an instruction execution sequence and the selection of an actually executed process procedure from among a plurality of processing procedures. The determination and the selection are dependent on the random numbers. Thus, the encrypting state of the encrypting operation can be changed in dependence on the random numbers. The encrypting operation section 321 executes the encrypting operation while changing the encrypting state at each encrypting stage. Finally, the encrypting operation section 321 outputs the ciphertext obtained by encrypting a plaintext finally.

It should be noted that the encrypting operation section 321 sends stage data indicating the current stage of the encrypting operation by the encrypting operation section 321 during the execution of the encrypting operation to the random number dependence determining section 322.

The random number dependence determining section 322 determines whether or not the conditional branch determining request should be outputted to the conditional branch control section 323, based on the encrypting stage data from the encrypting operation section 321. The random number dependence determining section 322 outputs a conditional branch determining request to the conditional branch control section 324, when it is determined that the conditional branch determining request should be outputted, that is, when the current encrypting stage of the encrypting operation is determined to be the stage to which a random number dependent operation should be applied.

The conditional branch control unit 323 sends the random number generating request to the random number generating unit 340, when the conditional branch determining request is supplied from the random number dependence determining section 322. Then, the conditional branch control unit 323 acquires the random numbers. The conditional branch control unit 323 operates the random number dependent conditional branch determining operation based on the acquired random numbers. That is, the conditional branch control unit 323 carries out the operation to determine the execution sequence of the plurality of encrypting operation procedures such that the output of the encrypting operation section 321 does not change even if the execution sequence is changed. Also, the conditional branch control unit 323 carries out to the operation to select one of the plurality of execution processing procedures such that the output of the encrypting operation section 321 does not change even if any of the plurality of processing procedures is carried out.

LP It should be noted that the conditional branch control unit 323 carries out the random number dependent conditional branch determining operation such that the output of the encrypting operation section 321 does not depend on the random numbers as mentioned above. Thus, the ciphertext as the final output does not depend on the random numbers which are outputted from the random number generating section 340.

The storage 330 is composed of an intermediate data storage section 331. The intermediate data storage section 331 stores the intermediate data to be held during the encrypting operation by the encryption processing unit 320.

The random number generating unit 340 generates the random numbers in response to the random number generating request from the encryption processing unit 320 to outputs to the encryption processing unit 320.

Figure 4:
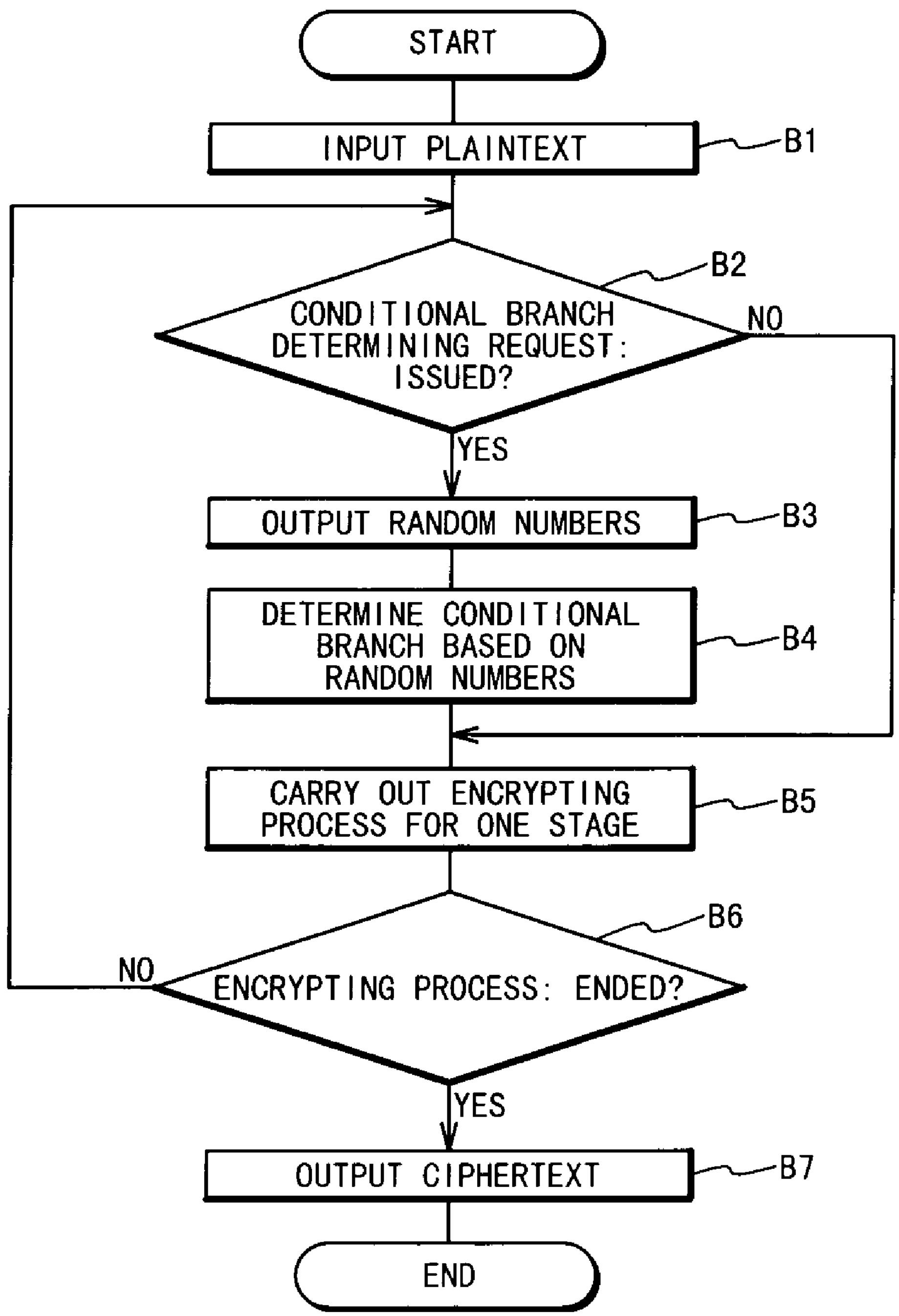
FIG. 4 is a flow chart showing the process of the encrypting apparatus according to the second embodiment of the present invention.

FIG. 4 is a flow chart showing the encrypting operation of the encrypting apparatus in the second embodiment. The encrypting operation is composed of a step B1 of supplying a plaintext, a step B2 of determining existence or non-existence of the conditional branch determining request, a step B3 of outputting the random numbers, a step B4 of carrying out the random number dependent conditional branch determining operation, a step B5 of carrying out one encrypting stage of the encrypting operation, a step B6 of determining the end of the encrypting operation, and a step B7 of outputting a ciphertext.

Next, the operation of the whole encrypting apparatus according to the second embodiment will be described in detail with reference to FIG. 4.

First, a plaintext which should be encrypted is supplied from the input unit 310 to the encrypting operation section 321 in the encryption processing unit 320 (at a step B1 of FIG. 4).

The encrypting operation section 321 outputs the encrypting stage data of the encrypting operation by the encrypting operation section 321 to the random number dependence determining section 322 as the encrypting stage data at a previous encrypting stage.

The random number dependence determining section 322 determines based on the encrypting stage data at the previous encrypting stage of the encrypting operation, whether or not the current encrypting stage of the encrypting operation is the stage to determine a random number dependent conditional branch. When the current encrypting stage is determined to be the stage to determine the random number dependent conditional branch, the random number dependence determining section 322 outputs the conditional branch determining request to the conditional branch control section 323.

The conditional branch control section 323 determines whether or not the conditional branch determining request is outputted from the random number dependence determining section 122 (Step B2).

The conditional branch control section 323 receives the conditional branch determining request, and sends the random number generating request to the random number generating unit 340, when it is determined at the step B2 that the conditional branch determining request is outputted. Also, the conditional branch control section 323 receives the random numbers outputted from the random number generating unit 340 based on the conditional branch determining request (Step B3).

The conditional branch control section 323 carries out the random number dependent conditional branch determining operation based on the random numbers, to select one to be actually carried out of a plurality of processing procedures which have the same output result in dependence on the received random numbers (Step B4).

The encryption operation section 321 carries out the encrypting operation for a single stage when the random number dependent conditional branch determining operation of the step B4 is ended, or when it is determined at the step B2 that the conditional branch determining request is not outputted (Step B5).

The encrypting operation section 321 determines whether or not the encrypting operation is ended, after the encrypting operation is executed for the single stage (Step B6).

The encrypting operation section 321 outputs a ciphertext to the output unit 350, when it is determined at the step B6 that the encrypting operation is ended (Step B7). In this way, the whole processing ends.

On the other hand, when the encrypting operation section 321 determines at the step B6 that the encrypting operation does not end, the control returns to the step B2 to continue the encrypting operation.

In the second embodiment, the order and kind of the encrypting operation to be executed is changed based on the random numbers. Therefore, the encrypting operation procedures carried out in the encryption processing unit 320 are different depending on the random numbers. Thus, it is difficult to determine which of the encrypting operations corresponds to the change of the consumption power, even if the change of the consumption power is measured. Therefore, the encrypting apparatus has the endurance to the cryptanalysis such as the simple power analysis and the power differential analysis.

(3) Third Embodiment

Figure 5:
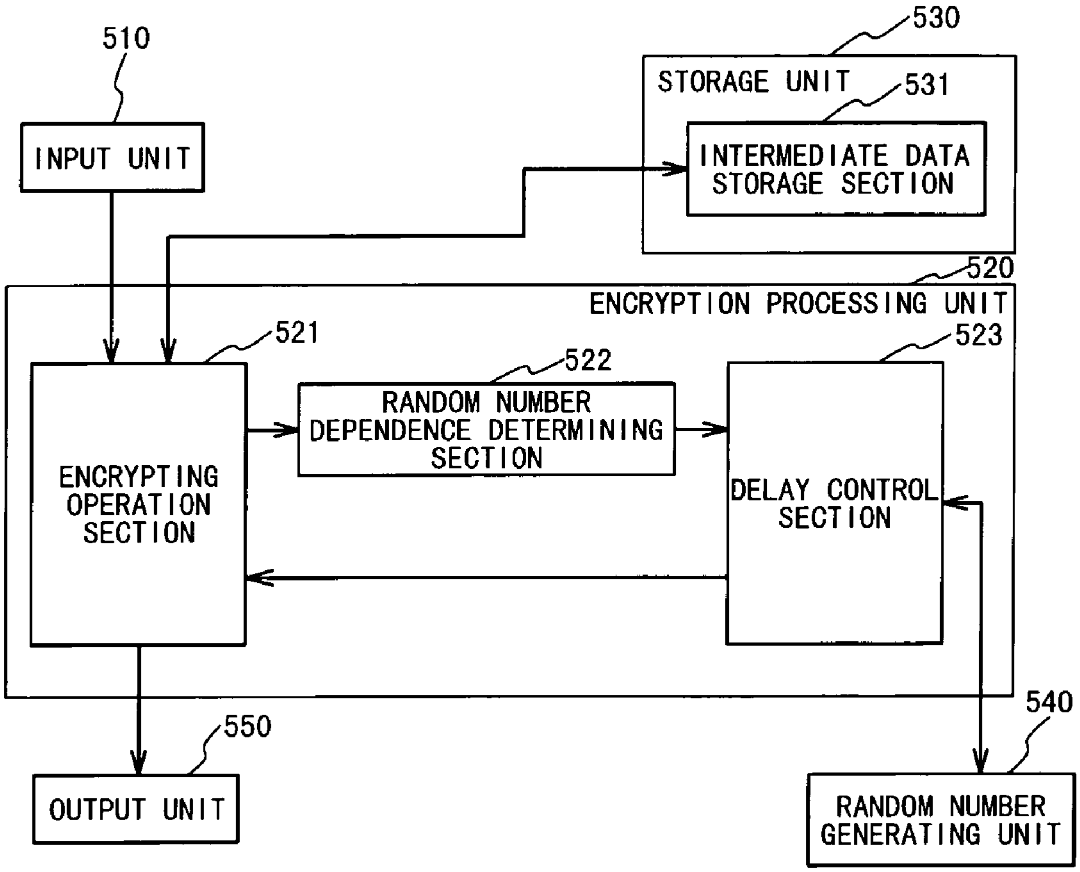
FIG. 5 is a block diagram showing the structure of the encrypting apparatus according to a third embodiment of the present invention.

FIG. 5 is a block diagram showing the structure of the encrypting apparatus according to the third embodiment of the present invention.

Referring to FIG. 5, the encrypting apparatus in the third embodiment is composed of an input unit 510, an encryption processing unit 520, a storage unit 530, a random number generating unit 540 and an output unit 550. The encryption processing unit 520 is composed of an encrypting operation section 521, a random number dependence determining section 522 and a delay control unit 523.

The input unit 510 supplies a plaintext as the object of an encrypting operation to the encryption processing unit 520.

The encryption processing unit 520 encrypts the plaintext supplied from the input unit 510, based on the random numbers supplied from the random number generating unit 540 using an encrypt key stored in the encryption processing unit 520 so that a ciphertext is outputted from the output unit 550.

The encrypting operation section 521 encrypts the plaintext supplied from the input unit 510 using the encrypt key stored in the encrypting operation section 521. The encrypting operation section 521 outputs encryting state data indicating the encrypting state at each of a plurality of encrypting stages of the encrypting operation to the random number dependence determining section 522. The encrypting operation section 521 receives a random number dependent execution delay time changing request from the delay control unit 523. The encrypting operation section 521 executes the encrypting operation while changing the encrypting state at each of the plurality of processing stages of the encrypting operation. The encrypting operation section 521 finally outputs the ciphertext obtained by encrypting the plaintext.

It should be, noted that the encrypting operation section 521 sends the current encrypting stage of the encrypting operation by the encrypting operation section 521 at each of the plurality of encrypting stages during the execution of the encrypting operation to the random number dependence determining section 522. Thus, the processing state of the encrypting operation can be changed in dependence on the random numbers with the appropriate stage.

The random number dependence determining section 522 determines whether or not the delay time determining request should be outputted to the delay control section 523, based on the encrypting operation state data from the encrypting operating section 521. The random number dependence determining section 522 outputs the delay time determining request to the delay control section 523, when it is determined that the delay time determining request should be outputted, that is, when the current processing stage of the encrypting operation is determined to be the stage to which a random number dependent operation should be applied.

The delay control unit 523 sends the delay time determining request to the random number generating unit 540, when the delay time determining request is supplied from the random number dependence determining section 522. Then, the delay control unit 523 generates a random number generating request to the random number generating unit 540. The random number generating unit 540 generates the random numbers. Thus, the delay control unit 523 acquires the random numbers. The delay control unit 523 carries out the random number dependent delay inserting operation based on the acquired random numbers. That is, the delay control unit 523 carries out the operation to determine the execution delay time during the encrypting operation and to intentionally insert the determined delay into the encrypting operation.

It should be noted that the delay control unit 523 controls the random number dependence delay time inserting operation by the encrypting operation section 521 in the encrypting operation. The insertion of the delay time does not influence the data necessary for the encrypting operation. Therefore, the ciphertext finally outputted from the encrypting operation section 521 does not depend on the random numbers outputted rom the random numbers generating section 540.

The storage unit 530 is composed of an intermediate data storage section 531. The intermediate data storage section 531 stores the intermediate data to be held in the encrypting operation by the encryption processing unit 520.

The random number generating unit 540 generates the random numbers in response to the random number generating request from the encryption processing unit 520 to outputs to the encryption processing unit 520.

Figure 6:
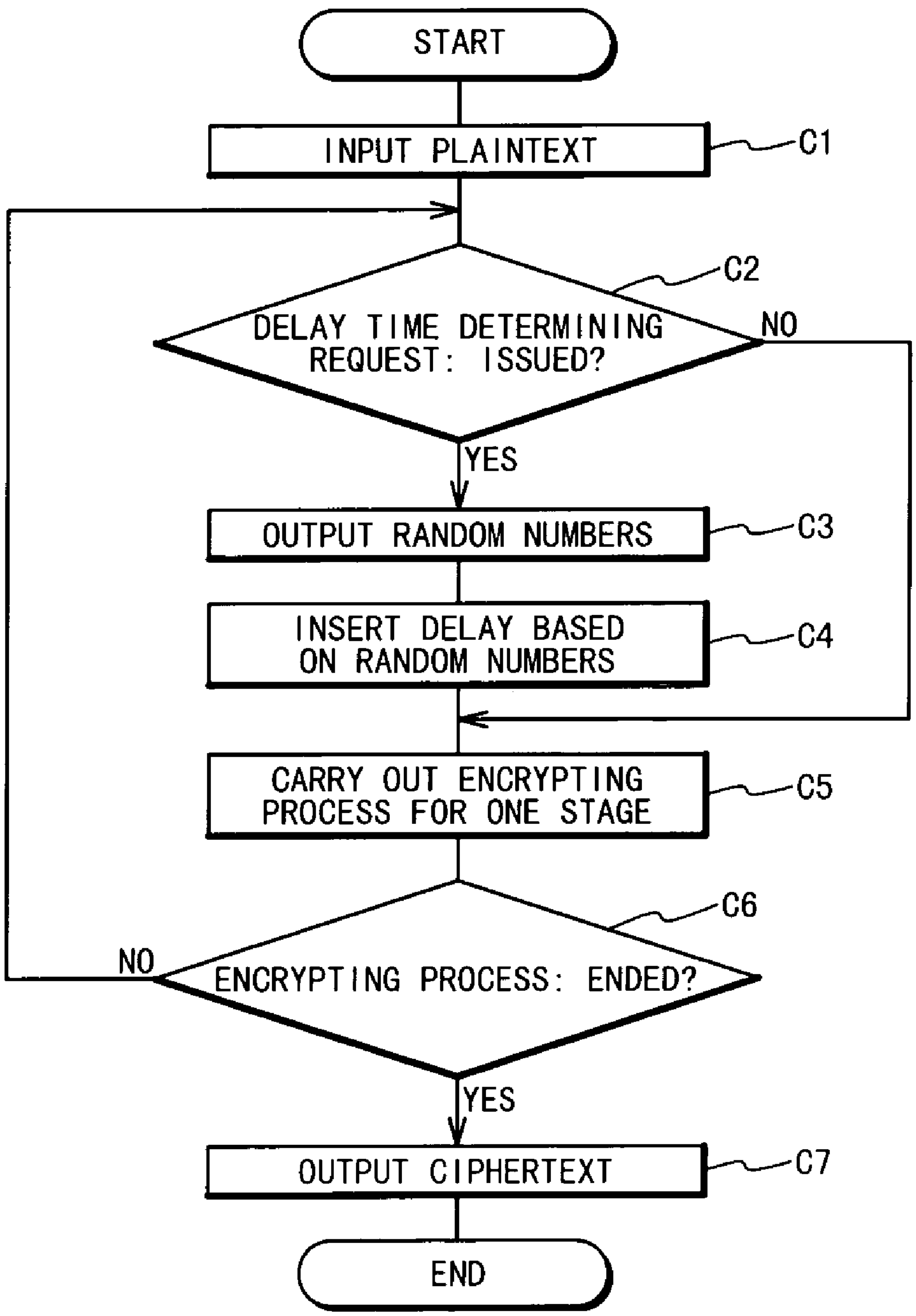
FIG. 6 is a flow chart showing the process of the encrypting apparatus-according to the third embodiment of the present invention.

FIG. 6 is a flow chart showing the processing of the encrypting apparatus in the third embodiment. The processing is composed of a step C1 of supplying a plaintext, a step C2 of determining existence or non-existence of the delay time determining request, a step C3 of outputting the random numbers, a step C4 of carrying out the random number dependent delay time inserting operation, a step C5 of carrying out one encrypting stage of the encrypting operation, a step C6 of determining the end of the encrypting operation, and a step C7 of outputting a ciphertext.

Next, the operation of the whole encrypting apparatus according to the third embodiment will be described in detail with reference to FIG. 5 and FIG. 6.

First, a plaintext which should be encrypted is supplied from the input unit 510 to the encrypting operation section 521 in the encryption processing unit 520 (at a step C1 of FIG. 6).

The encrypting operation section 521 outputs the stage data of the encrypting operation by the encrypting operation section 521 to the random number dependence determining section 522 as the stage data at a previous stage.

The random number dependence determining section 522 determines based on the encrypting stage data of the encrypting operation, whether or not the current encrypting stage of the encrypting operation is the stage to insert the delay time in dependence on the radom numbers. When the current encrypting stage is determined to be the stage to insert the delay time in dependence on the random numbers, the random number dependence determining section 522 outputs the delay time determining request to the delay control section 523.

The delay control section 523 determines whether or not the delay time determining request is outputted from the random number dependence determining section 522 (Step C2).

The conditional branch control section 523 receives the delay time determining request and sends the delay time determining request to the random number generating unit 540, when it is determined at the step C2 that the delay time determining request is outputted. Also, the delay LI control section 523 receives the random numbers outputted from the random number generating unit 540 based on the delaytime determining request (Step C3).

The conditional branch control section 523 receives the random numbers and carries out the random number dependent delay time determining operation, and then requests the encrypting operation section 521 to intentionally insert the determined delay time in the encrypting operation (Step C4).

The encryption operation section 521 executes the encrypting operation for a single stage when the random number dependent delay time determining operation of the step C4 is ended, or when it is determined at the step C2 that the delay time determining request is not outputted (Step C5).

The encrypting operation section 521 determines whether or not the encrypting operation is ended, after the encrypting operation is executed for the single stage (Step C6).

The encrypting operation section 521 outputs a ciphertext to the output unit 550 when it is determined at the step C6 that the encrypting operation is ended (Step C7). In this way, the whole processing ends.

On the other hand, when the encrypting operation section 521 determines at the step C6 that the encrypting operation does not end, the control returns to the step C2 to continue the encrypting operation.

In the third embodiment, the random number dependent delay time is appropriately inserted in the encrypting operation. Therefore, the process time effective for the cryptoanalysis is continuously changed. Thus, it is difficult to determine which of the process times is effective for the cryptoanalysis. Therefore, the encrypting apparatus has the endurance to the cryptoanalysis such as the simple power analysis and the power differential analysis.

It should be noted that in the above first to third embodiments, the encrypt key is previously stored in the encrypting operation section (the encrypting operation section 121 in FIG. 1, the encrypting operation section 321 in FIG. 3 and the encrypting operation section 521 in FIG. 5). However, the encrypt key may be supplied to the encrypting operation section from the input unit (input unit 110 in FIG. 1, input unit 310 in FIG. 3 and input unit 510 in FIG. 5), in the encrypting apparatus in the above-mentioned embodiments. In this case, the encrypting operation section is supplied with the encrypt key and encrypts one or more plaintexts supplied thereto using the encrypt key and outputs one or more ciphertexts. In the above structure, because the encrypt key can be supplied from outside, the encrypt key can be easily updated without changing the encrypting operation section itself.

Also, in the encrypting apparatus according to the above-mentioned first, second and third embodiments, it is possible to use data (the plaintext) itself which is supplied to the encryption processing unit (the encryption processing unit 120 in FIG. 1, the encryption processing unit 320 in FIG. 3 and the encryption processing unit 520 in FIG. 5) from the input unit or a data dependent on the data in place of the random numbers outputted from the random number generating unit (the random number generating unit 140 in FIG. 1, the random number generating unit 340 in FIG. 3 and the random number generating unit 540 in FIG. 5). The reason why the plaintext can be used as the "random numbers" and is effective in this way is that a cryptanalysis method proposed at present such as the simple power analysis and the power differential analysis is carried out based-on the ciphertext and the power consumption. The plaintext is not used for the cryptanalysis method. Therefore, the plaintext can be used in place of the random numbers. It should be noted that the fact that "the data dependent on the plaintext" is used in place of the random numbers contains that the plaintext supplied from the input unit is encrypted by use of "another random number output key" in place of the encrypt key and the encrypting result is used in place of the random numbers. Such an encrypting apparatus using the output of the encryption of the plaintext is contained in the present invention.

(4) Fourth Embodiment

Figure 7:
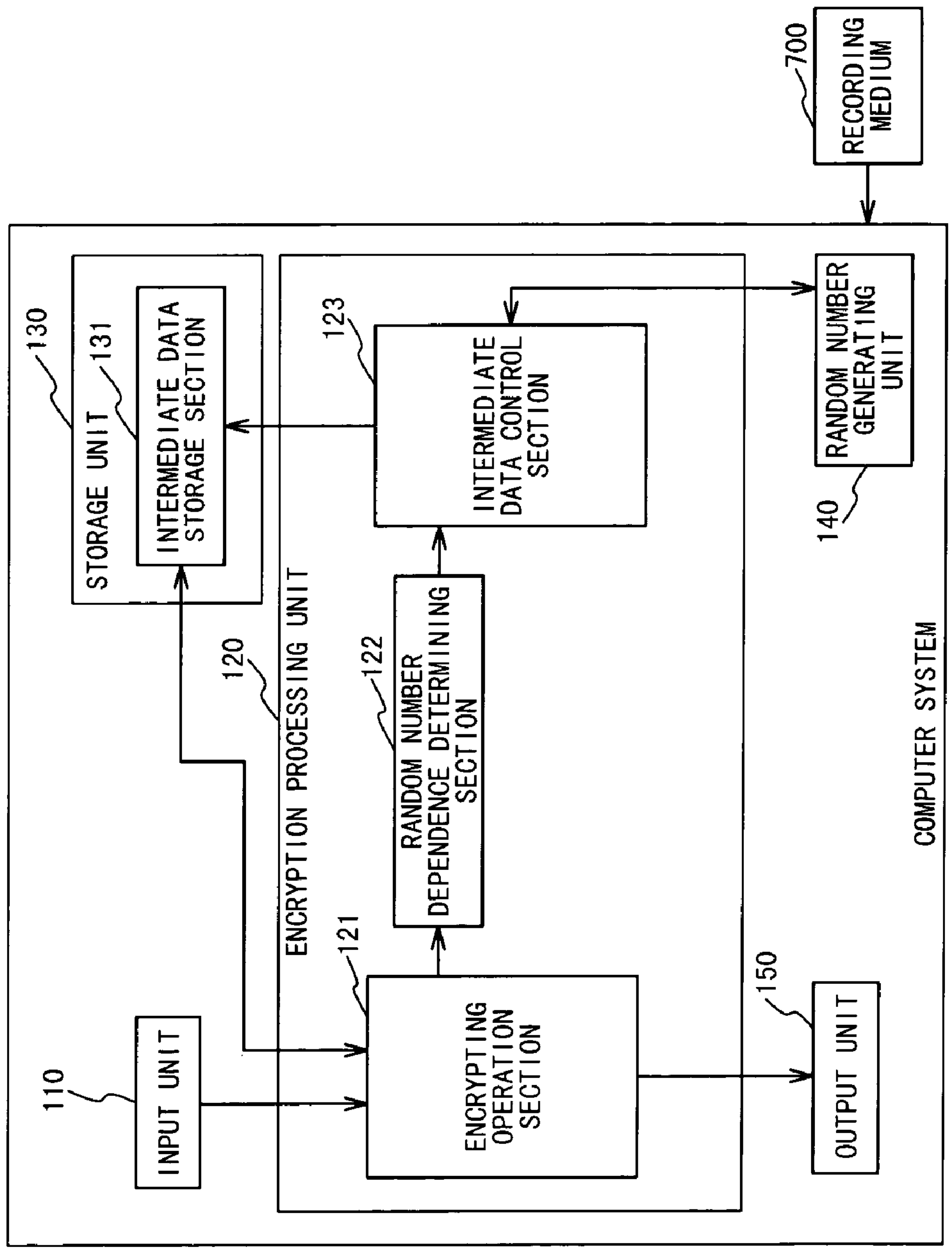
FIG. 7 is a block diagram showing the structure of the encrypting apparatus according to the fourth embodiment of the present invention.

FIG. 7 is a block diagram showing the structure of the encrypting apparatus according to the fourth embodiment of the present invention.

Referring to FIG. 7, the encrypting apparatus in the fourth embodiment is different from that of the first embodiment shown in FIG. 1 in the point that a recording medium 700 is provided to store a program for the encrypting operation by the encrypting apparatus. The recording medium 700 may be a magnetic disk, a semiconductor memory, or a CD-ROM (Compact Disk-Read Only Memory).

The encrypting operation program is read from the recording medium 700 into a computer system. The computer system is controlled based on the encrypting operation program to realize the input unit 110, the encryption processing unit 120 (the encrypting operation section 121, the random number dependence determining section 122 and the intermediate data control section 123), the storage unit 130 (the intermediate data storage section 131), the random number generating unit 140 and the output unit 150. The operations of the input unit 110, encryption processing unit 120, storage unit 130, random number generating unit 140 and output unit 150 are the same as those of the first embodiment. Therefore, the detailed description is omitted.

(5) Fifth Embodiment

Figure 8:
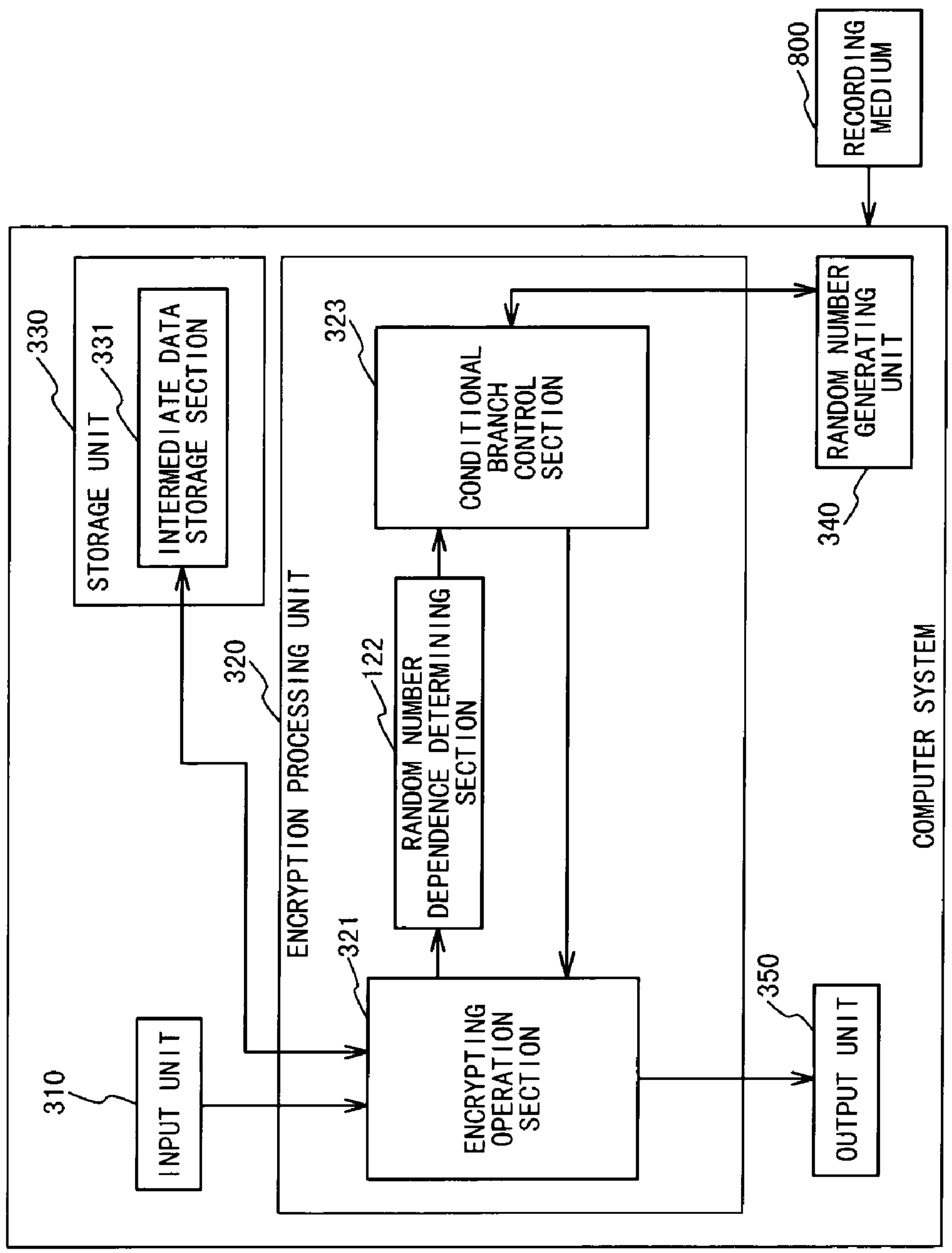
FIG. 8 is a block diagram showing the structure of the encrypting apparatus according to the fifth embodiment of the present invention.

FIG. 8 is a block diagram showing the structure of the encrypting apparatus according to the fifth embodiment of the present invention.

Referring to FIG. 8, the encrypting apparatus in the fifth embodiment is different apparatus in the fifth embodiment is different from that of the first embodiment shown in FIG. 3 in point that a recording medium 800 is provided to store a program for the encrypting operation by the encrypting apparatus. The recording medium 800 may be a magnetic, a semiconductor memory, or a CD-ROM (Compact Disk-Read Only Memory).

The encrypting operation program is read from the recording medium 800 into a computer system. The computer system is controlled based on the encrypting operation program to realize the input unit 310, the encryption processing unit 320 (the encrypting operation section 321, the random number dependence determining section 322 and the conditional branch control section 323), the storage unit 330 (the intermediate data storage section 331), the random number generating unit 140 and the output unit 350. The operations of the input unit 310, encryption processing unit 320, storage unit 330, random number generating unit 140 and output unit 350 are the same as those of the second embodiment. Therefore, the detailed description is omitted.

(6) Sixth Embodiment

Figure 9:
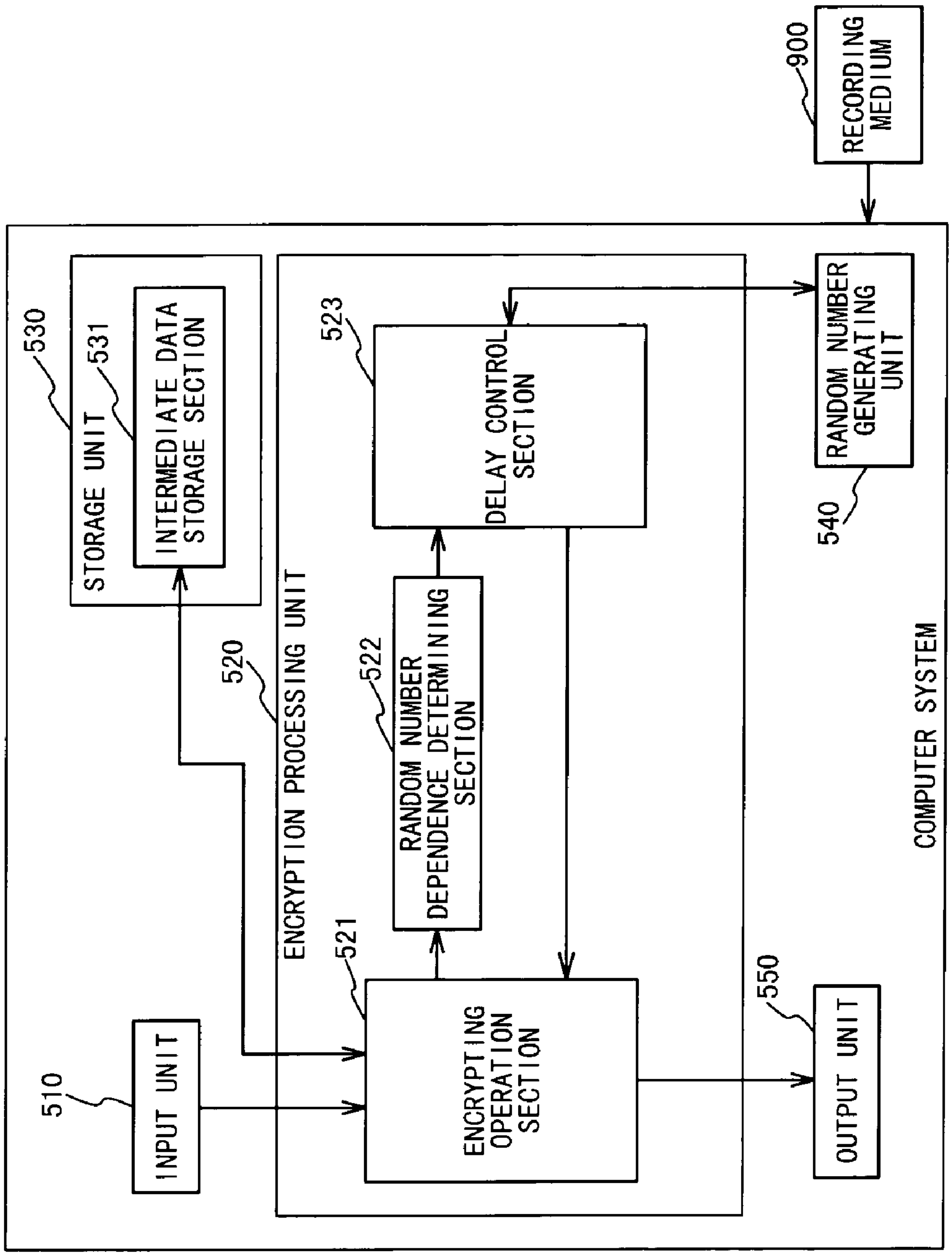
FIG. 9 is a block diagram showing the structure of the encrypting apparatus according in to the sixth embodiment of the present invention.

FIG. 9 is a block diagram showing the structure of the encrypting apparatus according to the sixth embodiment of the present invention.

Referring to FIG. 9, the encrypting apparatus in the fifth embodiment is different from that of the first embodiment shown in FIG. 5 in the point that a recording medium 900 is provided to store a program for the encrypting operation by the encrypting apparatus. The recording medium 900 may be a magnetic disk, a semiconductor memory, or a CD-ROM (Compact Disk-Read Only Memory).

The encrypting operation program is read from the recording medium 900 into a computer system. The operation of the computer system is controlled based on the encrypting operation program to realize the input unit 510, the encryption processing unit 520 (the encrypting operation section 521, the random number dependence determining section 522 and the delay control section 523), the storage unit 530 (the intermediate data storage section 531), the random number generating unit 540 and the output unit 550. The operations of the input unit 510, encryption processing unit 320, storage unit 530, random number generating unit 540 and output unit 550 are the same as those of the third embodiment. Therefore, the detailed description is omitted.

(7) Seventh Embodiment

Figure 10:
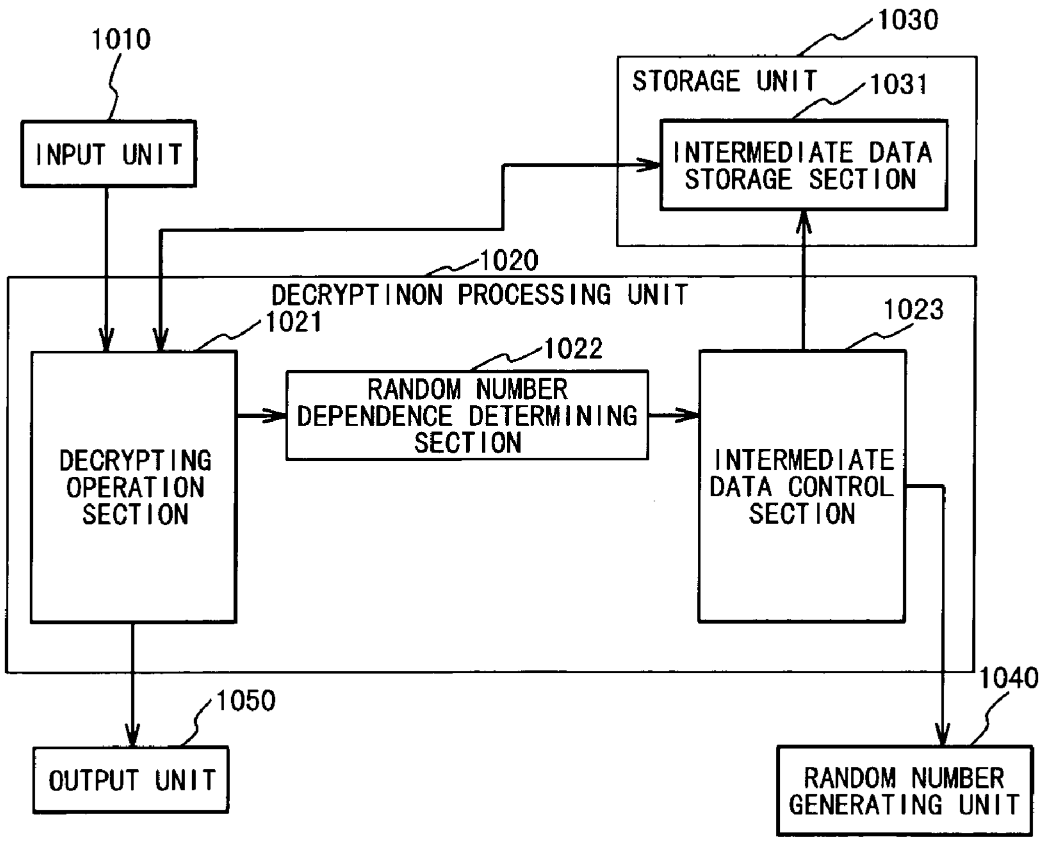
FIG. 10 is a block diagram showing the structure of a decrypting apparatus according to the seventh embodiment of the present invention.

FIG. 10 is a block diagram showing the structure of a decrypting apparatus according to the seventh embodiment of the present invention.

Referring to FIG. 10, the decrypting apparatus according to the seventh embodiment is composed of an input unit 1010, a decryption processing unit 1020, a storage unit 1030 composed of an intermediate data storage section 1031, a random number generating unit 1040 and an output unit 1050. The decryption processing unit 1020 is composed of a decrypting operation section 1021, a random number dependence determining section 1022, and an intermediate data control section 1023.

The decrypting apparatus according to the seventh embodiment is composed of the input unit, the decryption processing unit, the storage unit, the random number generating unit and the output unit, as in the encrypting apparatus according to the first embodiment. In the first embodiment, a plaintext is supplied from the input unit 110, the encryption processing unit 120 encrypts the plaintext using an encrypt key and a ciphertext is output from the output unit 150. On the other hand, in the seventh embodiment, a ciphertext is supplied from the input unit 1010, the decryption processing unit 1020 carries out the decryption of the ciphertext using a decrypt key stored in the decryption processing unit 1020 and a plaintext is outputted from the output unit 1050.

The decrypting operation in the seventh embodiment is an inverse operation of the encrypting operation in the first embodiment. Therefore, the decrypting operation can be read by exchanging the plaintext and the ciphertext in the flow chart of FIG. 2. The structure and operations other than the above point are the same as those of the first embodiment.

(8) Eighth Embodiment

Figure 11:
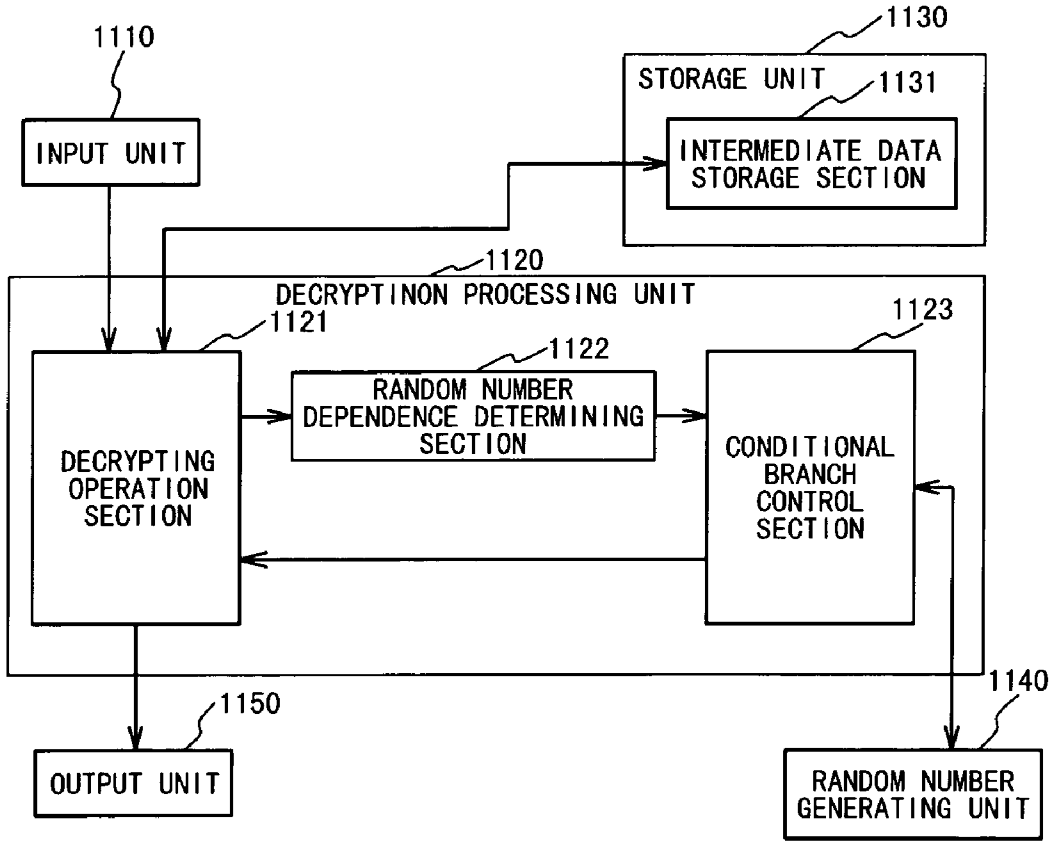
FIG. 11 is a block diagram showing the structure of the decrypting apparatus according to the eighth embodiment of the present invention.

FIG. 11 is a block diagram showing the structure of the decrypting apparatus according to the eighth embodiment of the present invention.

Referring to FIG. 11, the decrypting apparatus according to the eighth embodiment is composed of an input unit 1110, a decryption processing unit 1120, a storage unit 1130 composed of an intermediate data storage section 1131, a random number generating unit 1140 and an output unit 1150. The decryption processing unit 1120 is composed of a decrypting operation section 1121, a random number dependence determining section 1122, and an conditional branch control section 1123.

The decrypt apparatus according to the eighth embodiment is composed of the input unit, the decryption processing unit, the storage unit, the random number generating unit and the output unit, as in the encrypting apparatus according to the second embodiment. In the second embodiment, a plaintext is supplied from the input unit 310, the encryption processing unit 320 encrypts the plaintext using an encrypt key and a ciphertext is output from the output unit 350. On the other hand, in the eighth embodiment, a ciphertext is supplied from the input unit 1110, the decryption processing unit 1120 carries out the decryption of the ciphertext using a decrypt key stored in the decryption processing unit 1120 and a plaintext is outputted from the output unit 1150.

The decrypting operation in the eighth embodiment is an inverse operation of the encrypting operation in the second embodiment. Therefore, the decrypting operation can be read by exchanging the plaintext and the ciphertext in the flow chart of FIG. 4. The structure and the operations other than the above point are the same as those of the second embodiment.

(9) Ninth Embodiment

Figure 12:
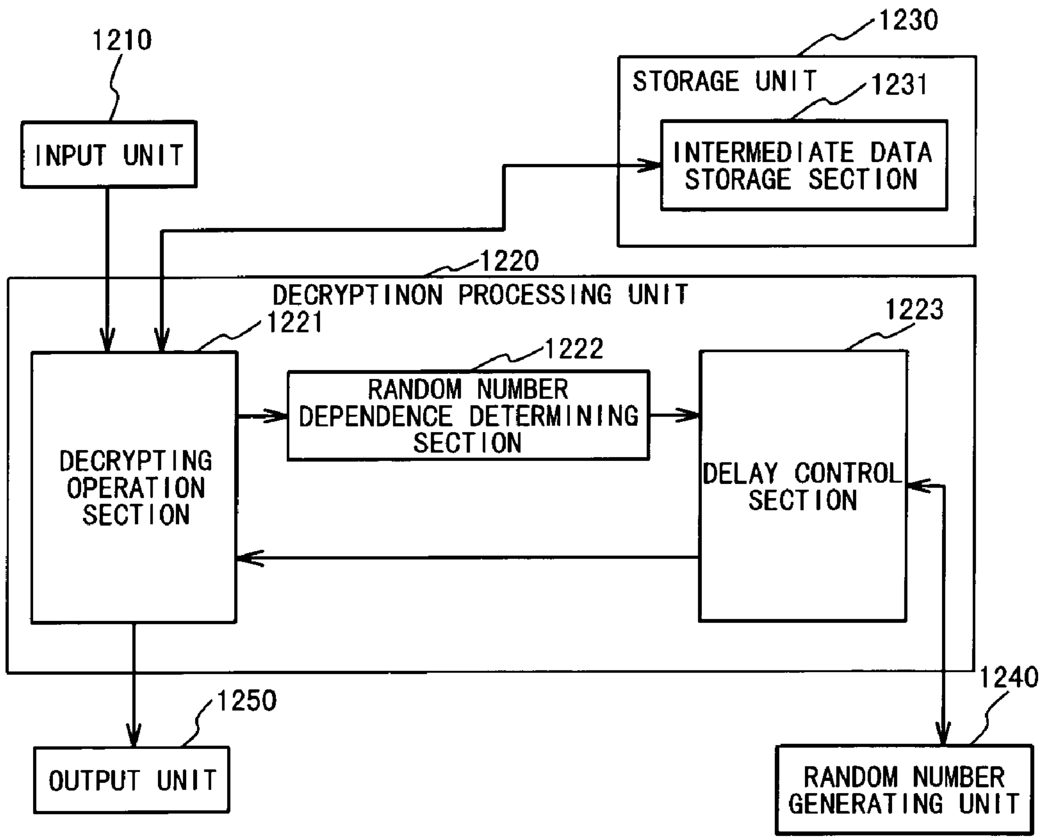
FIG. 12 is a block diagram showing the structure of the decrypting apparatus according to the ninth embodiment of the present invention.

FIG. 12 is a block diagram showing the structure of the decrypting apparatus according to the ninth embodiment of the present invention.

Referring to FIG. 12, the decrypting apparatus according to the ninth embodiment is composed of an input unit 1210, a decryption processing unit 1220, a storage unit 1230 composed of an intermediate data storage section 1231, a random number generating unit 1240 and an output unit 1250. The decryption processing unit 1220 is composed of a decrypting operation section 1221, a random number dependence determining section 1222, and a delay control section 1223.

The decrypt apparatus according to the ninth embodiment is composed of the input unit, the decryption processing unit, the storage unit, the random number generating unit and the output unit as in the encrypting apparatus according to the third embodiment. In the third embodiment, a plaintext is supplied from the input unit 510, the encryption processing unit 520 encrypts the plaintext using an encrypt key and a ciphertext is output from the output unit 550. On the other hand, in the ninth embodiment, a ciphertext is supplied from the input unit 1210, the decryption processing unit 1220 carries out the decryption of the ciphertext using a decrypt key stored in the decryption processing unit 1120 and a plaintext is outputted from the output unit 1250.

The decrypting operation in the ninth embodiment is an inverse operation of the encrypting operation in the third embodiment. Therefore, the decrypting operation can be read by exchanging the plaintext and the ciphertext in the flow chart of FIG. 6. The structure and the operations other than the above point are the same as those of the third embodiment.

It should be noted that in the decrypting apparatus according to the above-mentioned seventh, eighth and ninth embodiments, the decrypt key may be supplied from the input unit (the input unit 1010 in FIG. 10, the input unit 1110 in FIG. 11 or the input unit 1210 in FIG. 12) to the decrypting operation section (decrypting operation section 1021 in FIG. 10, decrypting operation section 1121 in FIG. 11 or decrypting operation section 1221 in FIG. 12).

Also, in the decrypting apparatus according to the above-mentioned seventh, eighth and ninth embodiments, it is possible to use a data (the ciphertext) itself supplied to the decryption processing unit (decryption processing unit 1020 in FIG. 10, decryption processing unit 1120 in FIG. 11 or decryption processing unit 1220 in FIG. 12) from the input unit or a data dependent on the data for the decrypting operation in place of the random numbers outputted from the random number generating unit (the random number generating unit 1040 in FIG. 10, the random number generating unit 1140 in FIG. 11 or the random number generating unit 1240 in FIG. 12).

(10) Tenth Embodiment

Figure 13:
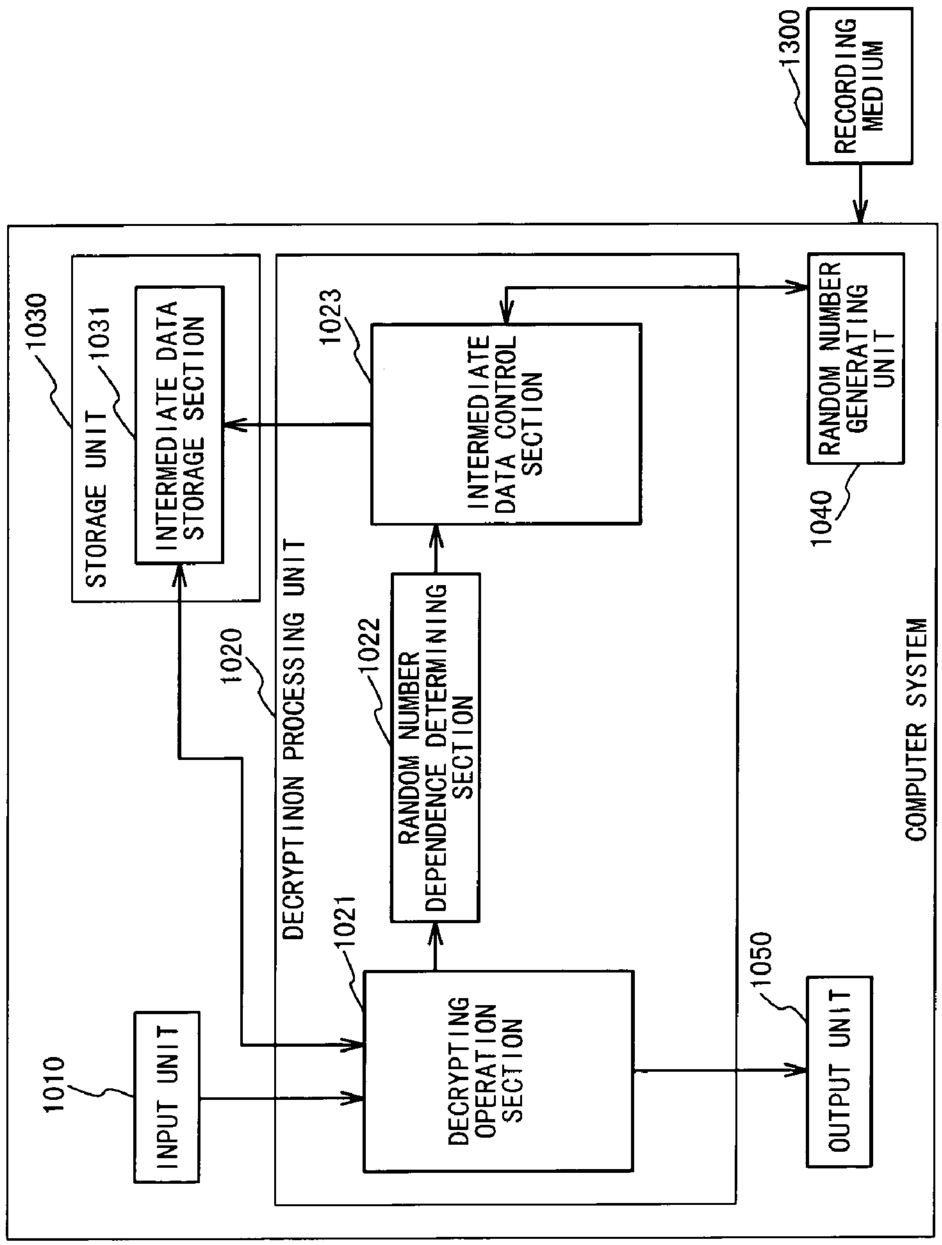
FIG. 13 is a block diagram showing the structure of the decrypt apparatus according to the tenth embodiment of the present invention.

FIG. 13 is a block diagram showing the structure of the decrypting apparatus according to the tenth embodiment of the present invention.

Referring to FIG. 13, the decrypting apparatus in the tenth embodiment shown in FIG. 10 in the point that a recording medium 1300 is provided to store a program for the decrypting process by the decrypting apparatus. The recording medium 1300 may be a magnetic disk, a semiconductor memory, or a CD-ROM (Compact Disk-Read Only Memory).

The decrypting operation program is read from the recording medium 1300 into the computer system. The computer system is controlled based on the decrypting operation program to realize the input unit 1010, the encryption processing a unit 1020 (the encrypting operation section 1021, the random number dependence determining section 1022 and the intermediate data control section 1023), the storage unit 1030 (the intermediate data storage section 1031), the random number generating unit 1040 and the output unit 1050. The operations of the input unit 1010, encryption processing unit 1020, storage unit 1030, random number generating unit 1040 and output unit 1050 are the same as those of the seventh embodiment. Therefore, the detailed description is omitted.

(11) Eleventh Embodiment

Figure 14:
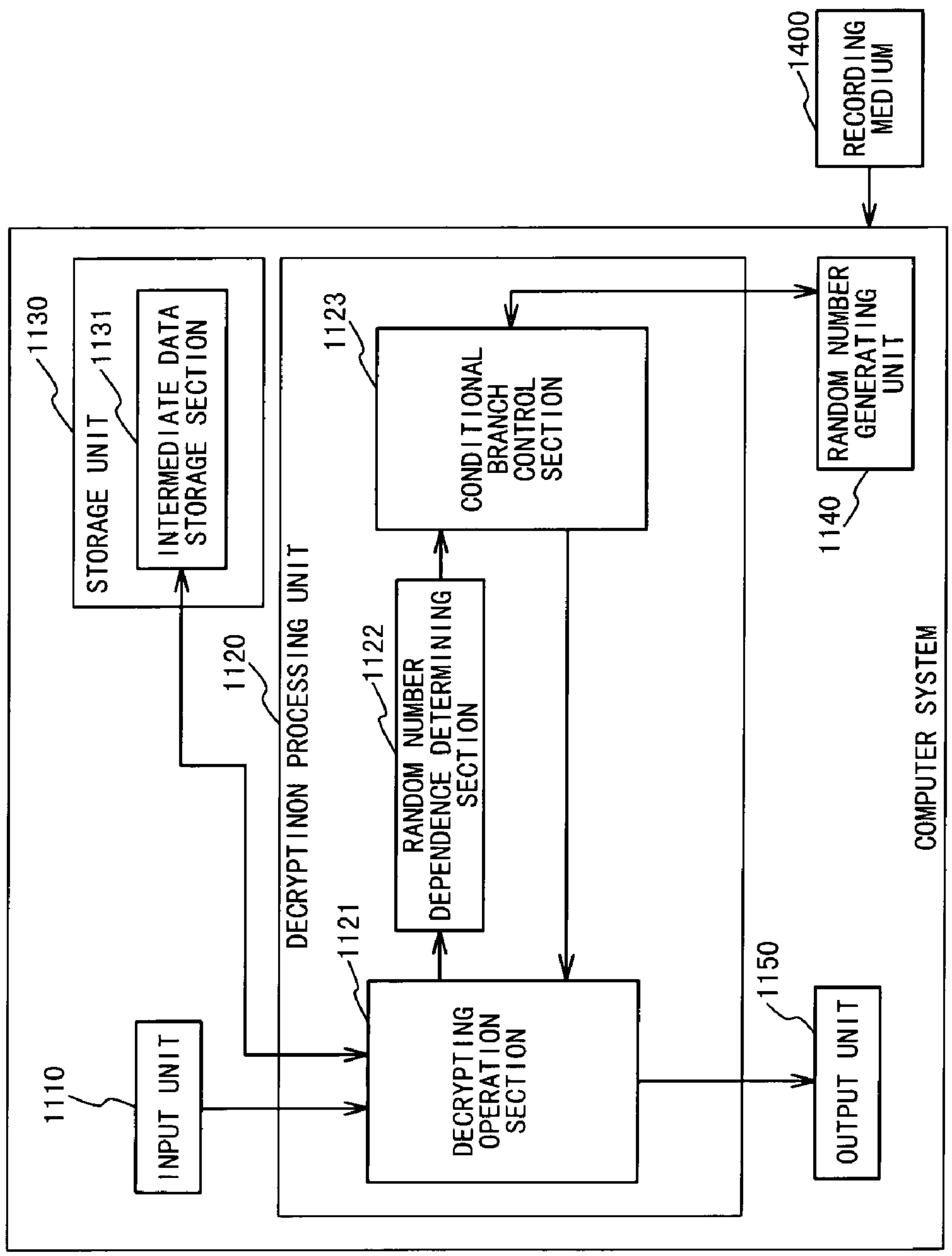
FIG. 14 is a block diagram showing the structure of the decrypting apparatus according to the eleventh embodiment of the present invention.

FIG. 14 is a block diagram showing the structure of the decrypting apparatus according to the eleventh embodiment of the present invention.

Referring to FIG. 14, the decrypting apparatus in the eleventh embodiment is different from that of the eight embodiment shown in FIG. 11 in the point that a recording medium 1400 is provided to store a program for the decrypting operation by the decrypting apparatus. The recording medium 1400 may be a magnetic disk, a semiconductor memory, or a CD-ROM (Compact Disk-Read Only Memory).

The decrypting operation program is read from the recording medium 1400 into a computer system. The computer system is controlled based on the decrypting operation program to realize the input unit 1110, the encryption processing unit 1120 (the encrypting operation section 1121, the random number dependence determining section 1122 and the conditional branch control section 1123), the storage unit 1130 (the intermediate data storage section 1131), the random number generating unit 1140 and the output unit 1150. The operations of the input unit 1110, encryption processing unit 1120, storage unit 1130, random number generating unit 1140 and output unit 1150 are the same as those of the eighth embodiment. Therefore, the detailed description is omitted.

(12) Twelveth Embodiment

Figure 15:
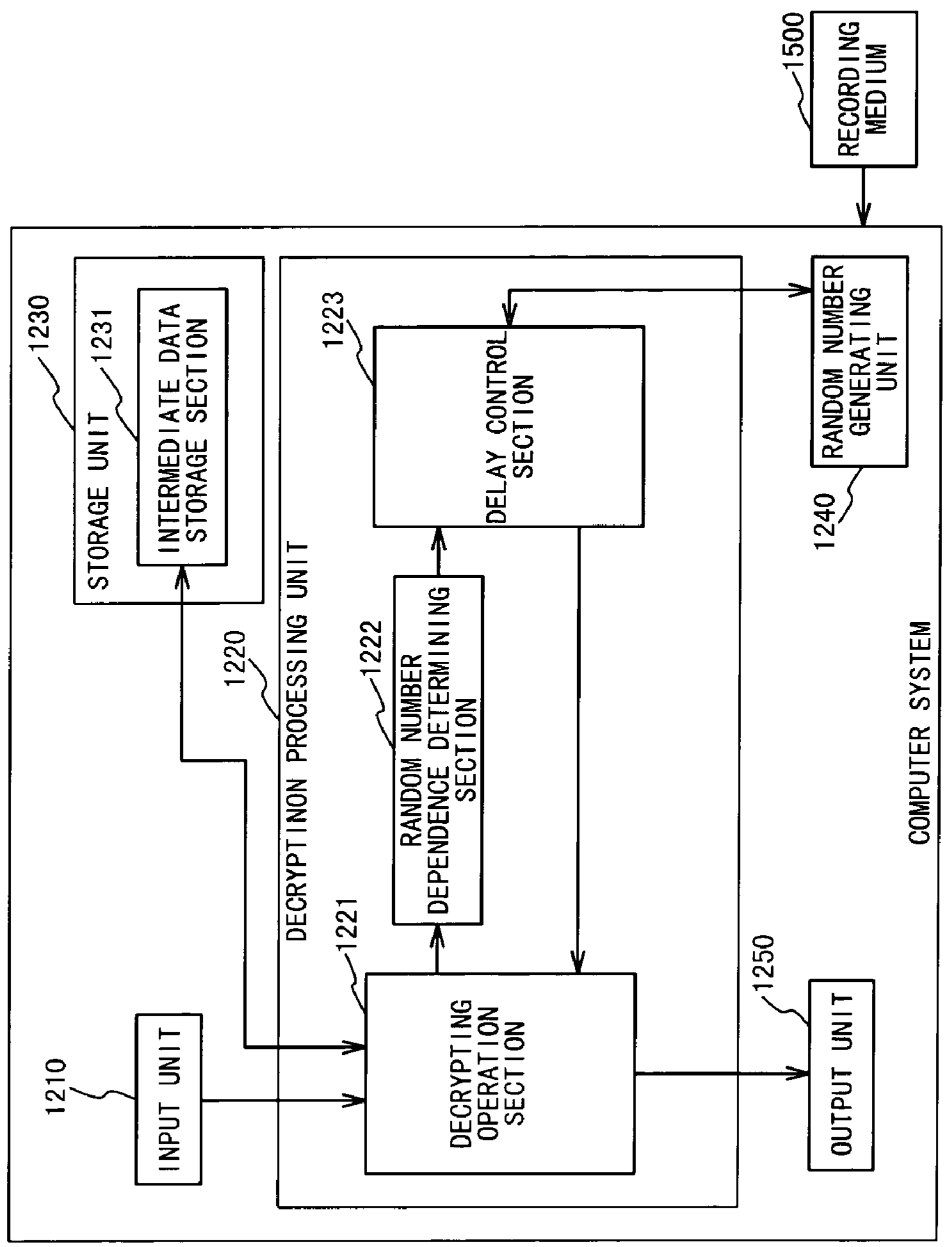
FIG. 15 is a block diagram showing the structure of the decrypting apparatus according to the twelveth embodiment of the present invention.

FIG. 15 is a block diagram showing the structure of the encrypting apparatus according to the twelveth embodiment of the present invention.

Referring to FIG. 15, the decrypting apparatus in the twelfth embodiment is different from that of the ninth embodiment shown in FIG. 12 in the point that a recording medium 1500 is provided to store a program for the decrypting operation by the decrypting apparatus. The recording medium 1500 may be a magnetic disk, a semiconductor memory, or a CD-ROM (Compact Disk-Read Only Memory).

The decrypting operation program is read from the recording medium 1500 into a computer system. The computer system is controlled based on the decrypting operation program to realize the input unit 1210, the encryption processing unit 1220 (the encrypting operation section 1221, the random number dependence determining section 1222 and the delay control section 1223), the storage unit 1230 (the intermediate data storage section 1231), the random number generating unit 1240 and the output unit 1250. The operations of the input unit 1210, encryption processing unit 1220, storage unit 1230, random number generating unit 1240 and output unit 1250 are the same as those of the ninth embodiment. Therefore, the detailed description is omitted.

(13) Thirteenth Embodiment

Figure 16:
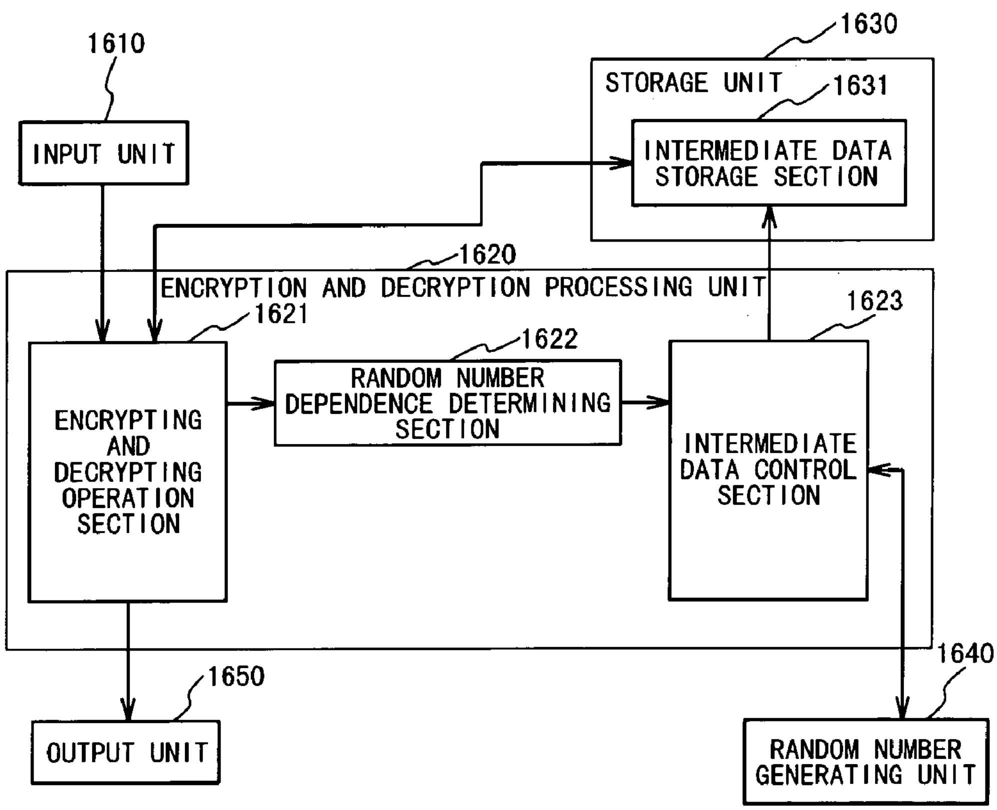
FIG. 16 is a block diagram showing the structure of an encrypting and decrypting apparatus according to the thirteenth embodiment of the present invention.

FIG. 16 is a block diagram showing the structure of an encrypting and decrypting apparatus according to the thirteenth embodiment u: of the present invention.

Referring to FIG. 16, the encrypting and decrypting apparatus according to the thirteen embodiment is composed of an input unit 1610, an encryption and decryption processing unit 1620, a storage unit 1630 composed of an intermediate data storage section 1631, a random number generating unit 1640 and an output unit 1050. The encryption and decryption processing unit 1620 is composed of an encrypting and decrypting operation section 1621, a random number dependence determining section 1622, and an intermediate data control section 1623.

The encrypting and decrypting apparatus according to the thirteenth embodiment has the function of the encrypting apparatus according to the first embodiment and the decrypting apparatus according to the seventh embodiment. The input unit 1610, the random number dependence determining section 1622, the intermediate data control section 1623, the storage unit 1630, the random number generating unit 1640, and the output unit 1650 are the same as those having the same names in the first embodiment and the seventh embodiment.

The encrypting and decrypting operation section 1621 receives a first plaintext or a second ciphertext together with an encrypt instruction or a decryt instruction from the input unit 1610. The encrypting and decrypting operation section 1621 carries out the encrypting operation to the first plaintext in response to the encrypt instruction while changing the encrypting states based on the random number dependent intermediate data changing operation from the intermediate data control section 1623. Also, the encrypting and decrypting operation section 1621 carries out the decrypting process to the first cipher text in response to the decrypt instruction while changing the decrypting states based on the random number dependent intermediate data changing operation from the intermediate data control section 1623. The encrypting and decrypting operation section 1621 encypts the first plaintext into a first ciphertext, which does not depend on the output of the random number generating unit 1640, and outputs the first ciphertext from the output unit 1650. Also, the encrypting and decrypting operation section 1621 decrypts the second ciphertext into a second plaintext, which does not depend on the output of the random number generating unit 1640, and outputs the second plaintext from the output unit 1650.

(14) Fourteenth Embodiment

Figure 17:
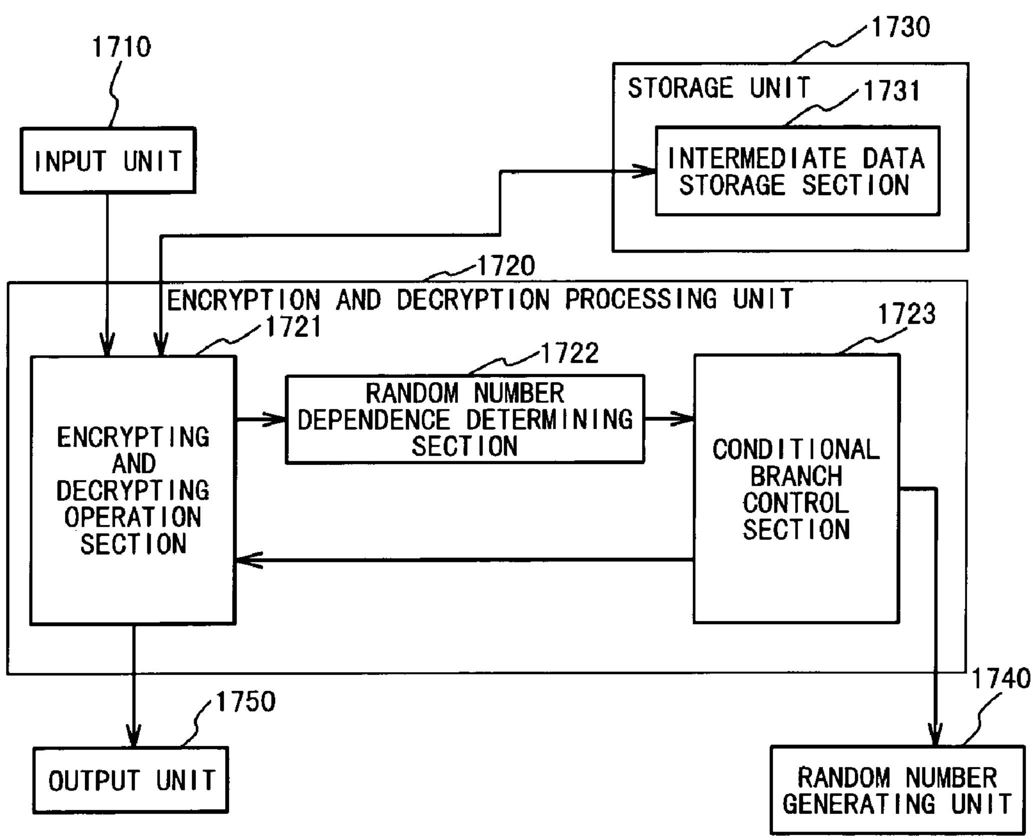
FIG. 17 is a block diagram showing the structure of the encrypting and decrypting apparatus according to the fourteenth embodiment of the present invention.

FIG. 17 is a block diagram showing the structure of an encrypting and decrypting apparatus according to the fourteenth embodiment of the present invention.

Referring to FIG. 17, the encrypting and decrypting apparatus according to the fourteenth embodiment is composed of an input unit 1710, an encryption and decryption processing unit 1720, a storage unit 1730 composed of an intermediate data storage section 1731, a random number generating unit 1740 and an output unit 1750. The encryption and decryption processing unit 1720 is composed of an encrypting and decrypting operation section 1721, a random number dependence determining section 1722, and a conditional branch control section 1723.

The encrypting and decrypting apparatus according to the fourteenth embodiment has the function of the encrypting apparatus according to the second embodiment and the function of the decrypting apparatus according to the eighth embodiment. The input unit 1710, the random number dependence determining section 1722, the intermediate data control section 1723, the storage unit 1730, the random number generating unit 1740, and the output unit 1750 are the same as those having the those in the second embodiment and the eighth embodiment.

The encrypting and decrypting operation section 1721 receives a first plaintext or a second ciphertext together with an encrypt instruction or a decryt instruction from the input unit 1710. The encrypting and decrypting operation section 1721 carries out the encrypting operation to the first plaintext in response to the encrypt instruction while changing the encrypting state based on the random number dependent conditional branch determining operation by the conditional branch control section 1723. Also, the encrypting and decrypting operation section 1721 carries out the decrypting process to the first cipher text in response to the decrypt instruction while changing the decrypting states based on the random number dependent conditional branch determining operation by the conditional branch control section 1723. The encrypting and decrypting operation section 1721 encypts the first plaintext into a first ciphertext which does not depend on the output of the random number generating unit 1740, and outputs the first ciphertext from the output unit 1750. Also, the encrypting and decrypting operation section 1721 decrypts the second ciphertext into a second plaintext, which does not depend on the output of the random number generating unit 1740, and outputs the second plaintext from the output unit 1750.

(15) Fifteenth Embodiment

Figure 18:
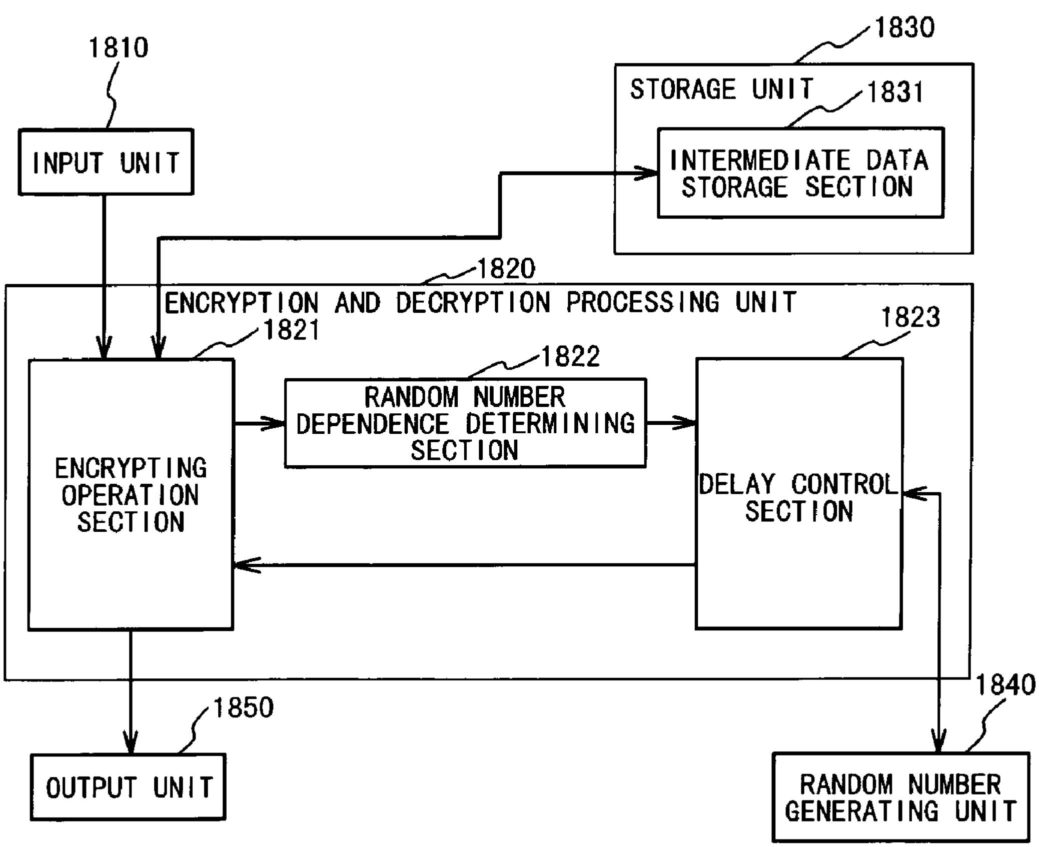
FIG. 18 is a block diagram showing the structure of the encrypting and decrypting apparatus according to the fifteenth embodiment of the present invention.

FIG. 18 is a block diagram showing the structure of an encrypting and decrypting apparatus according to the fifteenth embodiment of the present invention.

Referring to FIG. 18, the encrypting and decrypting apparatus according to the fifteenth embodiment is composed of an input unit 1810, an encryption and decryption processing unit 1820, a storage unit 1830 composed of an intermediate data storage section 1831, a random number generating unit 1840 and an output unit 1750. The encryption and decryption processing unit 1820 is composed of an encrypting and decrypting operation section 1821, a random number dependence determining section 1822, and a delay control section 1823.

The encrypting and decrypting apparatus according to the fifteenth embodiment has the function of the encrypting apparatus according to the third embodiment and the function of the decrypting apparatus according to the ninth embodiment. The input unit 1810, the random number dependence determining section 1822, the delay control section 1823, the storage unit 1830, the random number generating unit 1840, and the output unit 1850 are the same as those in the third embodiment and the ninth embodiment.

The encrypting and decrypting operation section 1821 receives a first plaintext or a second ciphertext together with an encrypt instruction or a decryt instruction from the input unit 1810. The encrypting and decrypting operation section 1821 carries out the encrypting operation to the first plaintext in response to the encrypt instruction while changing the encrypting state based on the random number dependent delay inserting operation by the delay control section 1823. Also, the encrypting and decrypting operation section 1821 carries out the decrypting process to the first cipher text in response to the decrypt instruction while changing the decrypting states based on the random number dependent delay inserting operation by the delay control section 1823. The encrypting and decrypting operation section 1821 encypts the 91 first plaintext into a first ciphertext which does not depend on the output of the random number generating unit 1840, and outputs the first ciphertext from the output unit 1850. Also, the encrypting and decrypting operation section 1821 decrypts the second ciphertext into a second plaintext, which does not depend on the output of the random number generating unit 1840, and outputs the second plaintext from the output unit 1850.

It should be noted that in the encrypting and decrypting apparatus according to the above-mentioned thirteenth, fourteenth and fifteenth embodiments, an encrypt key and a decrypt key may be supplied from the input unit (input unit 1610 in FIG. 16, input unit 1710 in FIG. 17 or input unit 1810 in FIG. 18) to the encrypting and decrypting operation section (the encrypting and decrypting operation section 1621 in FIG. 16, the encrypting and decrypting operation section 1721 in FIG. 17 or the encrypting and decrypting operation section 1821 in FIG. 18).

Also, in the encrypting and decrypting apparatus according to the above-mentioned thirteenth, fourteenth and fifteenth embodiments, it is possible to use a data (the plaintext or ciphertext) itself supplied to the encryption and decryption processing unit (encryption and decryption processing unit 1620 in FIG. 16, encryption and decryption processing unit 1720 in FIG. 17 or encryption and decryption processing unit 1820 in FIG. 18) from the input unit or a data dependent on the supplied data for the encrypting and decrypting operation in place of the random numbers outputted from the random number generating unit (the random number generating unit 1640 in FIG. 16, the random number generating unit 1740 in FIG. 17 or the random number generating unit 1840 in FIG. 18), respectively.

(16) Sixteenth Embodiment

Figure 19:
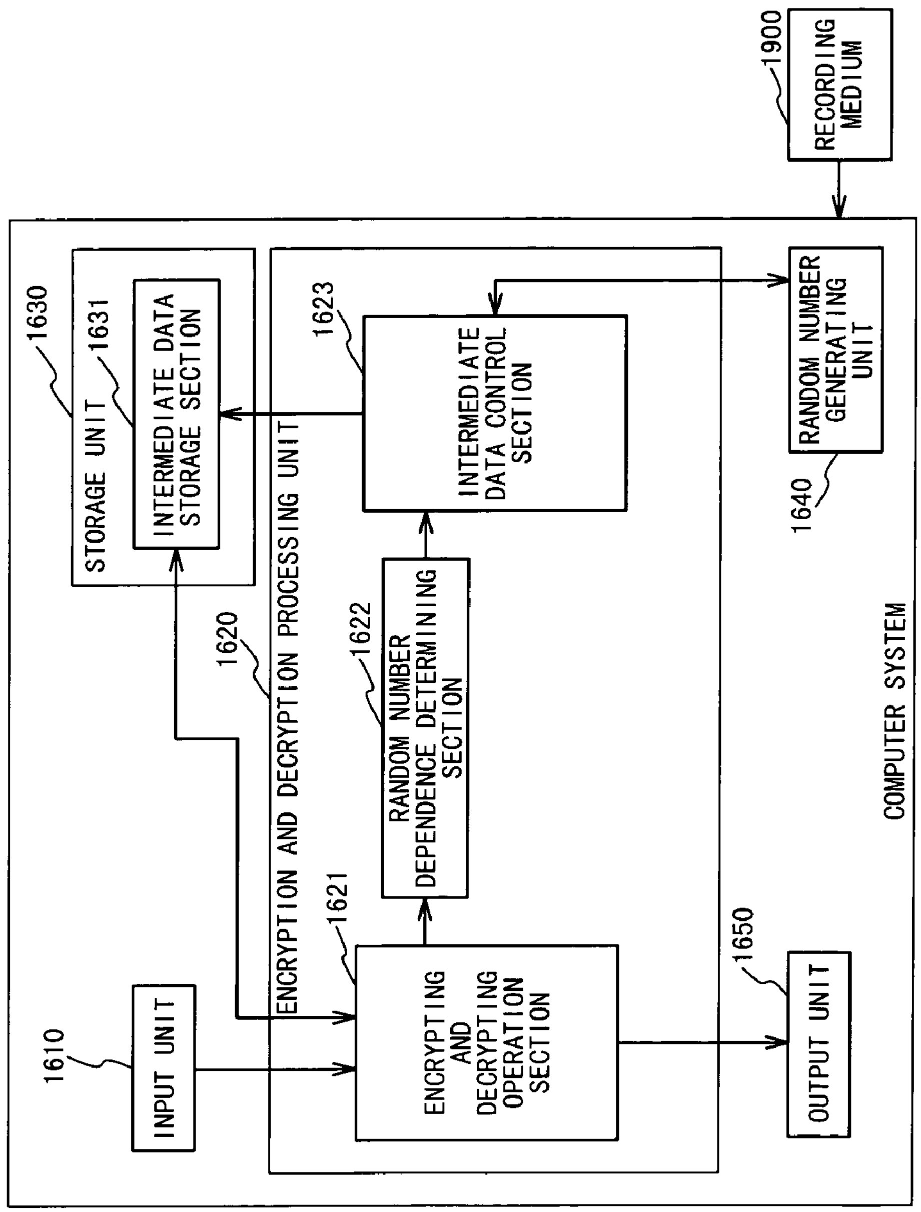
FIG. 19 is a block diagram showing the structure of the encrypting and decrypting apparatus according to the sixteenth embodiment of the present invention.

FIG. 19 is a block diagram showing the structure of the encrypting and decrypting apparatus according to the sixteenth embodiment of the present invention.

Referring to FIG. 19, the encrypting and decrypting apparatus in the sixteenth embodiment is different from that of the thirteenth embodiment shown in FIG. 16 in the point that a recording medium 1900 is provided to store a program for the encrypting and decrypting operation by the encrypting and decrypting apparatus. The recording medium 1500 may be a magnetic disk, a semiconductor memory, or a CD-ROM (Compact Disk-Read Only Memory).

The encrypting and decrypting operation program is read from the recording medium 1900 into a computer system. The computer system is controlled based on the encrypting and decrypting operation program to realize the input unit 1610, the encryption and decryption processing unit 1620 (the encrypting and decrypting operation section 1621, the random number dependence determining section 1622 and the intermediate data control section 1623), the storage unit 1630 (the intermediate data storage section 1631), the random number generating unit 1640 and the output unit 1650. The operations of the input unit 1610, encryption and decryption processing unit 1620, storage unit 1630, random number generating unit 1640 and output unit 1650 are the same as those of the thirteenth embodiment. Therefore, the detailed description is omitted.

(17) Seventeenth Embodiment

Figure 20:
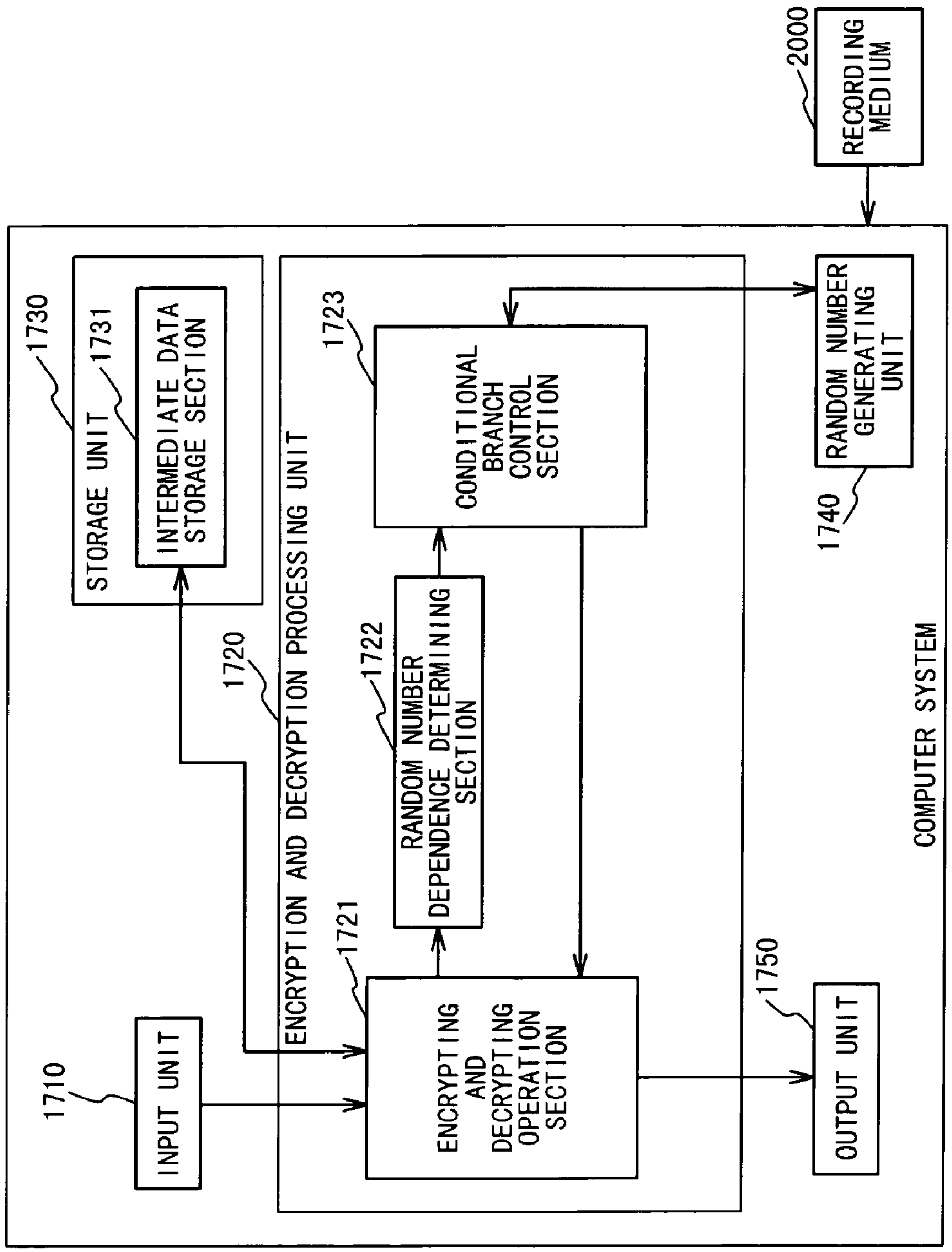
FIG. 20 is a block diagram showing the structure of the encrypting and decrypting apparatus according to the seventeenth embodiment of the present invention.

FIG. 20 is a block diagram showing the structure of the encrypting and decrypting apparatus according to the seventeenth embodiment of the present invention.

Referring to FIG. 20, the encrypting and decrypting apparatus in the seventeenth embodiment is different from that of the fourteenth embodiment shown in FIG. 17 in the point that a recording medium 2000 is provided to store a program for the encrypting and decrypting operation by the encrypting and decrypting apparatus. The recording medium 2000 may be a magnetic disk, a semiconductor memory, or a CD-ROM (Compact Disk-Read Only Memory).

The encrypting and decrypting operation program is read from the recording medium 2000 into a computer system. The computer system is controlled based on the encrypting and decrypting operation program to realize the input unit 1710, the encryption and decryption processing unit 1720 (the encrypting and decrypting operation section 1721, the random number dependence determining section 1722 and the conditional branch control section 1723), the storage unit 1730 (the intermediate data storage section 1731), the random number generating unit 1740 and the output unit 1750. The operations of the input unit 1710, encryption and decryption processing unit 1720, storage unit 1730, random number generating unit 1740 and output unit 1750 are the same as those of the fourteenth embodiment. Therefore, the detailed description is omitted.

(18) Eighteenth Embodiment

Figure 21:
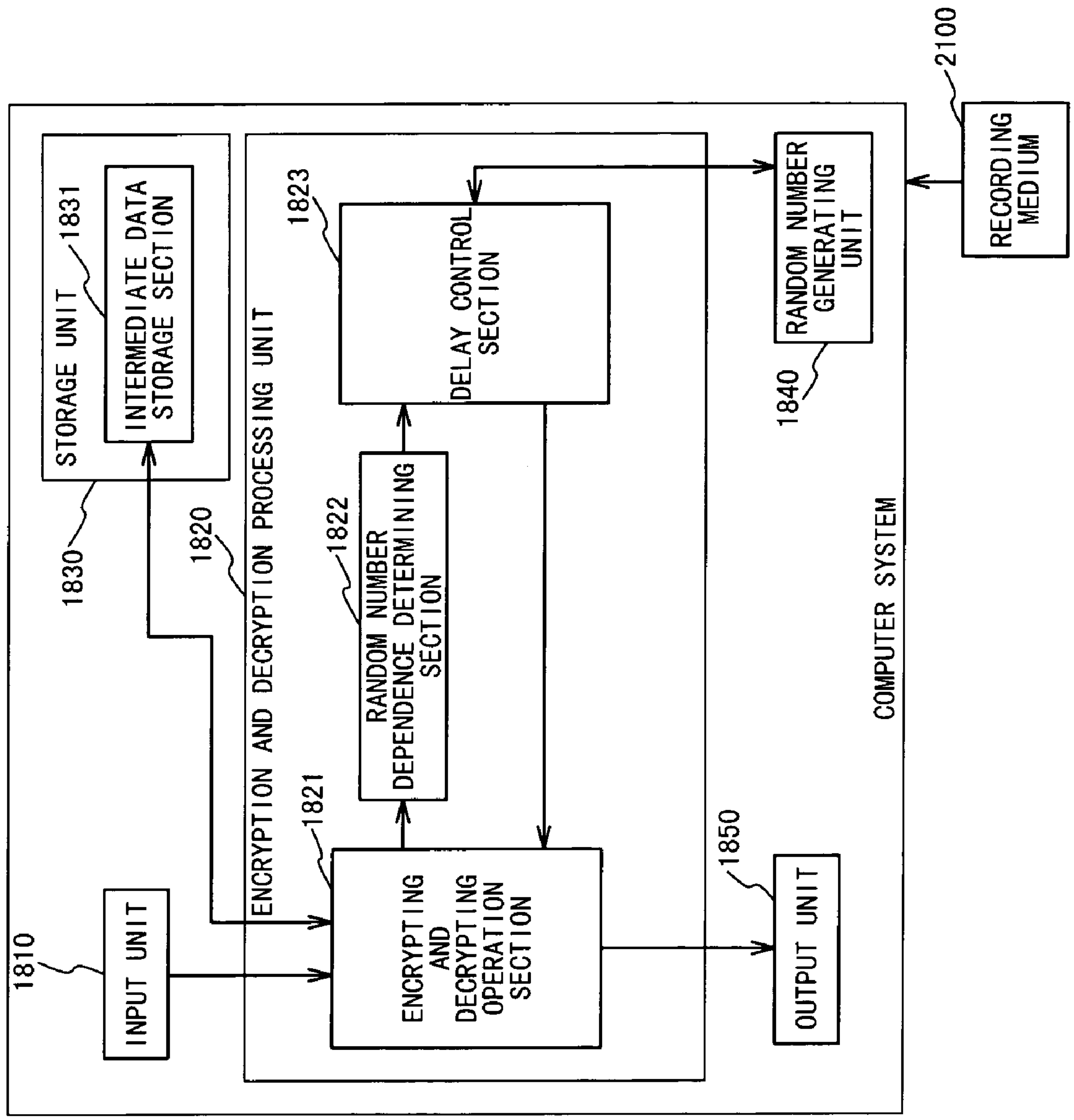
FIG. 21 is a block diagram showing the structure of the encrypting and decrypting apparatus according to the eighteenth embodiment of the present invention.

FIG. 21 is a block diagram showing the structure of the encrypting and decrypting apparatus according to the eighteenth embodiment of the present invention.

Referring to FIG. 21, the encrypting and decrypting apparatus in the eighteenth embodiment is different from that of the fifteenth embodiment shown in FIG. 18 in the point that a recording medium 2100 is provided to store a program for the encrypting and decrypting operation by the encrypting and decrypting apparatus. The recording medium 2100 may be a magnetic disk, a semiconductor memory, or a CD-ROM (Compact Disk-Read Only Memory).

The encrypting and decrypting operation program is read from the recording medium 2100 into a computer system. The computer system is controlled based on the encrypting and decrypting operation program to realize the input unit 1810, the encryption and decryption processing unit 1820 (the encrypting and decrypting operation section 1821, the random number dependence determining section 1822 and the delay control section 1823), the storage unit 1830 (the intermediate data storage section 1831), the random number generating unit 1840 and the output unit 1850. The operations of the input unit 1810, encryption and decryption processing unit 1820, storage unit 1830, random number generating unit 1840 and output unit 1850 are the same as those of the fifteenth embodiment. Therefore, the detailed description is omitted.

First Specific Example of Encrypting Operation

Figure 22:
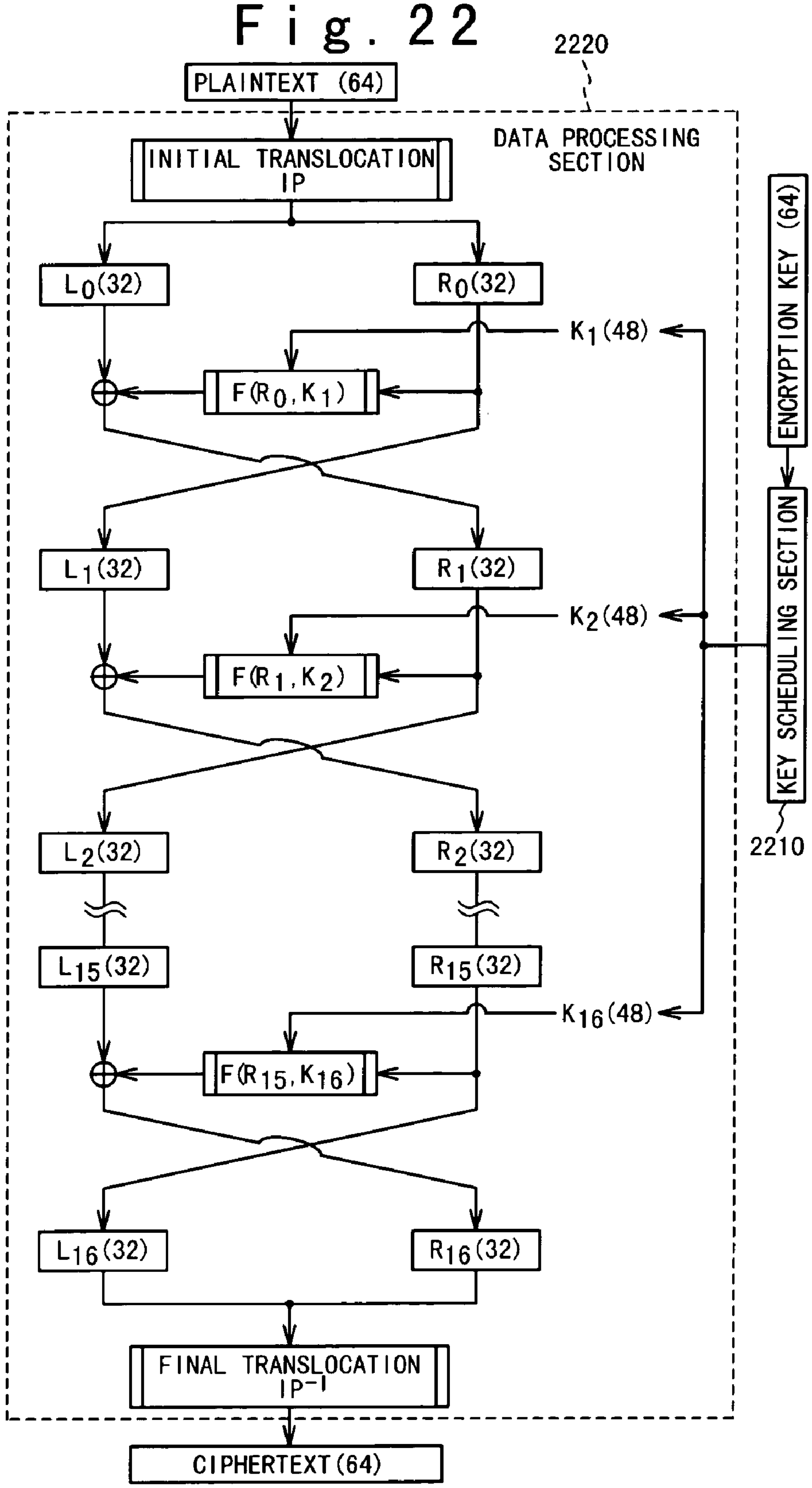
FIG. 22 is a block diagram showing the structure of DES in a first specific example of the encrypting apparatus of the present invention.
Figure 23:
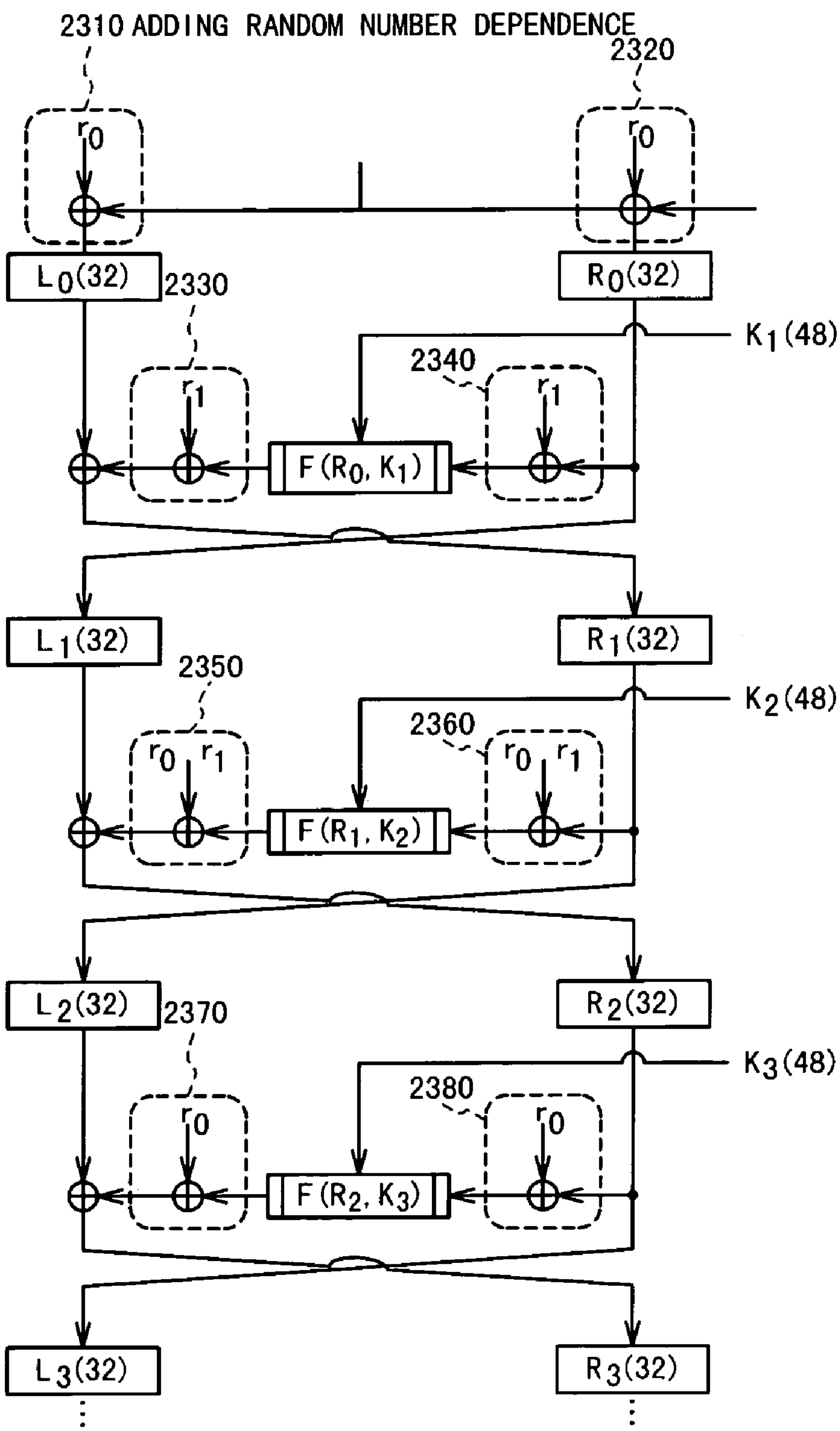
FIG. 23 is a block diagram showing the structure of an encrypting operation section according to the first specific example of the encrypting apparatus of the present invention.

FIG. 22 and FIG. 23 are diagrams to describe a first specific example of the encrypting apparatus of the present invention. In the encrypting apparatus according to the above-mentioned first specific example, a common key cipher DES (Data Encryption Standard) is used. It should be noted that the DES cipher is described in "Handbook of Applied Cryptography" by A. Menezes, P. Oorschot, and S. Vanstone (CRC Press, 1997, ISBN 0-8493-8523-7, pp. 250–259).

Here, the outline of the structure and operation of the DES is first shown using FIG. 22.

DES is composed of a key scheduling section 2210 and a data processing section 2220. The key scheduling section 2210 receives a 64-bit encrypt key and outputs 16 48-bit intermediate keys $K_1$ to $K_{16}$. The data processing section 2220 is composed of an initial translocation IP, the last translocation $IP^{-1}$ and 16 F functions. The data processing section 2220 receives a 64-bit plaintext and the 16 48-bit intermediate keys $K_1$ to $K_{16}$ from the key scheduling section 2210 and outputs a 64-bit ciphertext. Here, the IP translocation and the $IP^{-1}$ translocation are the functions to rearrange the previously set bits. The 16 F function is a predetermined function to receive a 32-bit data and a 48-bit data to output a 32-bit data.

The encryption of the plaintext into the ciphertext is carried out as follows.

First, an initial translocation IP is applied to a plaintext. Then, the plaintext is divided into an upper 32-bit set L0 and a lower 32-bit set R0. Subsequently, $L_1$, $R_1$, $L_2$, $R_2$, $L_3$, $R_3$, . . . $L_{15}$, $R_{15}$, $L_{16}$, and $R_{16}$ are generated in accordance with the following equation (1) from these sets of L0 and R0.

$$L_n = R_{n-1}$$

$$R_n = L_{n-1} \oplus F(R_{n-1}, K_n) \quad (1)$$

where n=1, 2, . . . , 16, and the symbol F in the above equation is the F function of the DES.

It should be noted that the above-mentioned $L_0$, $R_0$, $L_1$, $R_1$, . . . correspond to the intermediate data stored in the intermediate data storage section 131 in FIG. 1.

The 16 F functions of the DES have the same structure. Each of the 16 F functions receives a 32-bit data $R_{n-1}$ and the 48-bit intermediate key $K_n$ from the key scheduling section 2210 and outputs the 32-bit data. The above equation (1) is applied 16 times and the sets $L_{16}$ and $R_{16}$ are determined at that time. The last translocation $IP^{-1}$ is applied to the 64-bit data having the set of $L_{16}$ as the upper 32 bits and the set of $R_{16}$ as the lower 32 bits. Thus, a 64-bit ciphertext is obtained.

The concept of this embodiment is shown in FIG. 23. Referring to FIG. 23, portions (2310 to 2380 in FIG. 23) which are surrounded by the broken lines in FIG. 23 are portions to give the intermediate data a random number dependent change which is necessary in the encrypting operation of the DES. That is, the random number dependent change portion indicates the random number dependent intermediate data changing operation which is carried out by the intermediate data control section 123 in FIG. 1.

Below, the structure and operation of this specific example of the encrypting apparatus will be described with reference to FIG. 22 and FIG. 23.

First, a plaintext is supplied from an IC card reader and writer as the input unit. The plaintext is divided into a set of upper 32 bits and a set of lower 32 bits after the initial translocation IP is carried out. At this time, the intermediate data control section 123 is called.

The intermediate data control section receives two random numbers $r_0$ and $r_1$ from the random number generating unit 140. The intermediate data control section 123 calculates the exclusive OR of the set of upper 32-bit data and the random numbers r, and stores the calculation result in $L_0$ (see 2310 in FIG. 23). Also, the intermediate data control section 123 calculates the exclusive OR of the set of lower 32-bit data and the random numbers $r_1$ and stores the calculation result in $R_0$ (see 2320 in FIG. 23).

Next, the following operation is repeated in case of n=1, 2, . . . , 16.

$$r^* = \begin{cases} r1 & n = 1, 4, 7, 10, 13, 16 \\ r0 \oplus r1 & n = 2, 5, 8, 11, 14 \\ r0 & n = 3, 6, 9, 12, 15 \end{cases}$$

Here, the value of r* is defined as follows.

First, the value of $R_{n-1}$ is copied to $L_n$. Then, the intermediate data control section 123 is called again and calculates the exclusive OR of $R_{n-1}$ and r* (see 2340, 2360 and 2380 of FIG. 23). The calculation result of the exclusive OR value and $K_n$ are supplied to the F function. Through the above procedure, $R_{n-1}$ and $K_n$ are supplied to the F function, and therefore, it is ascertained that it does not depend on the random numbers r* which is outputted from the random number generating unit 140.

When a value of F function is outputted, the intermediate data control section 123 is called and the exclusive OR of output of the F function output and the random numbers of r* is again calculated (see 2330, 2350 and 2370 of FIG. 23). Moreover, the exclusive OR of the calculation result of the exclusive OR and $L_{n-1}$ is calculated and the calculation result is stored in $L_n$.

The above operation is repeated 16 times. Thus, a 64-bit data is obtained to have the calculation result of the exclusive OR of $L_{16}$ and $r_1$ as the set of upper 32 bits and the calculation result of the exclusive OR of $R_{16}$, $r_0$ and $r_1$ as a set of lower 32 bits. The 64-bit data is subjected to the last translocation $IP^{-1}$ and then is outputted through the IC card reader and writer as a ciphertext. The ciphertext does not depend on any of the random numbers $r_0$ and $r_1$ operated to the intermediate data, the random numbers for controlling a delay time and the random numbers for determining the execution sequence of S-box.

Second Specific Example of Encrypting Operation

Figure 24:
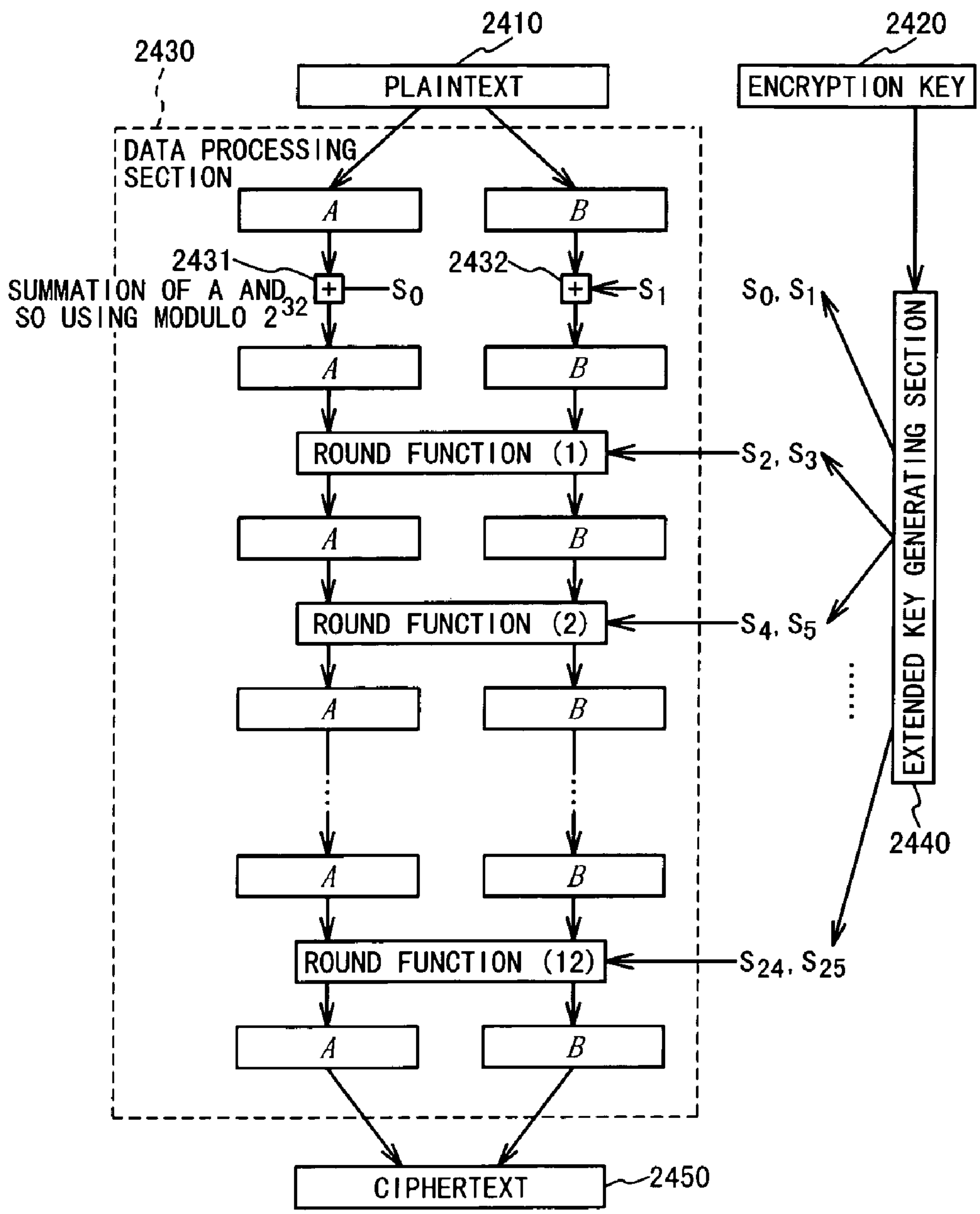
FIG. 24 is a block diagram showing the structure of a RC5-32/12/16 encrypging operation section in a second specific example of the encrypting apparatus of the present invention.
Figure 25:
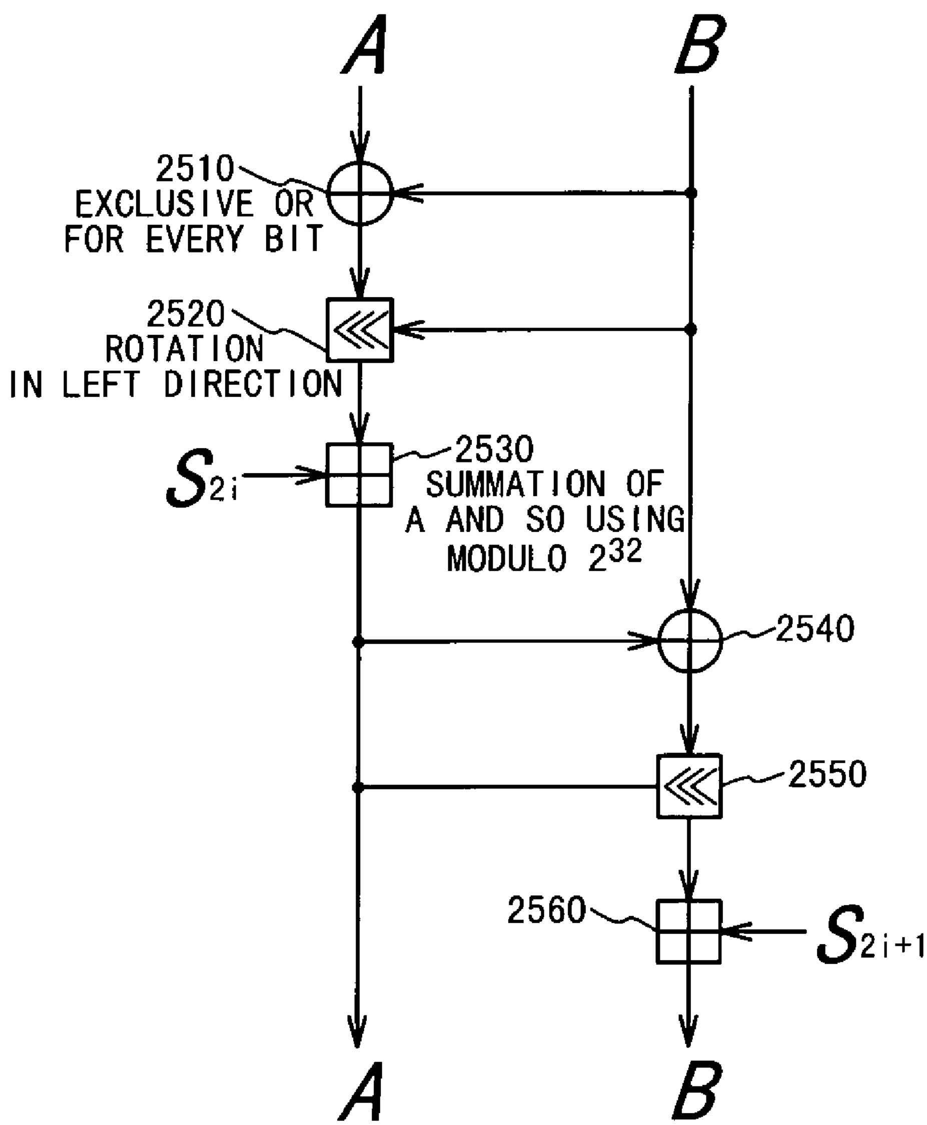
FIG. 25 is a diagram showing a round function of the RC5-32/12/16 encrypging operation section in the second specific example of the encrypting apparatus of the present invention.
Figure 26:
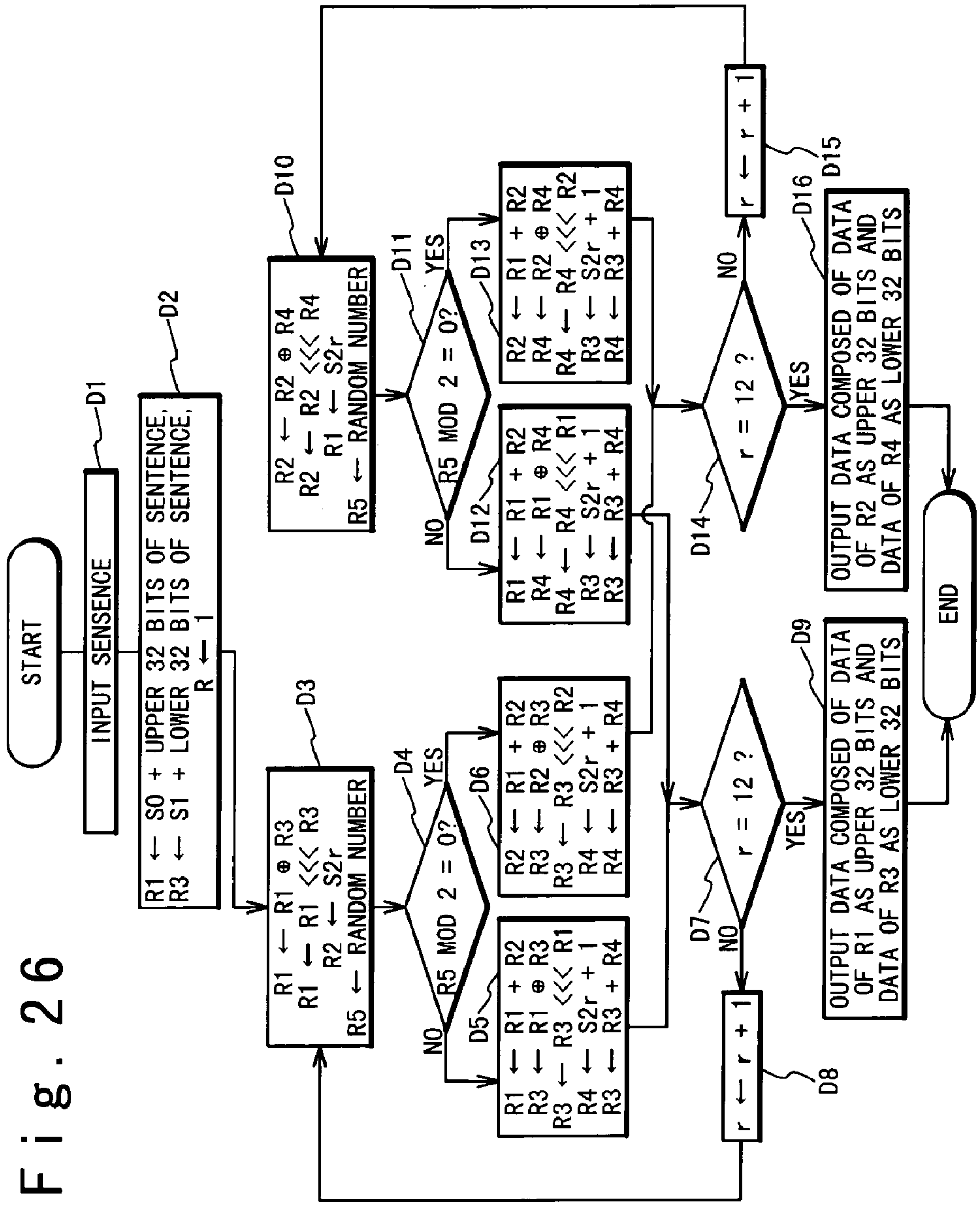
FIG. 26 is a flow chart showing the operation of the RC5-32/12/16 encrypging operation section in the second specific example of the encypting apparatus of the present invention.

FIG. 24, FIG. 25 and FIG. 26 are diagrams to explain the second specific example of the encrypting apparatus of the present invention. In the second specific example of the encrypting apparatus, the common key cipher RC5-32/12/16 is applied to the encrypting apparatus according to, for example, the above-mentioned second embodiment. The details of the algorithm of RC5-32/12/16 is described in "Handbook of Applied Cryptography" (pp. 269–270) mentioned above.

Here, first, the outline of the operation of RC5-32/12/16 will be described with reference to FIG. 24 and FIG. 25.

RC5-32/12/16 is the algorithm which converts a 64-bit plaintext 2410 into a 64-bit ciphertext 2450 using 128-bit encrypt key 2420 as shown in FIG. 24. RC5-32/12/16 has a data processing section 2430 and an extended key generating section 2440.

The extended key generating section 2440 receives the 128-bit encrypt key 2420 and outputs 26 32-bit extended keys $S_0$, $S_1$, . . . , $S_{25}$.

The data processing section 2430 receives the 64-bit plaintext 2410, and the outputs $S_0$, S1, $S_{25}$ of the extended key generating section 2440, and outputs the 64-bit ciphertext 2450.

The data processing section 2430 operates as follows.

First, the 64-bit plaintext 2410 supplied thereto is divided into a set of upper 32 bits A and a set of lower 32 bits B. Next, the summation (the addition) of A and $S_0$ modulo $2^{32}$ is calculated and the calculation result is again substituted for A (see 2431 of FIG. 24). Also, the summation of B and $S_1$ modulo $2^{32}$ is calculated and the calculation result is again substituted for B (see 2432 of FIG. 24). After that, the conversion using a round function is applied to A and B 12 times. The ciphertext 2450 is a 64-bit data having A after applying the round function 12 times as a set of upper 32 bits and B after applying the round function 12 times as a set of lower 32 bits.

When the round function is applied for the i-th time, data of A and B are updated using A, B, $S_{2i}$ and $S_{2i+1}$ and the updated data of A and B are outputted.

Next, an outline of the round function which is applied for the i-th time will be described. the update of A and B using the round function applied for the i-th time is carried out in accordance with the following equation.

$$A=((A\oplus B)<<<B)+S_{2i}$$

$$B=((B\oplus A)<<<A)+S_{2i+1}$$

where, the symbol "⊕" indicates the summation using modulo $2^{32}$ and the symbol "X<<<Y" indicates Y-bit rotation of X.

Referring to FIG. 25, the updating of A is first carried out. The exclusive OR 2510 of A and B is calculated for every bit and the calculation result of the exclusive OR is again stored in A.

Next, A is subjected to a left direction rotation 2520 for B bits and the rotation result is stored in A again. Last, the summation 2530 of A and the extended key $S_{2i}$ modulo $2^{32}$ is calculated and the calculation result is set as the value of A after the update.

Next, the updating of B is carried out. The exclusive OR 2540 of A after the update and B is calculated for every bit and the calculation result of the exclusive OR is again stored in B.

Next, B is subjected to a left direction rotation 2550 for A bits and the rotation result is stored in B again. Last, the summation 2560 of B and the extended key $S_{2i+1}$ modulo $2^{32}$ is C) calculated and the calculation result is set as the value of B after the update.

In this embodiment, the encrypting apparatus is composed of the IC card reader and writer as the input unit and the output unit, a semiconductor memory as the data storage unit, a recording medium for storing a program and a computer system provided in an IC card as the encryption processing unit. The computer system for realizing the encryption processing unit has five or more general purpose registers, and instruction sets of the computer system such as a summation of two registers R1 and R2, the bit rotation, and the exclusive OR for every bit instruct the calculation results in the register $R_1$ or $R_2$. In most of the computers which are used at present, such instruction sets having the above functions are used.

Next, the overall operation of this embodiment is described in detail based on the flow chart of FIG. 26 and FIG. 24 and FIG. 25. In the flow chart of FIG. 26, $R_1$, $R_2$, $R_3$, $R_4$ and $R_5$ are general registers with the data width of 32 bits and also the notion of "$R_i \leftarrow R_i+R_j$" shows the operation that an addition result of the general-purpose registers $R_i$ and $R_j$ is stored in the general-purpose register $R_i$. Also, the notation of "$R_i \leftarrow R_i<<<R_j$" in FIG. 26 shows the operation that the content of the register $R_i$ is rotated in the left direction by the $R_j$ bits and the rotation result is stored in the register $R_i$. This specific example has a feature in that the calculation results of the calculation of "$R_i$+$R_j$" and "$R_i$<<<$R_j$" carried out by the computer are stored in either of the registers $R_i$ and $R_j$ which is determined based on the random numbers.

As described above, the storage region of the calculation result is changed in dependence on the random numbers. Therefore, it is difficult to detect whether the change of the measured consumption power is based on the change of the value of the general register R, or based on the change of the value of the general register $R_j$.

Next, the operation of this embodiment will be described below in detail.

In this embodiment, first, a plaintext is stored in the encryption processing unit through the input unit (The step D1 of FIG. 26).

When the plaintext is supplied to the encryption processing unit, the encryption processing unit calculates addition (the summation using modulo $2^{32}$) 2431 and then stores the value of A after the calculation in the general register $R_1$. Also, the encryption processing unit calculates addition (the summation using modulo $2^{32}$) 2432 and then stores the value of B after the calculatin in the general register $R_3$. Also, the encryption processing unit stores 1 in a variable r which counts the number of times of execution of a round function (Step D2).

Next, the encryption processing unit carries out the operation corresponding to 2510 and 2520 of the round function shown in FIG. 25 and then stores $S_{2r}$ in the general register $R_2$. At this time point, the conditional branch control unit is called. The conditional branch control unit controls the calculation result of summation (the summation using modulo $2^{32}$) 2530 of the value of $S_{2r}$ stored in the register $R_2$ and the value of A stored in the register $R_1$ to be stored in either of $R_1$ and $R_2$ based on whether the random numbers is an even number or an odd number (Steps D3 and D4).

When the random numbers is an odd number in the step D4 of FIG. 26, the calculation result of the summation between registers $R_2$ and $R_1$ is stored in the register $R_1$. Subsequently, the encrypting operation section carries out the calculation of the exclusive OR (the exclusive OR for every bit) 2540 in the round function and the left direction bit rotation 2550 and then stores the value of B in the rgister $R_3$ when the left direction bit rotation 2550 is ended.

Moreover, the encrypting operation section stores the value of $S_{2r+1}$ in the register $R_4$ and stores the summation of the registers $R_3$ and $R_4$ in the register $R_3$. Through the above operation, the values of A and B after application of the round function are stored in the registers $R_1$ and $R_3$, respectively (Step D5).

When the processing of step D5 is ended, the processing of the round function ends for this time. At this time, the value of the variable r showing the number of times of execution of the round function by the encryption processing unit is checked (Step D7). When the value of r is equal to 12 which is the number of times of the round function to be executed in RC5-32/12/16, the encrypting operation section outputs a ciphertext from the output unit and ends the encrypting operation (Step D9). Otherwise, the encrypting operation section returns to the step D3 to add 1 to the variable r (step D8) and to carry out the round function once more.

When the random numbers is an even number in the step D4, the calculation result of the summation between the registers R2 and R1 is stored in the register $R_2$. The encryption processing unit carries out the calculation of the exclusive OR (the exclusive OR for every bit) 2540 in the round function and a left direction bit rotation 2550 and stores the value of B in the register R3 when the left direction bit rotation 2550 is ended.

Moreover, the encryption processing unit stores the value of $S_{2r+1}$ in the register $R_4$ and stores the summation between the registers $R_3$ and $R_4$ in the register $R_4$. Through the above operation, the value of A and B after the application of the round function is stored in the registers R2 and R4, respectively (Step D6).

Next, like the step D7, it is chekced whether or not the value of r is equal to 12. When the value of r is equal to 12, the encrypting operation section outputs a ciphertext from the output unit and ends the encrypting operation (Step D16). Otherwise, the encrypting operation section returns to the step D10 to add 1 to the variable r (step D15) and to carry out the round function once more.

In step D10, the values of A and B for the round function are stored in the registers $R_2$ and $R_4$, respectively. The encryption processing unit carries out the operations corresponding to the exclusive OR calculation 2510 and the left direction bit rotation 2520 of the round function shown in FIG. 25 and then stores S2r in the general register R1. At this time point, the conditional branch control unit is called. The conditional branch control unit controls the calculation result of summation (the summation using modulo $2^{32}$) 2530 of the value of $S_{2r}$ stored in the register $R_1$ and the value of A stored in the register $R_2$ to be stored in either of R1 and R2 based on whether the random numbers is an even number or an odd number (Steps D10 and D11).

When the random numbers is an odd number in the step D11, the calculation result of the summation of the registers $R_2$ and $R_1$ is stored in the register $R_1$. Subsequently, the encryption processing unit carries out the calculation of the exclusive OR 2540 in the round function and the left direction bit rotation 2550 and stores the value of B in the register $R_4$ when the left direction bit rotation 2550 is ended. Moreover, the encryption processing unit stores the value of $S_{2r+1}$ in the register $R_3$ and stores a summation between the registers $R_3$ and $R_4$ in the register R3. Through the above operation, the values of A and B after the application of the round function are stored in $R_1$ and $R_3$, respectively (Step D12).

When the processing of step D12 is ended, the processing of the round function ends for this time. At this time, the value of the variable r showing the number of times of execution of the round function by the encryption processing unit is checked (Step D7). When the value of r is equal to 12 which is the number of times of the round function to be executed in RC5-32/12/16, the encrypting operation section outputs a ciphertext from the output unit and ends the encrypting operation (Step D9). Otherwise, the encrypting operation section returns to the step D3 to add 1 to the variable r (step D8) and to carry out the round function once more.

When the random numbers is an even number in the step D11, the calculation result of the summation of the registers $R_2$ and $R_1$ is stored in the register $R_2$. Subsequently, the encryption processing unit carries out the calculation of the exclusive OR 2540 in the round function and the left direction bit rotation 2550 and stores the value of B in the register $R_4$ when the left direction bit rotation 2550 is ended. Moreover, the encryption processing unit stores the value of $S_{2r+1}$ in the register $R_3$ and stores the summation between the registers $R_3$ and $R_4$ in the register R4. Through the above operation, the values of A and B after the application of the round function are stored in the registers $R_2$ and $R_4$, respectively (Step D13).

Next, like the step D7, it is chekced whether or not the value of r is equal to 12 (step D14). When the value of r is equal to 12, the encrypting operation section outputs a ciphertext from the output unit and ends the encrypting operation (Step D16). Otherwise, the encrypting operation section returns to the step D10 to add 1 to the variable r (step D15) and to carry out the round function once more.

Through the above-mentioned algorithm, the ciphertext corresponding to the plaintext is outputted to the output unit without depending on the value of the random numbers outputted from the random number generating unit.

Third Specific Example of Encrypting Operation

Figure 27:
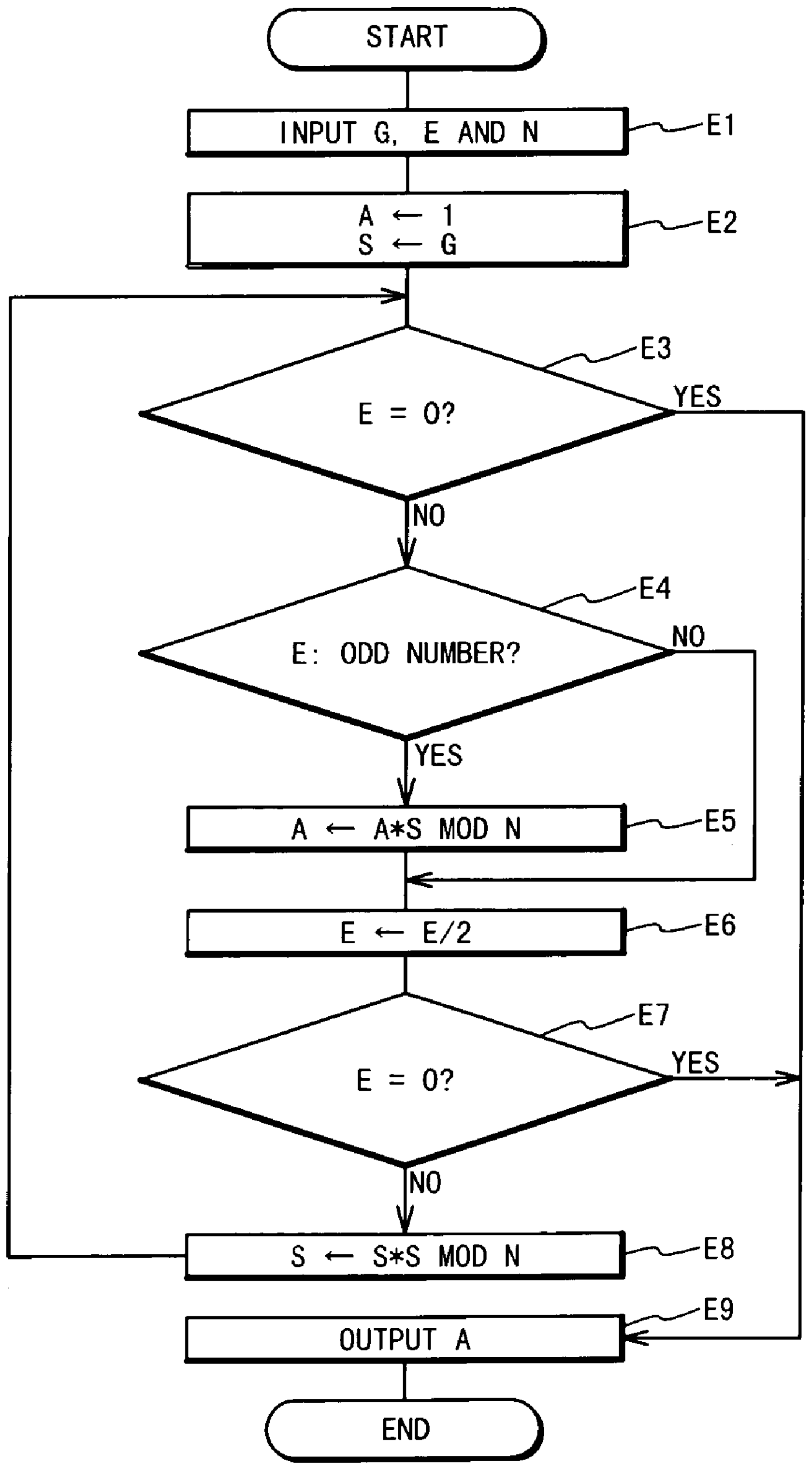
FIG. 27 is a flow chart showing the operation of the high-speed power surplus calculation the operation of the RC5-32/12/16 encrypging operation section in a third specific example of the encypting apparatus of the present invention.
Figure 28:
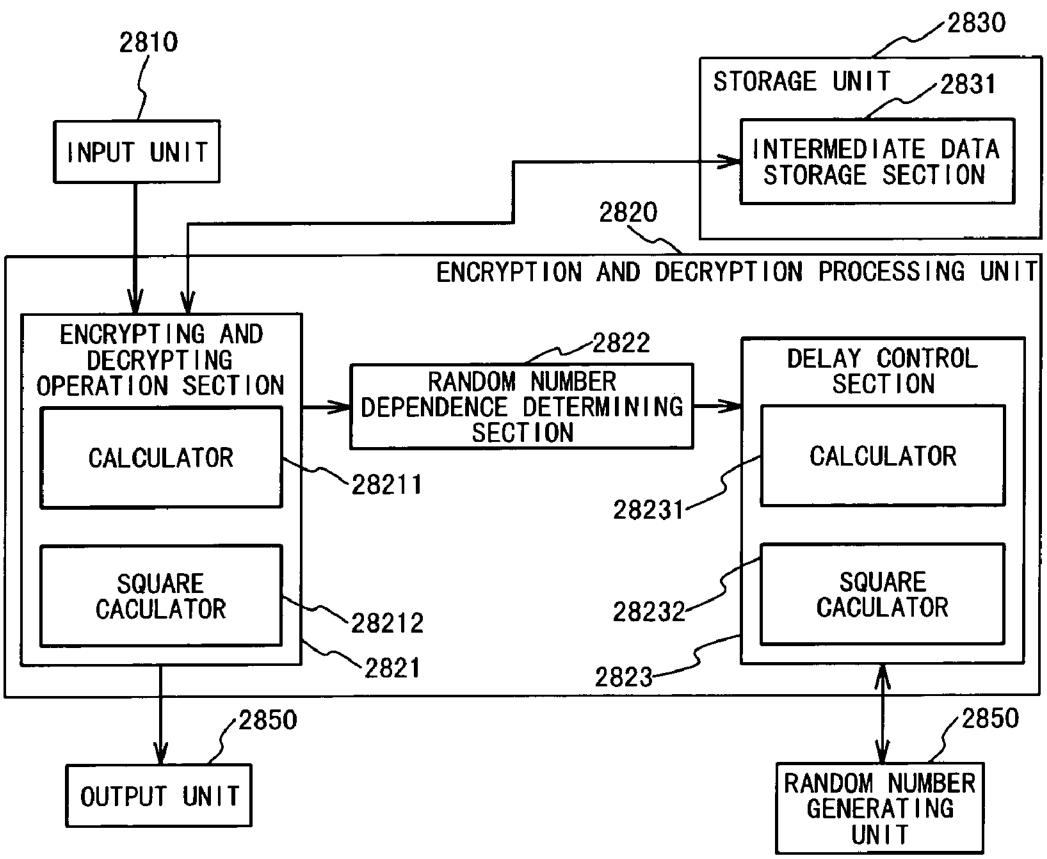
FIG. 28 is a block diagram showing the structure of the encypting apparatus in the third specific example of the encypting apparatus of the present invention.

FIG. 27 and FIG. 28 are diagrams to explain the third embodiment of the present invention. In this embodiment, a public key encryption RSA is is applied to the encrypting and decrypting apparatus according to the above-mentioned fifteenth embodiment. It should be noted that the algorithm of RSA is described in the above-mentioned "Handbook of Applied Cryptography" (pp. 285–291).

Here, first, the outline of the operation of RSA will be described.

RSA has a set (n, e) of a product n of two prime numbers p and q of about 512 bits and a number e in relation of prime number with 1 cm(p−1, q−1) (1 cm(a, b) indicates the least common multiple of a and b) as a public key and d to meet ed=1 under method 1 cm(p-1, q-1) as a secret key.

The encryption of RSA is carried out as follows.

Supposing that M is a plaintext to be encrypted, a ciphertext C obtained by encrypting M is calculated in accordance with the following equation.

$$C=M^e mod n$$

Also, the calculation to decrypt the ciphertext C into the plaintext M is shown by the following equation.

$$M=C^d mod n$$

In order to carry out an encryption and decrypting operation at high speed, RSA requires a high speed power surplus calculation algorithm. Here, the power surplus calculation algorithm means the algorithm which receives g, e, and n and outputs ge mod n.

In the implementation of RSA, it is standard to use the algorithm shown in the flow chart of FIG. 27 or an improvement algorithm as the high-speed power surplus calculation algorithm. Here, the flow of the operation of the high-speed power surplus calculation algorithm will be described with reference to the flow chart of FIG. 27.

In the power surplus calculation algorithm, first, g, e, and n are supplied (step E1 of FIG. 27). Subsequenly 1 and g are stored in variables A and S as the initial values, respectively (Step E2).

Next, it is determined whether or not e is 0 (Step E3). In case of e=0, A is outputted and the processing is ended. Otherwise, it is determined whether e is an odd number or an even number. When e is the odd number, a product of A and S is calculated and then is stored in A again (Steps E4 and E5).

Next, by dividing the value of e by 2, the right direction shift of e by one bit is carried out (Step E6). At this time, it is determined again whether or not e is 0 (step E7). In case of e=0, A is outputted and the processing is ended. Otherwise, a square of S is calculated (step E8) and then the processing returns to the step E3.

It is supposed that the binary expression of e is ($b_1$, $b_2$, . . . , $b_t$). Here, the most significant bit is $b_1$ and the least significant bit is $b_t$. In this case, the value of A when the processing passed through the step E7 i times in the flow chart of FIG. 27 is $g^{ei}$ mod n to the number ei to have the binary expression of ($b_1$, $b_2$, . . . , $b_i$).

Based on the structure method of the algorithm, the number of times which the processing passes through the step E7 till the end of the algorithm to the bit length t of e in the algorithm shown with FIG. 27 always becomes t times. Therefore, the value of A in case of the end of the algorithm becomes $g^e$ mod n. Thus, it can be ascertained that the power surplus calculation is carried out.

However, when the power surplus calculation is carried out using the algorithm like the above, there is the following problem. That is, the necessary and sufficient condition that the step E5 is executed after the processing has passed through the step E4 of FIG. 27*i* times is the i-th bit from the mostright bit of e is "1". At this time, if it is possible to specify an instruction executed in the apparatus by measuring the consumption power during the execution by the apparatus in which the above-mentioned algorithm is implemented, the secret key d of RSA could be specified by measuring the consumption power of the apparatus at the time of the decrypting operation of the RSA ciphertext.

Next, this embodiment will be described in detail with reference to the flow chart of FIG. 27 and FIG. 28.

The the encryption and decryption processing unit 2820 in the encrypting and decrypting apparatus in this embodiment is composed of the encryption and decrypting operation section 2821, the random number dependence determining section 2822, and the delay control unit 2823, and operates as follows.

The encryption and decrypting operation section 2821 is composed of a multiplier 2811 which receives two different numbers a and b and calculates a*b mod n, a multiplier 2812 which receives a single number a and a modulo n and calculates $a^2$ mod n.

The encrypting and decrypting operation section 2821 has two functions of the encryption and the decryption. In case of the encryption, a public key e and $n_1$ of a counter node and a plaintext M to be transmitted are supplied from the input unit 2810. Then, the operation like the flow chart of FIG. 27 is carried out. As a result, the ciphertext $M^e$ mod $n_1$ is calculated and the calculation result is outputted from the output unit 2850. Also, in case of the decryption, the secret key d of the user and the public key $n_2$ of the user and received ciphertext C from the input unit 2810 and the operation is carried out as shown in the flow chart of FIG. 27 to calculate a plaintext from $C^d$ mod $n_2$. The calculation result is outputted from the output unit 2850.

The operation of the encrypting and decrypting operation section 2821 of the in FIG. 28 is different from the encryption and decrypting operation section 2821 in FIG. 28 in the flow chart of FIG. 2 is in the point that a delay time determining request is outputted from the delay control unit 2823 to the random number dependence determining section 2822 when the processing returns from the step E8 to the step E3 of FIG. 27.

The delay control unit 2823 is composed of a multiplier 28231 and a square operating unit 28232 like the encrypting operation section 2821. When a delay time determining request is outputted from the random number dependence determining section 2822, the delay control unit 2823 sends the random number generating request to the random number generating unit 2840 twice and gets two random numbers $r_1$ and $r_2$.

The delay control unit 2823 receives r1 and r2, and determines whether or not the least significant bit of r, is O. When the LSB is 0, the delay control unit 2823 calculates the square of $r_2$ for the delay insertion using the square operating unit 28232 and moves the processing to the encrypting and decrypting operation section 2821. On The other hand, when the least significant bit of $r_1$ is "1", the delay control unit 2823 calculates a product of $r_1$ and $r_2$ using the multiplier 28231 for the delay insertion, and then calculate the square of $r_1 \cdot r_2$ as the calculation result of the multiplier 28231 using the square arithmetic unit 28232. Then, the delay control unit 2823 moves the processing to the encrypting and decrypting operation section 2821 again.

As described above, according to the encrypting apparatus, the decrypting apparatus and the encrypting and decrypting apparatus of the present invention, it is difficult to apply the cryptanalysis method such as the simple power analysis and the power differential analysis for getting secret information such as the encrypt key and the decrypt key by measuring the power consumption of the apparatus when the encryption and/or decryption of the data is carried out.

The reason why the above mentioned effect can be attained will be described below.

In order that the cryptanalysis such as the simple power analysis and the power differential analysis succeeds through the measurement of the power consumption, two conditions are necessary.

That is, the first matter is that there is a close relation between the power consumed when the encrypting apparatus and the decrypting apparatus carry out the encryption and decryption of the data and a decrypt, and the encrypting and decrypting operation carried out in the apparatus. The second matter is that it is easy to detect the time when the encrypting apparatus and the decrypting apparatus carry out a specific encrypting and decrypting operation.

In the present invention, the encrypting operation and the decrypting operation are carried out in the encrypting apparatus and the decrypting apparatus while the intermediate data which are necessary for the encryption and the decryption are changed in dependence on the random numbers by the intermediate data control section. Therefore, it is difficult to determine whether the change of the power consumption of the apparatus is due to the encrypting operation and the decrypting operation ordue to the influence of the random numbers. In this way, it is difficult to detect relation between the consumption power of the encrypting apparatus and the decrypting apparatus, and the encrypting operation and decrypting operation which are carried out in the apparatus. Thus, the first condition for the simple power analysis and the power differential analysis is not met.

Moreover, in the present invention, The determination of the execution order of operations which can be replaced and the selection of an actually executed operation from among a plurality of encrypting or decrypting operations which does not influence the encrypting or decrypting result is carried out in dependence on the random numbers by the conditional branch control unit. Also, the delay time is appropriately inserted on the way of the encrypting operation or decrypting operation in dependence on the random numbers by the delay control unit. Therefore, the time that a specific encrypting operation or decrypting operation is executed is changed based on the random numbers. Thus, the second condition for the simple power analysis and the power differential analysis is not met.

The above first to third specific examples may be applied to the encrypting operations in the other embodiments, and may be also applied to the decrypting apparatus.

By the above, two conditions necessary for the simple power analysis and the power differential analysis are not met. Therefore, it is difficult to succeed the cryptanalysis method for secret information by measuring the consumption power of the encrypting apparatus and the decrypting apparatus.

What is claimed is:

1. An encrypting apparatus comprising:

an encrypting operation section carrying out an encrypting operation to a plaintext using intermediate data at each of a plurality of encrypting stages of said encrypting operation to produce a ciphertext, wherein said encrypting operation section outputs encrypting stage data indicating an encrypting state at each of said plurality of processing stages;

a determining section determining whether said encrypting operation at a next encrypting stage should be changed, based on said encrypting stage data at a current encrypting stage from said encrypting operation section;

a control section changing said encrypting operation at said next encrypting stage a plurality of times when it is determined that said encrypting operation at said next encrypting stage should be changed, wherein said determining section determines whether said intermediate data at said next encrypting stage of said encrypting operation should be changed depending on at least a plurality of random numbers, based on said encrypting stage data at said current encrypting stage from said encrypting operation section, wherein said encrypting stage data includes said intermediate data at said next encrypting stage, and wherein said control section changes said intermediate data at said next encrypting stage a plurality of times depending on said plurality of random numbers, in order to cancel an influence of said plurality of random numbers on said encrypting operation, wherein said encrypting operation section divides each n-bit word of the plaintext into an upper n bits and a lower n bits, n being an even integer value greater than or equal to 16, wherein said determining section calculates a logical product of the upper n bits of the plaintext with at least one of said plurality of random numbers to obtain a first result, and said determining section calculates a logical product of the lower n bits of the plaintext with at least one of said plurality of random numbers to obtain a second result, wherein, in obtaining the first result and the second result, a first subset of the upper n bits and the lower n bits of the plaintext are exclusive-or'ed with a first of said plurality of random numbers, a second subset of the upper n bits and the lower n bits of the plaintext are exclusive-or'ed with a second of said plurality of random numbers, and a third subset of the upper n bits and the lower n bits of the plaintext are exclusive-or'ed with both the first and second random numbers.

2. An encrypting apparatus according to claim 1, wherein said determining section determines whether said intermediate data at said next encrypting stage of said encrypting operation should be changed based on whether or not said current encrypting stage from said encrypting operation section is determined to be a stage to determine a random number conditional branch.

3. An encrypting apparatus according to claim 2, wherein said control section changes said intermediate data at said next encrypting stage depending on said plaintext or a data dependent on said plaintext in place of said random numbers.

4. An encrypting apparatus according to claim 1, wherein said determining section determines whether an encrypting procedure at said next encrypting stage of said encrypting operation should be changed depending on at least a random number, based on said encrypting stage data at said current encrypting stage from said encrypting operation section, and wherein said control section changes said encrypting procedure at said next encrypting stage of said encrypting operation depending on said random numbers.

5. An encrypting apparatus according to claim 4, wherein said control section changes said encrypting procedure at said next encrypting stage of said encrypting operation depending on said plaintext or a data dependent on said plaintext in place of said random numbers.

6. An encrypting apparatus according to claim 1, wherein said determining section determines whether said encrypting operation at said next encrypting stage should be changed depending on at least a random number, based on said encrypting stage data at said current encrypting stage from said encrypting operation section, and wherein said control section inserts a delay time in said encrypting operation at said next encrypting stage depending on said random numbers.

7. An encrypting apparatus according to claim 6, wherein said control section inserts said delay time in said encrypting operation at said next encrypting stage depending on said plaintext or a data dependent on said plaintext in place of said random numbers.

8. A decrypting apparatus comprising:

a decrypting operation section carrying out a decrypting operation to a ciphertext using intermediate data at each of a plurality of decrypting stages of said decrypting operation to produce a plaintext. wherein said decrypting operation section outputs decrypting stage data indicating a decrypting state at each of said plurality of decrypting stages;

a determining section determining whether said decrypting operation at a next decrypting stage should be changed, based on said decrypting stage data at a current decrypting stage from said decrypting operation section; and a control section changing said decrypting operation at said next decrypting stage a plurality of times when it is determined that said decrypting operation at said next decrypting stage should be changed, wherein said determining section determines whether said intermediate data at said next decrypting stage of said decrypting operation should be changed depending on at least a plurality of random numbers, based on said decrypting stage data at said current decrypting stage from said decrypting operation section, wherein said decrypting stage data includes said intermediate data for said next decrypting stage, and wherein said control section changes said intermediate data at said next decrypting stage a plurality of times depending on said plurality of random numbers, in order to cancel an influence of said plurality of random numbers on said decrypting operation, wherein said decrypting operation section divides each n-bit word of the plaintext into an upper n bits and a lower n bits, n being an even integer value greater than or equal to 16, wherein said determining section calculates a logical product of the upper n bits of the plaintext with at least one of said plurality of random numbers to obtain a first result, and said determining section calculates a logical product of the lower n bits of the plaintext with at least one of said plurality of random numbers to obtain a second result, wherein, in obtaining the first result and the second result, a first subset of the upper n bits and the lower n bits of the plaintext are exclusive-or'ed with a first of said plurality of random numbers, a second subset of the upper n bits and the lower n bits of the plaintext are exclusive-or'ed with a second of said plurality of random numbers, and a third subset of the upper n bits and the lower n bits of the plaintext are exclusive-or'ed with both the first and second random numbers.

9. A decrypting apparatus according to claim 8, wherein said determining section determines whether said intermediate data at said next decrypting stage of said decrypting operation should be changed based on whether or not said current decrypting stage from said decrypting operation section is determined to be a stage to determine a random number conditional branch.

10. A decrypting apparatus according to claim 9, wherein said control section changes said intermediate data at said next decrypting stage depending on said ciphertext or a data dependent on said ciphertext in place of said random numbers.

11. A decrypting apparatus according to claim 8, wherein said determining section determines whether a decrypting procedure at said next decrypting stage of said decrypting operation should be changed depending on at least a random number, based on said stage data at said current decrypting stage from said decrypting operation section, and wherein said control section changes said decrypting procedure at said next decrypting stage of said decrypting operation depending on said random numbers.

12. A decrypting apparatus according to claim 11, wherein said control section changes said decrypting procedure at said next decrypting stage of said decrypting operation depending on said ciphertext or a data dependent on said ciphertext in place of said random numbers.

13. A decrypting apparatus according to claim 8, wherein said determining section determines whether said decrypting operation at said next decrypting stage should be changed depending on at least a random number, based on said stage data at said current decrypting stage from said decrypting operation section, and wherein said control section inserts a delay time in said decrypting operation at said next decrypting stage depending on said random numbers.

14. A decrypting apparatus according to claim 13, wherein said control section inserts said delay time in said decrypting operation at said next decrypting stage depending on said ciphertext or a data dependent on said ciphertext in place of said random numbers.

15. An encrypting and decrypting apparatus comprising:

an encrypting and decrypting operation section determining whether an inputted instruction is an encrypt instruction or a decrypt instruction, carrying out an encrypting operation to an inputted text in response to said encrypt instruction using first intermediate data at each of a plurality of encrypting stages of said encrypting operation to produce a ciphertext, and carrying out a decrypting operation to said inputted text in response to said decrypt instruction using second intermediate data at each of a plurality of decrypting stages of said decrypting operation to produce a plaintext, wherein said encrypting and decrypting operation section outputs encrypting stage data indicating an encrypting state at each of said plurality of encrypting stages and outputs decrypting stage data indicating a decrypting state at each of said plurality of decrypting stages;

a determining section determining whether said encrypting operation at a next encrypting stage should be changed, based on said encrypting stage data at a current encrypting stage from said encrypting and decrypting operation section, and determining whether said decrypting operation at a next decrypting stage should be changed, based on said decrypting stage data at a current decrypting stage from said encrypting and decrypting operation section; and a control section changing said encrypting operation at said next encrypting stage a plurality of times when it is determined that said encrypting operation at said next encrypting stage should be changed, and changing said decrypting operation at said next decrypting stage a plurality of times when it is determined that said decrypting operation at said next decrypting stage should be changed, wherein said determining section determines whether said intermediate data at said next encrypting stage of said encrypting operation should be changed depending on at least a plurality of random numbers, based on said encrypting stage data at said current encrypting stage from said encrypting operation section, wherein said encrypting stage data includes said intermediate data at said next encrypting stage, wherein said control section changes said intermediate data at said next encrypting stage a plurality of times depending on said plurality of random numbers, in order to cancel an influence of said plurality of random numbers on said encrypting operation, wherein said determining section determines whether said intermediate data at said next decrypting stage of said decrypting operation should be changed depending on at least a plurality of random numbers, based on said decrypting stage data at said current decrypting stage from said decrypting operation section, wherein said decrypting stage data includes said intermediate data for said next decrypting stage, and wherein said control section changes said intermediate data at said next decrypting stage a plurality of times depending on said plurality of random numbers, in order to cancel an influence of said plurality of random numbers on said decrypting operation, wherein said encrypting and decrypting operation section divides each n-bit word of the plaintext into an upper n bits and a lower n bits, n being an even integer value greater than or equal to 16, wherein said determining section calculates a logical product of the upper n bits of the plaintext with at least one of said plurality of random numbers to obtain a first result, and said determining section calculates a logical product of the lower n bits of the plaintext with at least one of said plurality of random numbers to obtain a second result, wherein, in obtaining the first result and the second result, a first subset of the upper n bits and the lower n bits of the plaintext are exclusive-or'ed with a first of said plurality of random numbers, a second subset of the upper n bits and the lower n bits of the plaintext are exclusive-or'ed with a second of said plurality of random numbers, and a third subset of the upper n bits and the lower n bits of the plaintext are exclusive-or'ed with both the first and second random numbers.

16. An encrypting and decrypting apparatus according to claim 15, wherein said determining section determines whether said first intermediate data at said next encrypting stage of said encrypting operation should be changed depending on a first plurality of random numbers, based on whether or not said current encrypting stage from said encrypting and decrypting operation section is determined to be a stage to determine a random number conditional branch, and said determining section determines whether said second intermediate data at said next decrypting stage of said decrypting operation should be changed depending on a second plurality of random numbers, based on whether or not said current decrypting stage from said encrypting and decrypting operation section is determined to be a stage to determine a random number conditional branch.

17. An encrypting and decrypting apparatus according to claim 16, wherein said control section changes said first intermediate data at said next encrypting stage depending on said inputted text or a data dependent on said inputted text in place of said first plurality of random numbers, and changes said second intermediate data at said next decrypting stage depending on said inputted text or said data dependent on said inputted text in place of said second plurality of random numbers.

18. An encrypting and decrypting apparatus according to claim 15, wherein said determining section determines whether an encrypting procedure at said next encrypting stage of said encrypting operation should be changed depending on a first plurality of random numbers, based on said encrypting stage data at said current encrypting stage from said encrypting and decrypting operation section, and determines whether a decrypting procedure at said next decrypting stage of said decrypting operation should be changed depending on a second plurality of random numbers, based on said decrypting stage data at said current decrypting stage from said encrypting and decrypting operation section, and wherein said control section changes said encrypting procedure at said next encrypting stage of said encrypting operation depending on said first plurality of random numbers and changes said decrypting procedure at said next decrypting stage of said decrypting operation depending on said second plurality of random numbers.

19. An encrypting and decrypting apparatus according to claim 18, wherein said control section changes said encrypting procedure at said next encrypting stage of said encrypting operation depending on said inputted text or a data dependent on said inputted text in place of said plurality of random numbers, and changes said decrypting procedure at said next decrypting stage of said decrypting operation depending on said inputted text or said data dependent on said inputted text in place of said plurality of random numbers.

20. An encrypting and decrypting apparatus according to claim 15, wherein said determining section determines whether said encrypting operation at said next encrypting stage should be changed depending on a first plurality of random numbers, based on said encrypting stage data at said current encrypting stage from said encrypting and decrypting operation section, and determines whether said decrypting operation at said next decrypting stage should be changed depending on a second plurality of random numbers, based on said decrypting stage data at said current decrypting stage from said encrypting and decrypting operation section, and wherein said control section inserts a first delay time in said encrypting operation at said next encrypting stage depending on said first random number and inserts a second delay time in said decrypting operation at said next decrypting stage depending on said second plurality of random numbers.

21. An encrypting and decrypting apparatus according to claim 20, wherein said control section inserts said first delay time in said encrypting operation at said next encrypting stage depending on said inputted text or a data dependent on said inputted text in place of said first plurality of random numbers, and inserts said second delay time in said decrypting operation at said next decrypting stage depending on said inputted text or said data dependent on said inputted text in place of said second plurality of random numbers.

22. An encrypting method comprising:

(a) determining whether an encrypting operation at a current encrypting stage should be changed, based on encrypting stage data at a previous encrypting stage, said encrypting stage data at said previous encrypting stage indicating an encrypting state at said previous encrypting stage;

(b) changing said encrypting operation at said current encrypting stage when it is determined that said encrypting operation at said current encrypting stage should be changed;

(c) carrying out said encrypting operation at said current encrypting stage a plurality of times to a plaintext using intermediate data at said current encrypting stage; and (d) executing said steps (a) to (c) to each of a plurality of said encrypting stages of said encrypting operation to produce a ciphertext, wherein said step (b) determines whether said intermediate data at said next encrypting stage of said encrypting operation should be changed depending on at least a plurality of random numbers, based on said encrypting stage data at said current encrypting stage from said step (c), wherein said encrypting stage data includes said intermediate data at said next encrypting stage, and wherein, in said step (c), said intermediate data at said next encrypting stage is changed a plurality of times depending on said plurality of random numbers, in order to cancel an influence of said plurality of random numbers on said encrypting operation, wherein said encrypting operation is carried out by:

i) dividing each n-bit word of the plaintext into an upper n bits and a lower n bits, n being an even integer value greater than or equal to 16, ii) calculating a logical product of the upper n bits of the plaintext with at least one of said plurality of random numbers to obtain a first result, and iii) calculating a logical product of the lower n bits of the plaintext with at least one of said plurality of random numbers to obtain a second result, wherein, in obtaining the first result and the second result, a first subset of the upper n bits and the lower n bits of the plaintext are exclusive-or'ed with a first of said plurality of random numbers, a second subset of the upper n bits and the lower n bits of the plaintext are exclusive-or'ed with a second of said plurality of random numbers, and a third subset of the upper n bits and the lower n bits of the plaintext are exclusive-or'ed with both the first and second random numbers.

23. An encrypting method according to claim 22, wherein said determining includes:

determining whether said intermediate data at said current encrypting stage of said encrypting operation should be changed depending on a plurality of random numbers, based on said encrypting stage data at said previous encrypting stage.

24. An encrypting method according to claim 23, wherein said changing includes:

changing said intermediate data at said current encrypting stage depending on said plaintext or a data dependent on said plaintext in place of said plurality of random numbers.

25. An encrypting method according to claim 22, wherein said determining includes:

determining whether an encrypting procedure at said current encrypting stage of said encrypting operation should be changed depending on a plurality of random numbers, based on said encrypting stage data at said previous encrypting stage, and wherein said changing includes:

changing said encrypting procedure at said current encrypting stage of said encrypting operation depending on said plurality of random numbers.

26. An encrypting method according to claim 25, wherein said changing includes:

changing said encrypting procedure at said next encrypting stage of said encrypting operation depending on said plaintext or a data dependent on said plaintext in place of said plurality of random numbers.

27. An encrypting method according to claim 22, wherein said determining includes:

determining whether said encrypting operation at said current encrypting stage should be changed depending on a plurality of random numbers, based on said encrypting stage data at said previous encrypting stage, and wherein said changing includes:

inserting a delay time in said encrypting operation at said current encrypting stage depending on said plurality of random numbers.

28. An encrypting method according to claim 27, wherein said changing includes:

inserting said delay time in said encrypting operation at said current encrypting stage depending on said plaintext or a data dependent on said plaintext in place of said plurality of random numbers.

29. A decrypting method comprising:

(a) determining whether a decrypting operation at a current decrypting stage should be changed, based on decrypting stage data at a previous decrypting stage, said decrypting stage data at said previous decrypting stage indicating an decrypting state at each of said plurality of decrypting stages;

(b) changing said decrypting operation at said current decrypting stage when it is determined that said decrypting operation at said next decrypting stage should be changed;

(c) carrying out said decrypting operation at said current decrypting stage a plurality of times to a ciphertext using intermediate data at said current decrypting stage; and (d) executing said steps (a) to (c) to each of a plurality of decrypting stages to produce a plaintext, wherein step (b) determines whether said intermediate data at said next decrypting stage of said decrypting operation should be changed depending on at least a plurality of random numbers, based on said decrypting data at said current decrypting stage from said step (c), wherein said decrypting stage data includes said intermediate data at said next encrypting stage, and wherein, in said step (c), said intermediate data at said next decrypting stage is changed a plurality of times depending on said plurality of random numbers, in order to cancel an influence of said plurality of random numbers on said decrypting operation (column 2 lines 16–60, column 5 line 38–column 6 line 10), wherein said decrypting operation is carried out by:

i) dividing each n-bit word of the plaintext into an upper n bits and a lower n bits, n being an even integer value greater than or equal to 16, ii) calculating a logical product of the upper n bits of the plaintext with at least one of said plurality of random numbers to obtain a first result, and iii) calculating a logical product of the lower n bits of the plaintext with at least one of said plurality of random numbers to obtain a second result, wherein, in obtaining the first result and the second result, a first subset of the upper n bits and the lower n bits of the plaintext are exclusive-or'ed with a first of said plurality of random numbers, a second subset of the upper n bits and the lower n bits of the plaintext are exclusive-or'ed with a second of said plurality of random numbers, and a third subset of the upper n bits and the lower n bits of the plaintext are exclusive-or'ed with both the first and second random numbers.

30. A decrypting method according to claim 29, wherein said determining includes:

determining whether said intermediate data at said current decrypting stage of said decrypting operation should be changed depending on a plurality of random numbers, based on said decrypting stage data at said previous decrypting stage.

31. A decrypting method according to claim 30, wherein said changing includes:

changing said intermediate data at said current decrypting stage depending on said ciphertext or a data dependent on said ciphertext in place of said plurality of random numbers.

32. A decrypting method according to claim 29, wherein said determining includes:

determining whether a decrypting procedure at said current decrypting stage of said decrypting operation should be changed depending on a plurality of random numbers, based on said decrypting stage data at said previous decrypting stage, and wherein said changing includes:

changing said decrypting procedure at said current decrypting stage of said decrypting operation depending on said plurality of random numbers.

33. A decrypting method according to claim 32, wherein said changing includes:

changing said decrypting procedure at said current decrypting stage of said decrypting operation depending on said ciphertext or a data dependent on said ciphertext in place of said plurality of random numbers.

34. A decrypting method according to claim 29, wherein said determining includes:

determining whether said decrypting operation at said current decrypting stage should be changed depending on a plurality of random numbers, based on said decrypting stage data at said previous decrypting stage, and wherein said changing includes:

inserting a delay time in said decrypting operation at said current decrypting stage depending on said plurality of random numbers.

35. A decrypting method according to claim 34, wherein said changing includes:

inserting said delay time in said decrypting operation at said current decrypting stage depending on said ciphertext or a data dependent on said ciphertext in place of said plurality of random numbers.

36. An encrypting and decrypting method comprising:

(a) determining whether an inputted instruction is an encrypt instruction or a decrypt instruction;

(b) determining whether said encrypting operation to a text at a current encrypting stage of an encrypting operation should be changed, based on said encrypting stage data at a previous encrypting stage, said encrypting stage data at said current encrypting stage indicating an encrypting state at said current encrypting stage;

(c) changing said encrypting operation to said text at said current encrypting stage when it is determined that said encrypting operation to said text at said current encrypting stage should be changed;

(d) carrying out said encrypting operation to said text using first intermediate data at current encrypting stage of said encrypting operation;

(e) executing said steps (b) to (d) for each of a plurality of encrypting stages of said encrypting operation to said text in response to said encrypt instruction to produce a ciphertext;

(f) determining whether said decrypting operation to said text at a current decrypting stage should be changed, based on said decrypting stage data at a previous decrypting stage, said decrypting stage data at said current decrypting stage indicating an decrypting state at said current decrypting stage;

(g) changing said decrypting operation to said text at said current decrypting stage when it is determined that said decrypting operation to said text at said current decrypting stage should be changed;

(h) carrying out said decrypting operation to said text using second intermediate data at said current decrypting stage; and (i) executing said steps (f) to (h) for each of a plurality of decrypting stages of said encrypting operation to said text in response to said decrypt instruction to produce a plaintext, wherein said step (b) determines whether said intermediate data at said next encrypting stage of said encrypting operation should be changed depending on at least a plurality of random numbers, based on said encrypting stage data at said current encrypting stage from said step (c), wherein said encrypting stage data includes said intermediate data at said next encrypting stage, wherein, in said step (c), said intermediate data at said next encrypting stage is changed a plurality of times depending on said plurality of random numbers, in order to cancel an influence of said plurality of random numbers on said encrypting operation, wherein said step (f) determines whether said intermediate data at said next decrypting stage of said decrypting operation should be changed depending on at least a plurality of random numbers, based on said decrypting stage data at said current decrypting stage from said step (h), wherein said decrypting stage data includes said intermediate data for said next decrypting stage, and wherein, in said step (f), said intermediate data at said next decrypting stage is changed a plurality of times depending on said plurality of random numbers, in order to cancel an influence of said plurality of random numbers on said decrypting operation, wherein said encrypting operation is carried out by:

i) dividing each n-bit word of the plaintext into an upper n bits and a lower n bits, n being an even integer value greater than or equal to 16, ii) calculating a logical product of the upper n bits of the plaintext with at least one of said plurality of random numbers to obtain a first result, and iii) calculating a logical product of the lower n bits of the plaintext with at least one of said plurality of random numbers to obtain a second result, wherein, in obtaining the first result and the second result, a first subset of the upper n bits and the lower n bits of the plaintext are exclusive-or'ed with a first of said plurality of random numbers, a second subset of the upper n bits and the lower n bits of the plaintext are exclusive-or'ed with a second of said plurality of random numbers, and a third subset of the upper n bits and the lower n bits of the plaintext are exclusive-or'ed with both the first and second random numbers.

37. An encrypting and decrypting method according to claim 36, wherein said (b) determining includes:

determining whether said first intermediate data at said current encrypting stage of said encrypting operation should be changed depending on a first plurality of random numbers, based on said encrypting stage data at said previous encrypting stage, wherein said (f) determining includes:

determining whether said second intermediate data at said current decrypting stage of said decrypting operation should be changed depending on a second plurality of random numbers, based on said decrypting stage data at said previous decrypting stage.

38. An encrypting and decrypting method according to claim 37, wherein said (c) changing includes:

changing said first intermediate data at said current encrypting stage depending on said text or a data dependent on said text in place of said first plurality of random numbers, and wherein said (g) changing includes:

changing said second intermediate data at said current decrypting stage depending on said text or said data dependent on said text in place of said second plurality of random numbers.

39. An encrypting and decrypting method according to claim 36, wherein said (b) determining includes:

determining whether an encrypting procedure at said current encrypting stage of said encrypting operation should be changed depending on a first plurality of random numbers, based on said encrypting stage data at said previous encrypting stage, wherein said (f) determining includes:

determining whether a decrypting procedure at said current decrypting stage of said decrypting operation should be changed depending on a second plurality of random numbers, based on said decrypting stage data at said previous decrypting stage, wherein said (c) changing includes:

changing said encrypting procedure at said current encrypting stage of said encrypting operation depending on said first plurality of random numbers, and wherein said (g) changing includes:

changing said decrypting procedure at said current decrypting stage of said decrypting operation depending on said second plurality of random numbers.

40. An encrypting and decrypting method according to claim 39, wherein said (c) changing includes:

changing said encrypting procedure at said current encrypting stage of said encrypting operation depending on said text or a data dependent on said text in place of said first plurality of random numbers, and wherein said (g) changing includes:

changing said decrypting procedure at said current decrypting stage of said decrypting operation depending on said text or said data dependent on said text in place of said second plurality of random numbers.

41. An encrypting and decrypting method according to claim 36, wherein said (b) determining includes:

determining whether said encrypting operation at said current encrypting stage should be changed depending on a first plurality of random numbers, based on said encrypting stage data at said previous encrypting stage, wherein said (f) determining includes:

determining whether said decrypting operation at said current decrypting stage should be changed depending on a second plurality of random numbers, based on said decrypting stage data at said previous decrypting stage, wherein said (c) changing includes:

inserting a first delay time in said encrypting operation at said current encrypting stage depending on said first plurality of random numbers, and wherein said (g) changing includes:

inserting a second delay time in said decrypting operation at said current decrypting stage depending on said second plurality of random numbers.

42. An encrypting and decrypting method according to claim 41, wherein said (c) changing includes:

inserting said first delay time in said encrypting operation at said current encrypting stage depending on said text or a data dependent on said text in place of said first plurality of random numbers, wherein said (f) changing includes:

inserting said second delay time in said decrypting operation at said current decrypting stage depending on said text or said data dependent on said text in place of said second plurality of random numbers.

43. A recording medium which stores a program for an encrypting method, wherein said encrypting method comprises:

(a) determining whether an encrypting operation at a current encrypting stage should be changed, based on encrypting stage data at a previous encrypting stage, said encrypting stage data at said previous encrypting stage indicating an encrypting state at said previous encrypting stage;

(b) changing said encrypting operation at said current encrypting stage when it is determined that said encrypting operation at said current encrypting stage should be changed;

(c) carrying out said encrypting operation at said current encrypting stage a plurality of times to a plaintext using intermediate data at said current encrypting stage; and (d) executing said steps (a) to (c) to each of a plurality of said encrypting stages of said encrypting operation to produce a ciphertext, wherein step (b) determines whether said intermediate data at said next encrypting stage of said encrypting operation should be changed depending on at least a plurality of random numbers, based on said encrypting data at said current encrypting stage from said step (c), wherein said encrypting stage data includes said intermediate data at said next encrypting stage, and wherein, in said step (c), said intermediate data at said next encrypting stage is changed a plurality of times depending on said plurality of random numbers, in order to cancel an influence of said plurality of random numbers on said encrypting operation, wherein said encrypting operation is carried out by:

i) dividing each n-bit word of the plaintext into an upper n bits and a lower n bits, n being an even integer value greater than or equal to 16, ii) calculating a logical product of the upper n bits of the plaintext with at least one of said plurality of random numbers to obtain a first result, and iii) calculating a logical product of the lower n bits of the plaintext with at least one of said plurality of random numbers to obtain a second result, wherein, in obtaining the first result and the second result, a first subset of the upper n bits and the lower n bits of the plaintext are exclusive-or'ed with a first of said plurality of random numbers, a second subset of the upper n bits and the lower n bits of the plaintext are exclusive-or'ed with a second of said plurality of random numbers, and a third subset of the upper n bits and the lower n bits of the plaintext are exclusive-or'ed with both the first and second random numbers.

44. A recording medium according to claim 43, wherein said determining includes:

determining whether said intermediate data at said current encrypting stage of said encrypting operation should be changed depending on a plurality of random numbers, based on said encrypting-stage data at said previous encrypting stage.

45. A recording medium according to claim 44, wherein said changing includes:

changing said intermediate data at said current encrypting stage depending on said plaintext or a data dependent on said plaintext in place of said plurality of random numbers.

46. A recording medium according to claim 43, wherein said determining includes:

determining whether an encrypting procedure at said current encrypting stage of said encrypting operation should be changed depending on a plurality of random numbers, based on said encrypting stage data at said previous encrypting stage, and wherein said changing includes:

changing said encrypting procedure at said current encrypting stage of said encrypting operation depending on said plurality of random numbers.

47. A recording medium according to claim 46, wherein said changing includes:

changes said encrypting procedure at said next encrypting stage of said encrypting operation depending on said plaintext or a data dependent on said plaintext in place of said plurality of random numbers.

48. A recording medium according to claim 43, wherein said determining includes:

determining whether said encrypting operation at said current encrypting stage should be changed depending on a plurality of random numbers, based on said encrypting stage data at said previous encrypting stage, and wherein said changing includes:

inserting a delay time in said encrypting operation at said current encrypting stage depending on said plurality of random numbers.

49. A recording medium according to claim 48, wherein said changing includes:

inserting said delay time in said encrypting operation at said current encrypting stage depending on said plaintext or a data dependent on said plaintext in place of said plurality of random numbers.

50. A recording medium which stores a program for a decrypting method, wherein said decrypting method comprises:

(a) determining whether a decrypting operation at a current decrypting stage should be changed, based on decrypting stage data at a previous decrypting stage, said decrypting stage data at said previous decrypting stage indicating an decrypting state at each of said plurality of decrypting stages;

(b) changing said decrypting operation at said current decrypting stage when it is determined that said decrypting operation at said next decrypting stage should be changed;

(c) carrying out said decrypting operation at said current decrypting stage to a ciphertext using intermediate data at said current decrypting stage; and (d) executing said steps (a) to (c) to each of a plurality of decrypting stages to produce a plaintext, wherein step (b) determines whether said intermediate data at said next encrypting stage of said encrypting operation should be changed depending on at least a plurality of random numbers, based on said encrypting data at said current encrypting stage from said step (c), wherein said decrypting stage data includes said intermediate data at said next decrypting stage, and wherein, in said step (c), said intermediate data at said next decrypting stage is changed a plurality of times depending on said plurality of random numbers, in order to cancel an influence of said plurality of random numbers on said decrypting operation, wherein said decrypting operation is carried out by:

i) dividing each n-bit word of the plaintext into an upper n bits and a lower n bits, n being an even integer value greater than or equal to 16, ii) calculating a logical product of the upper n bits of the plaintext with at least one of said plurality of random numbers to obtain a first result, and iii) calculating a logical product of the lower n bits of the plaintext with at least one of said plurality of random numbers to obtain a second result, wherein, in obtaining the first result and the second result, a first subset of the upper n bits and the lower n bits of the plaintext are exclusive-or'ed with a first of said plurality of random numbers, a second subset of the upper n bits and the lower n bits of the plaintext are exclusive-or'ed with a second of said plurality of random numbers, and a third subset of the upper n bits and the lower n bits of the plaintext are exclusive-or'ed with both the first and second random numbers.

51. A recording medium according to claim 50, wherein said determining includes:

determining whether said intermediate data at said current decrypting stage of said decrypting operation should be changed depending on a plurality of random numbers, based on said decrypting stage data at said previous decrypting stage.

52. A recording medium according to claim 51, wherein said changing includes:

changing said intermediate data at said current decrypting stage depending on said ciphertext or a data dependent on said ciphertext in place of said plurality of random numbers.

53. A recording medium according to claim 50, wherein said determining includes:

determining whether a decrypting procedure at said current decrypting stage of said decrypting operation should be changed depending on a plurality of random numbers, based on said decrypting stage data at said previous decrypting stage, and wherein said changing includes:

changing said decrypting procedure at said current decrypting stage of said decrypting operation depending on said plurality of random numbers.

54. A recording medium according to claim 53, wherein said changing includes:

changing said decrypting procedure at said current decrypting stage of said decrypting operation depending on said ciphertext or a data dependent on said ciphertext in place of said plurality of random numbers.

55. A recording medium according to claim 50, wherein said determining includes:

determining whether said decrypting operation at said current decrypting stage should be changed depending on a plurality of random numbers, based on said decrypting stage data at said previous decrypting stage, and wherein said changing includes:

inserting a delay time in said decrypting operation at said current decrypting stage depending on said plurality of random numbers.

56. A recording medium according to claim 55, wherein said changing includes:

inserting said delay time in said decrypting operation at said current decrypting stage depending on said ciphertext or a data dependent on said ciphertext in place of said plurality of random numbers.

57. A recording medium which stores a program for an encrypting and decrypting method, wherein said encrypting and decrypting method comprises:

(a) determining whether an inputted instruction is an encrypt instruction or a decrypt instruction (FIG. 2, FIG. 12, column 2 lines 27–65, column 5 lines 1–37, column 6 lines 1–65, column 9 lines 24–58);

(b) determining whether said encrypting operation to a text at a current encrypting stage of an encrypting operation should be changed, based on said encrypting stage data at a previous encrypting stage, said encrypting stage data at said current encrypting stage indicating an encrypting state at said current encrypting stage (column 2 line 42–column 3 line 51, column 5 lines 1–67);

(c) changing said encrypting operation to said text at said current encrypting stage when it is determined that said encrypting operation to said text at said current encrypting stage should be changed (FIG. 2, FIG. 4, column 2 lines 27–65, column 3 lines 12–51, column 5 lines 1–50);

(d) carrying out said encrypting operation to said text using first intermediate data at current encrypting stage of said encrypting operation (FIG. 2, column 2 lines 27–65, column 5 lines 1–37, column 6 lines 1–65);

(e) executing said steps (b) to (d) for each of a plurality of encrypting stages of said encrypting operation to said text in response to said encrypt instruction to produce a ciphertext (FIG. 2, column 2 lines 27–65, column 5 lines 1–37, column 6 lines 1–65);

(f) determining whether said decrypting operation to said text at a current decrypting stage should be changed, based on said decrypting stage data at a previous decrypting stage, said decrypting stage data at said current decrypting stage indicating an decrypting state at said current decrypting stage (FIG. 12, column 9 lines 24–58);

(g) changing said decrypting operation to said text at said current decrypting stage when it is determined that said decrypting operation to said text at said current decrypting stage should be changed (FIG. 12, column 9 lines 24–58);

(h) carrying out said decrypting operation to said text using second intermediate data at said current decrypting stage (FIG. 12, column 9 lines 24–58); and (i) executing said steps (f) to (h) for each of a plurality of decrypting stages of said encrypting operation to said text in response to said decrypt instruction to produce a plaintext (FIG. 12, column 9 lines 24–58), wherein step (b) determines whether said intermediate data at said next encrypting stage of said encrypting operation should be changed depending on at least a plurality of random numbers, based on said encrypting data at said current encrypting stage from said step (c) (column 2 lines 16–60, column 5 line 38–column 6 line 10), wherein said encrypting stage data includes said intermediate data at said next encrypting stage (column 2 lines 16–60, column 5 line 38–column 6 line 10), and wherein, in said step (c), said intermediate data at said next encrypting stage is changed a plurality of times depending on said plurality of random numbers, in order to cancel an influence of said plurality of random numbers on said encrypting operation (column 2 lines 16–60, column 5 line 38–column 6 line 10), wherein step (f) determines whether said intermediate data at said next decrypting stage of said decrypting operation should be changed depending on at least a plurality of random numbers, based on said decrypting data at said current decrypting stage from said step (h) (column 2 lines 16–60, column 5 line 38–column 6 line 10), wherein said decrypting stage data includes said intermediate data at said next encrypting stage (column 2 lines 16–60, column 5 line 38–column 6 line 10), and wherein, in said step (f), said intermediate data at said next decrypting stage is changed a plurality of times depending on said plurality of random numbers, in order to cancel an influence of said plurality of random numbers on said decrypting operation (column 2 lines 16–60, column 5 line 38–column 6 line 10), wherein said encrypting operation is carried about by:

i) dividing each n-bit word of the plaintext into an upper n bits and a lower n bits, n being an even integer value greater than or equal to 16, ii) calculating a logical product of the upper n bits of the plaintext with at least one of said plurality of random numbers to obtain a first result, and iii) calculating a logical product of the lower n bits of the plaintext with at least one of said plurality of random numbers to obtain a second result, wherein, in obtaining the first result and the second result, a first subset of the upper n bits and the lower n bits of the plaintext are exclusive-or'ed with a first of said plurality of random numbers, a second subset of the upper n bits and the lower n bits of the plaintext are exclusive-or'ed with a second of said plurality of random numbers, and a third subset of the upper n bits and the lower n bits of the plaintext are exclusive-or'ed with both the first and second random numbers.

58. A recording medium according to claim 57, wherein said (b) determining includes:

determining whether said first intermediate data at said current encrypting stage of said encrypting operation should be changed depending on a first plurality of random numbers, based on said encrypting stage data at said previous encrypting stage, wherein said (f) determining includes:

determining whether said second intermediate data at said current decrypting stage of said decrypting operation should be changed depending on a second plurality of random numbers, based on said decrypting stage data at said previous decrypting stage, wherein said encrypting stage data includes said first intermediate data at said current encrypting stage and said decrypting stage data includes said second intermediate data for said current decrypting stage, wherein said (c) changing includes:

changing said first intermediate data at said current encrypting stage depending on said first plurality of random numbers, and wherein said (g) changing includes:

changing said second intermediate data at said current decrypting stage depending on said second plurality of random numbers.

59. A recording medium according to claim 58, wherein said (c) changing includes:

changing said first intermediate data at said current encrypting stage depending on said text or a data dependent on said text in place of said first plurality of random numbers, and wherein said (g) changing includes:

changing said second intermediate data at said current decrypting stage depending on said text or said data dependent on said text in place of said second plurality of random numbers.

60. A recording medium according to claim 57, wherein said (b) determining includes:

determining whether an encrypting procedure at said current encrypting stage of said encrypting operation should be changed depending on a first plurality of random numbers, based on said encrypting stage data at said previous encrypting stage, wherein said (f) determining includes:

determining whether a decrypting procedure at said current decrypting stage of said decrypting operation should be changed depending on a second plurality of random numbers, based on said decrypting stage data at said previous decrypting stage, wherein said (c) changing includes:

changing said encrypting procedure at said current encrypting stage of said encrypting operation depending on said first plurality of random numbers, and wherein said (g) changing includes:

changing said decrypting procedure at said current decrypting stage of said decrypting operation depending on said second plurality of random numbers.

61. A recording medium according to claim 60, wherein said (c) changing includes:

changing said encrypting procedure at said current encrypting stage of said encrypting operation depending on said text or a data dependent on said text in place of said first plurality of random numbers, and wherein said (g) changing includes:

changing said decrypting procedure at said current decrypting stage of said decrypting operation depending on said text or said data dependent on said text in place of said second plurality of random numbers.

62. A recording medium according to claim 57, wherein said (b) determining includes:

determining whether said encrypting operation at said current encrypting stage should be changed depending on a first plurality of random numbers, based on said encrypting stage data at said previous encrypting stage, wherein said (f) determining includes:

determining whether said decrypting operation at said current decrypting stage should be changed depending on a second plurality of random numbers, based on said decrypting stage data at said previous decrypting stage, wherein said (c) changing includes:

inserting a first delay time in said encrypting operation at said current encrypting stage depending on said first plurality of random numbers, and wherein said (g) changing includes:

inserting a second delay time in said decrypting operation at said current decrypting stage depending on said second plurality of random numbers.

63. A recording medium according to claim 62, wherein said (c) changing includes:

inserting said first delay time in said encrypting operation at said current encrypting stage depending on said text or a data dependent on said text in place of said first plurality of random numbers, wherein said (f) changing includes:

inserting said second delay time in said decrypting operation at said current decrypting stage depending on said text or said data dependent on said text in place of said second plurality of random numbers.

* * * * *